United States Patent
Moran et al.

(10) Patent No.: US 8,763,903 B2
(45) Date of Patent: *Jul. 1, 2014

(54) READING DEVICE FOR IDENTIFYING A TAG OR AN OBJECT ADAPTED TO BE IDENTIFIED, RELATED METHODS AND SYSTEMS

(71) Applicant: Bilcare Technologies Singapore Pte. Ltd., Singapore (SG)

(72) Inventors: Peter Malcolm Moran, Singapore (SG); Adrian Paul Burden, Malvern (GB)

(73) Assignee: Bilcare Technologies Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 13/646,987

(22) Filed: Oct. 8, 2012

(65) Prior Publication Data

US 2013/0092736 A1    Apr. 18, 2013

Related U.S. Application Data

(62) Division of application No. 12/867,902, filed as application No. PCT/SG2009/000056 on Feb. 19, 2009, now Pat. No. 8,281,997.

(60) Provisional application No. 61/029,597, filed on Feb. 19, 2008.

(51) Int. Cl.
*G06K 7/00* (2006.01)

(52) U.S. Cl.
USPC ........... 235/440; 235/449; 235/451; 235/491; 235/493

(58) Field of Classification Search
USPC ........................ 235/440, 449, 451, 491, 493
See application file for complete search history.

(56) References Cited

U.S. PATENT DOCUMENTS

| 5,519,200 | A  | * | 5/1996 | Williams | 235/487 |
| 8,281,997 | B2 | * | 10/2012 | Moran et al. | 235/449 |

* cited by examiner

*Primary Examiner* — Kristy A Haupt
(74) *Attorney, Agent, or Firm* — Pillsbury Winthrop Shaw Pittman, LLP

(57) ABSTRACT

Disclosed is a reading device for identifying a tag or an object adapted to be identified, said reading device including a first reading element for reading a first set of identification features located in the tag or the object adapted to be identified. The first reading element is a magneto-optical reading element; wherein the first reading element is adapted to conform to the tag or object adapted to be identified when brought into contact with the tag or object adapted to be identified.

15 Claims, 49 Drawing Sheets

FIGURE 8
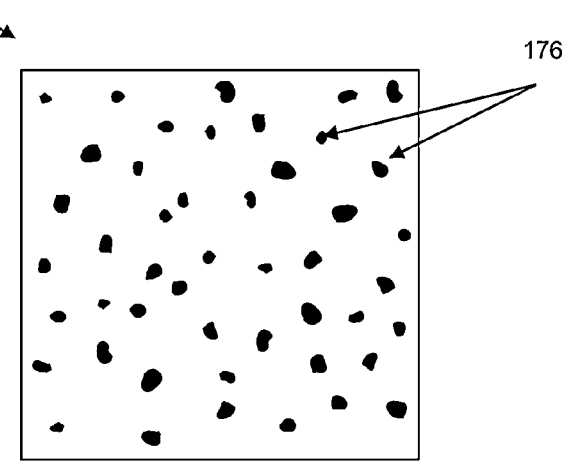
(a)
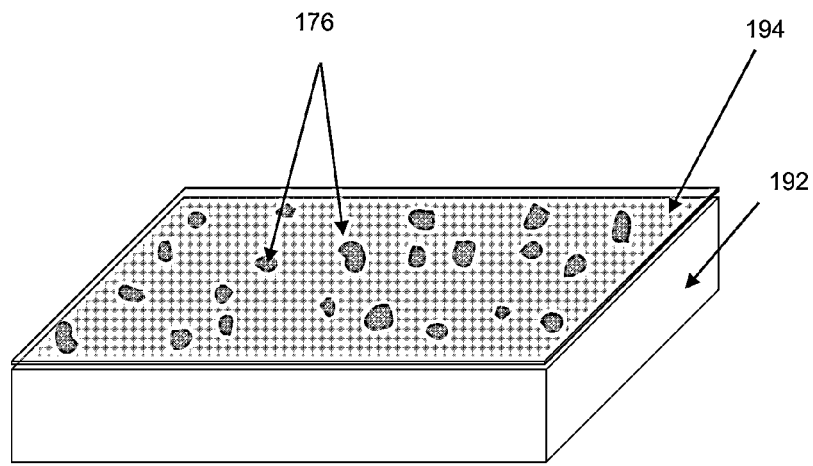
(b)

FIGURE 15
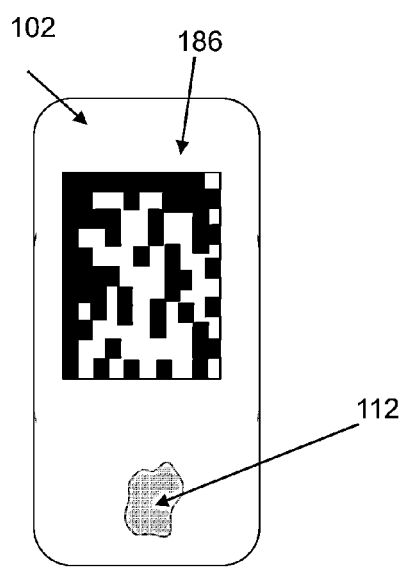
(a)
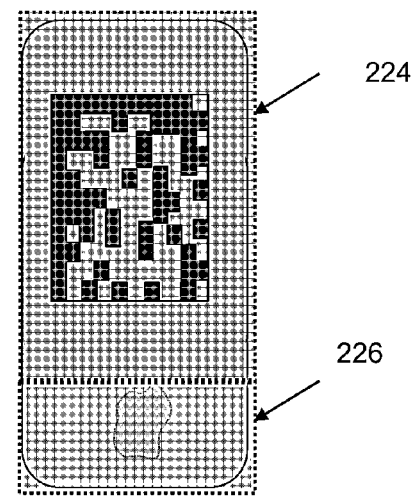
(b)

FIGURE 16
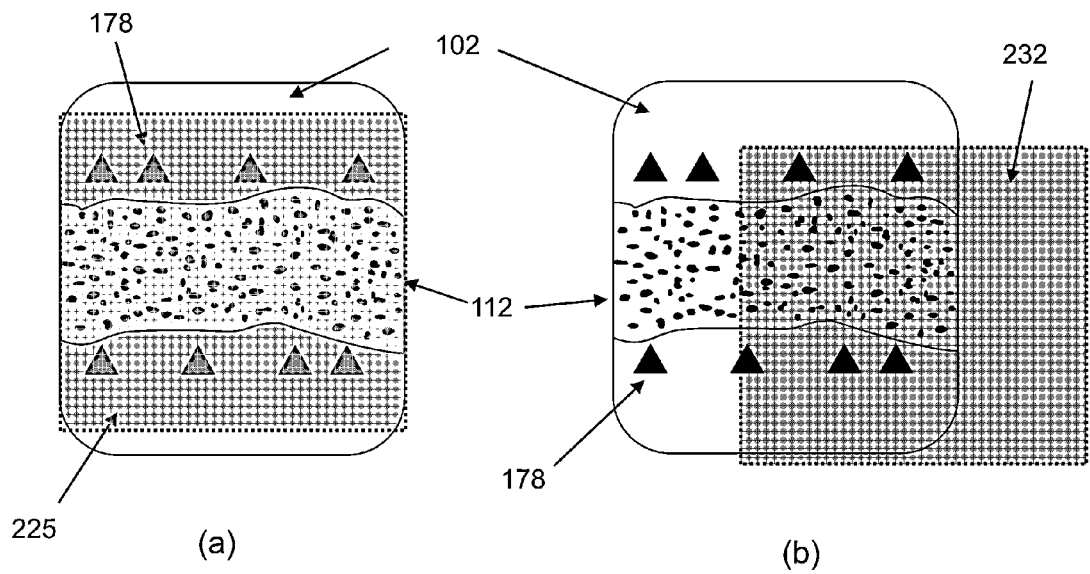
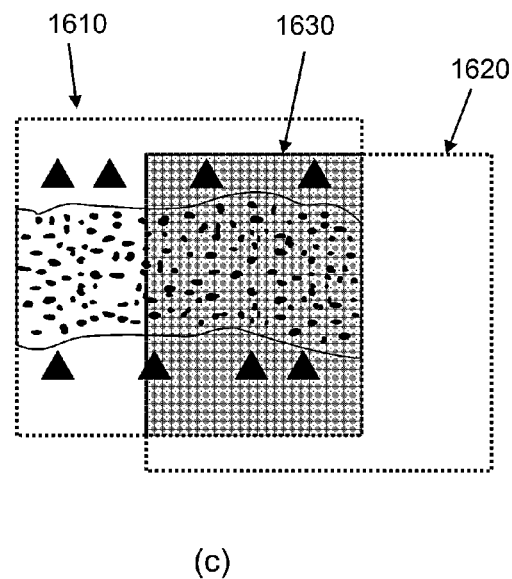

FIGURE 17
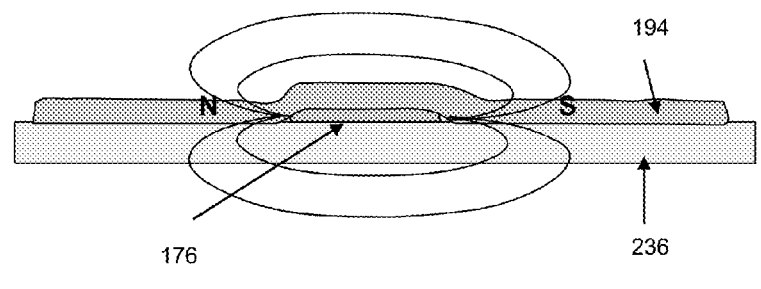
(a)
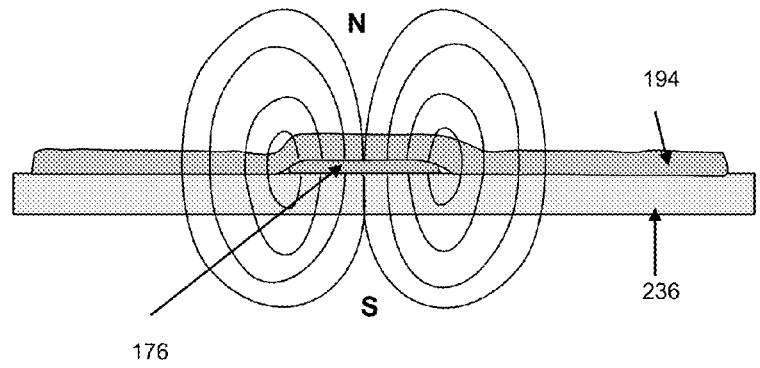
(b)

(a)  (b)

FIGURE 20
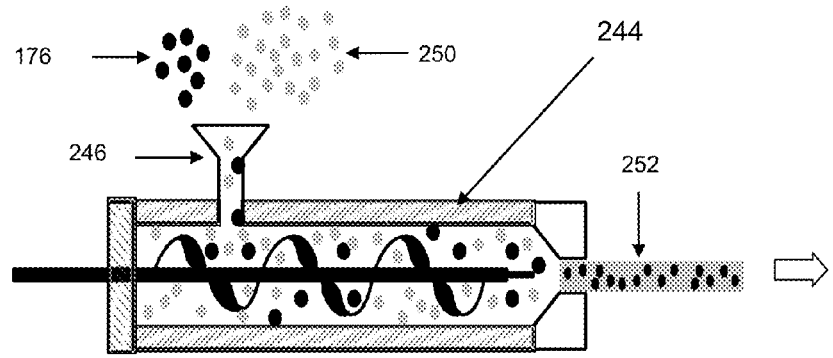
(a)
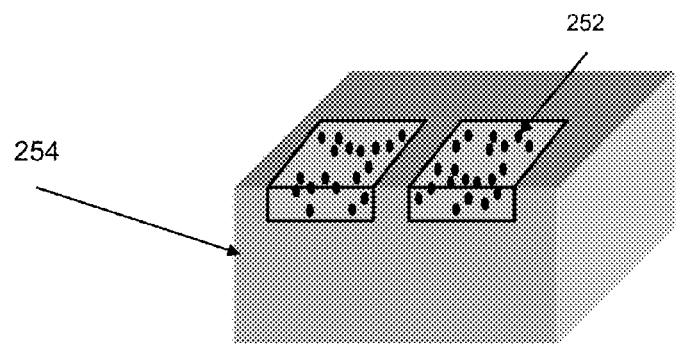
(b)

FIGURE 25
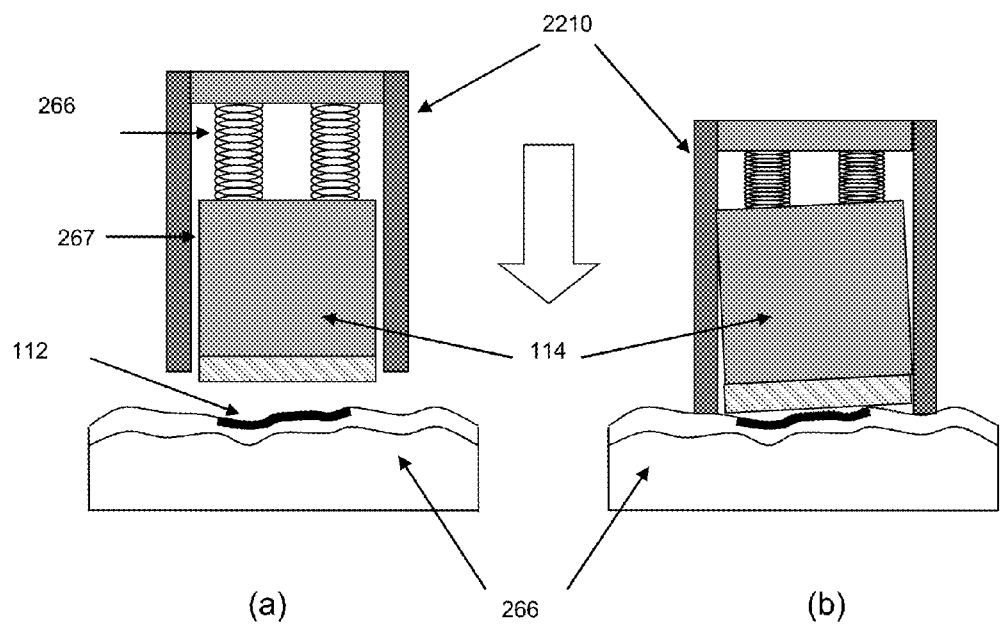
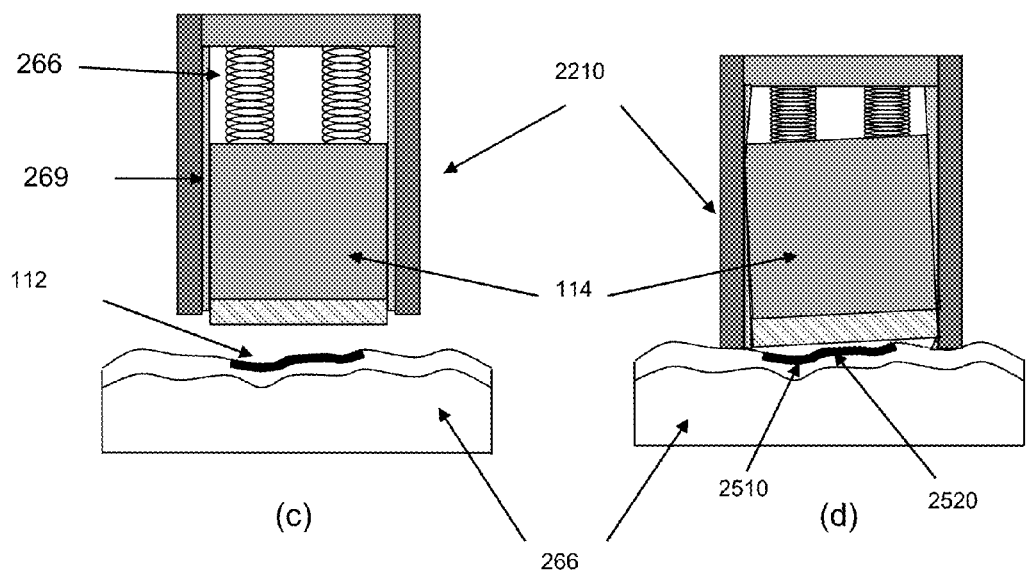

(a)  (b)

FIGURE 35
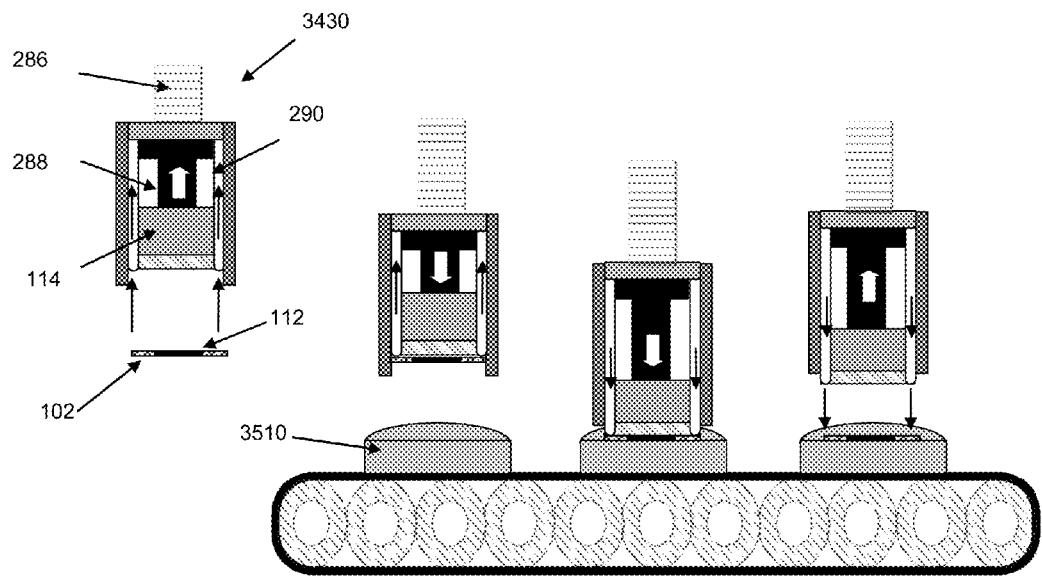
(a)
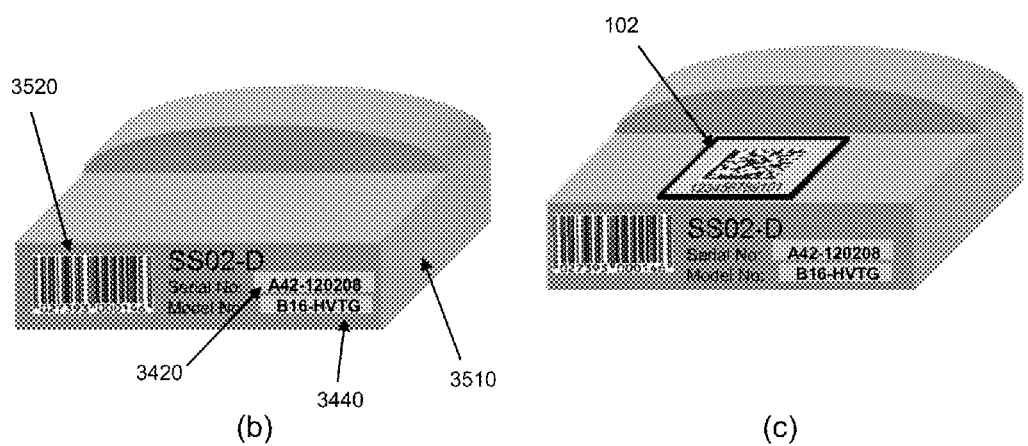
(b)　　　　　　　　　　　　　(c)

FIGURE 36
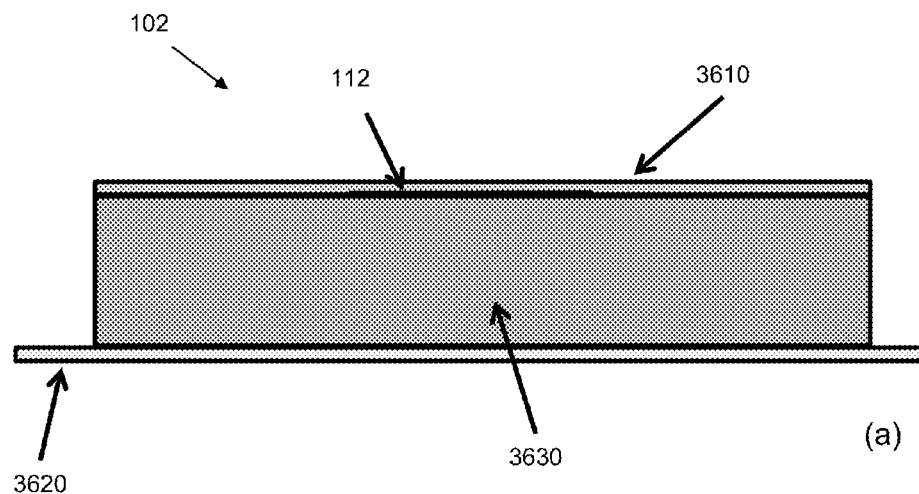
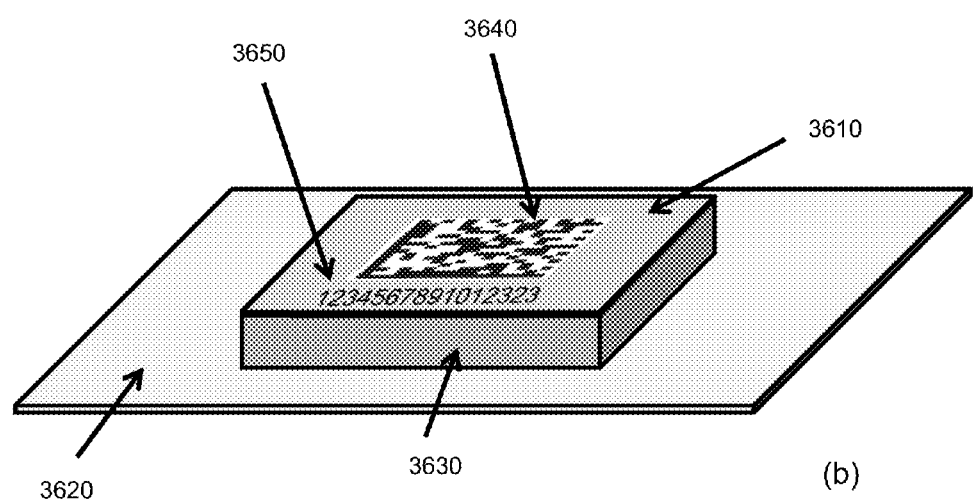

FIGURE 37
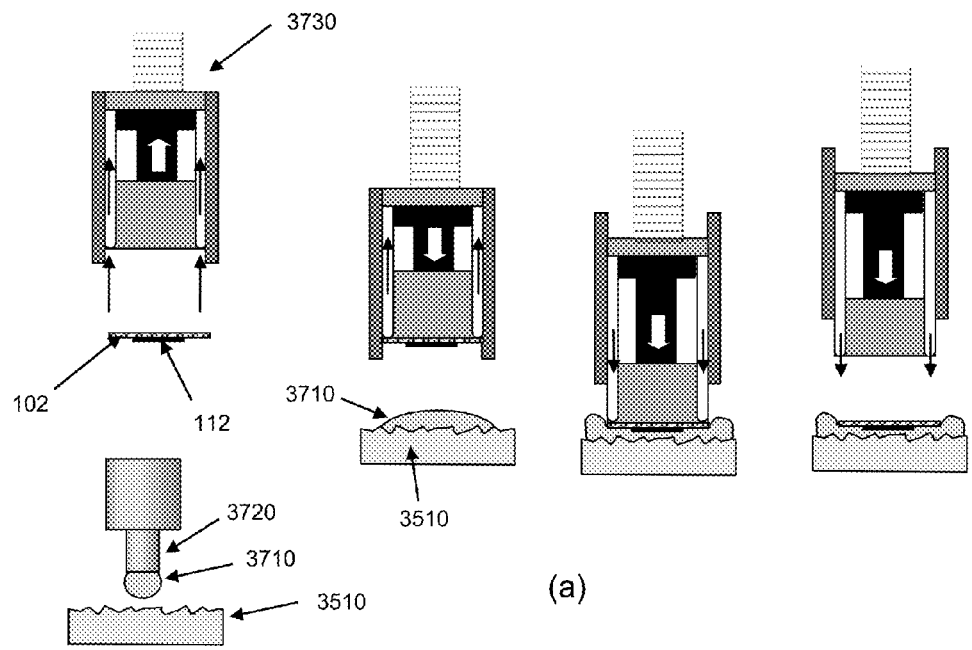
(a)
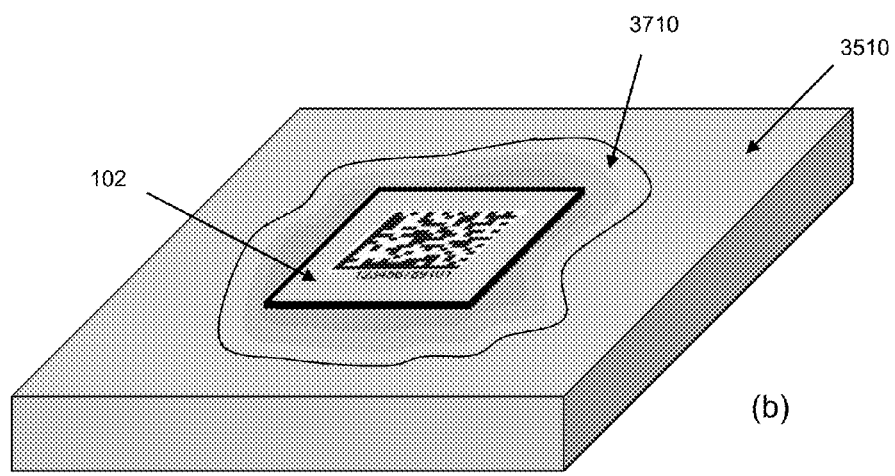
(b)

FIGURE 38
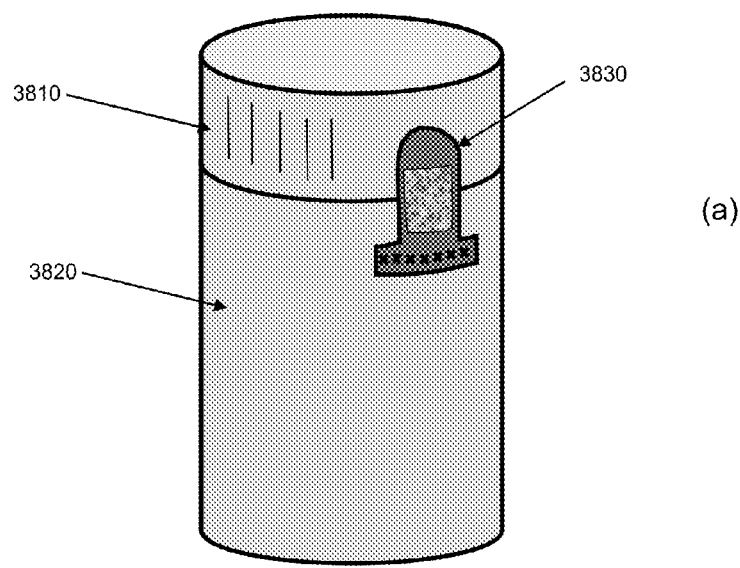
(a)
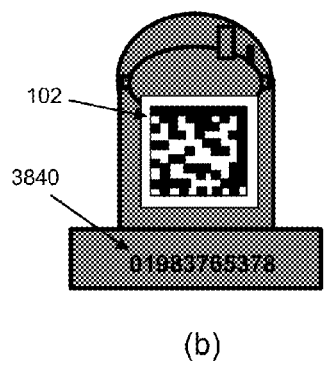
(b)
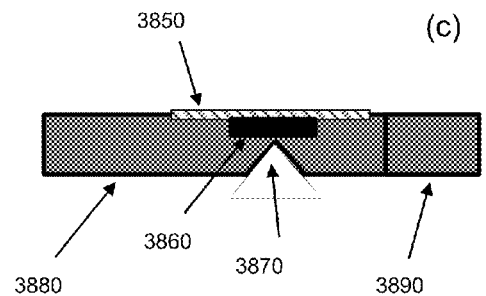
(c)

FIGURE 40
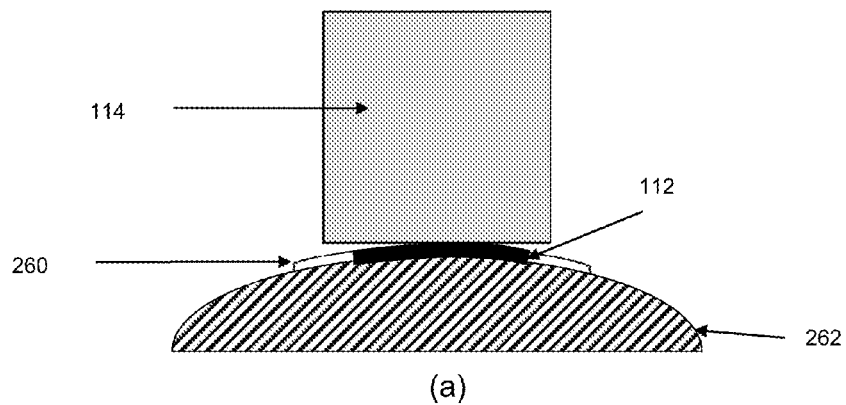
(a)
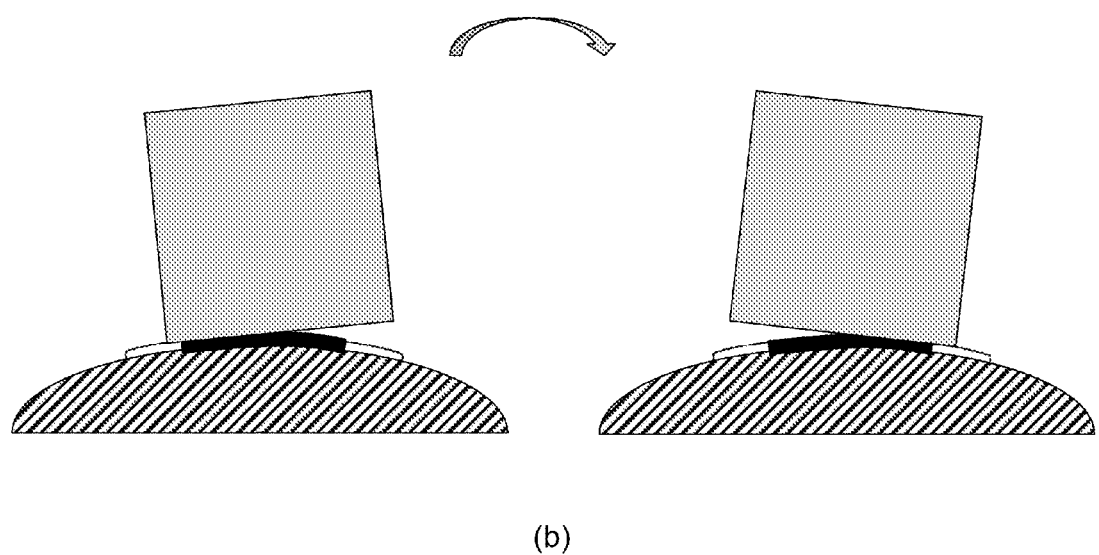
(b)

FIGURE 45
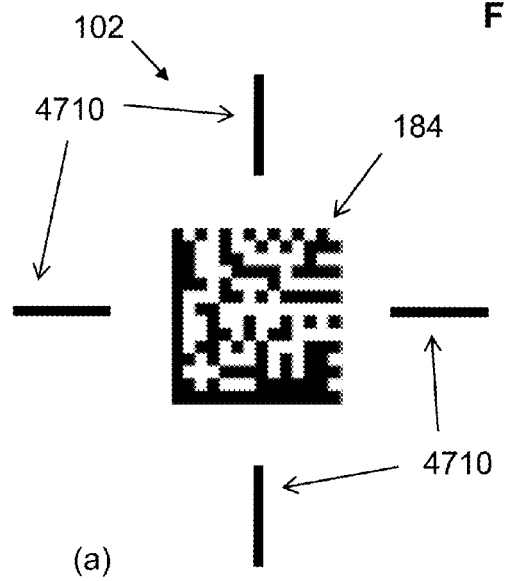
(a)
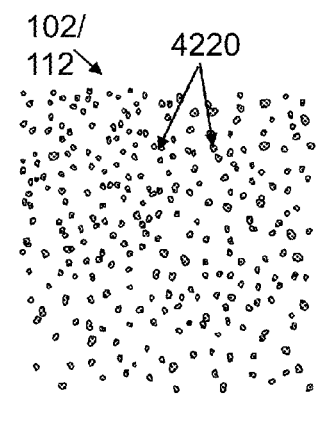
(b)
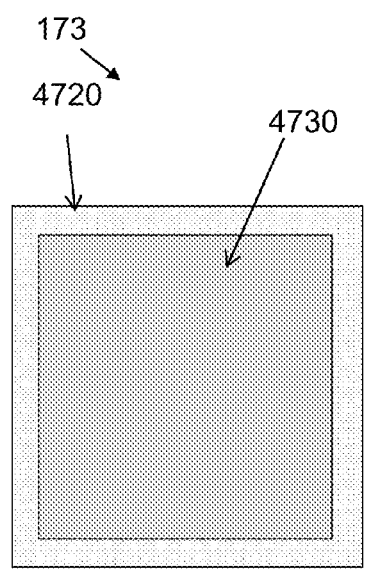
(c)
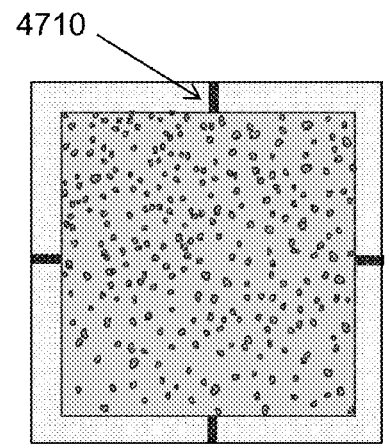
(d)

READING DEVICE FOR IDENTIFYING A TAG OR AN OBJECT ADAPTED TO BE IDENTIFIED, RELATED METHODS AND SYSTEMS

CROSS-REFERENCE TO RELATED APPLICATIONS

This application is a divisional of U.S. application Ser. No. 12/867,902, filed Aug. 17, 2010, which is a national stage entry according to 35 U.S.C. §371 of PCT application No.: PCT/SG2009/000056, filed on Feb. 19, 2009, which claims the benefit of priority of U.S. provisional application No. 61/029,597, filed Feb. 19, 2008, the contents of each of which are hereby incorporated by reference in their entirety for all purposes.

FIELD OF THE INVENTION

Embodiments of the invention relate to field of reading devices. By way of example, embodiments of the invention relate to a reading device for identifying a tag or an object to be identified, related methods and systems.

BACKGROUND OF THE INVENTION

Recently, use of a magnetic field for identification purposes has been very extensive and vital. This can be seen in a myriad of secured articles which utilize magnetic patterns or magnetic particles as their identification means. Some examples include security documents such as cheques, credit cards or tickets which typically use magnetic inks or magnetic strips for storing encrypted security information. Other examples include anti-counterfeit tags which use magnetic particles to create a random arrangement which acts as a magnetic fingerprint. In addition, magnetic barcodes and magnetic patterns are also gaining popularity as magnetic security features.

Using a magnetic field for identification is popular as it is an affordable form of a non-visible identification that can be read quickly and reliably. Besides, identification tags which use magnetic fields generally do not require any additional power to function as the magnetic field is an inherent feature of the magnetic materials.

However, means for detecting magnetic fields in the area of security features have been very limited. Most magnetic secured objects, in particular security cards and documents, commonly adopt a detection means which involves sliding the objects' magnetic face into a slot to obtain a magnetic signal. Nevertheless, increased security often requires the resolution of the magnetic field signal to a fine level. This encourages the development of new high-resolution detection means with improved usability for users.

An example of a high-resolution detection method is a magneto-optical detection. In the case of magneto-optical disks (for example Sony's "MiniDiscs") and similar data storage devices, the magneto-optic detection is achieved by bouncing polarized light off the reflective surface inside the digital video disc (DVD). The polarization of the reflected light is changed due to the presence of a magnetic field at or around the reflective surface (generally this rotation of the polarization is due to the magneto-optic Kerr effect). By measuring the change in polarization, a detector is able to get a measure of the strength of the magnetic field at the reflective surface. This system works well for DVDs due to their form factor (for example they are very smooth and flat) and the fact that they are not generally subjected to harsh environments.

However security labels and markings may be subjected to severe scratching and other harsh conditions during their service life. Therefore in the case of security labels and markings, it is not always practical to use a reading method which requires the substrate being read (for example the label) to contain a mirror-finish reflective surface.

Fortunately an alternative magneto-optic detection method exists. Here the reflective surface is part of the reading device itself and the light is reflected internally to the reading device itself. The reflective surface of the reading device is brought into close contact with substrate to be read such that the magnetic field from the substrate can influence the materials or light within the device. This means that the substrate being read is freed from the constraint of having to have a flat mirror surface. Other detection methods involve use of Giant Magnetoresistance (GMR), Flux concentrator for example.

Internally reflective magneto-optical readers have been developed by many groups for use in the field of storage devices but their usages for identification purposes are very limited. Some examples of magneto-optical readers are detailed below.

U.S. Pat. No. 3,512,866 discloses a magneto-optical hand viewer. The hand viewer is directed specifically to an apparatus constructed to operate using magneto-optical principles for providing a visual representation of magnetic states in a magnetic medium such as a magnetic tape. The hand viewer provides visual representation using the Kerr and Faraday magneto-optical effects. The Kerr magneto-optical effect produces a rotation of the major direction of polarization of the rays of a light beam reflected from a magnetic surface. The Faraday magneto-optical effect produces a rotation of the major direction of polarization of the rays of a light beam passing through a magnetic medium. The magneto-optical hand viewer uses a combination of the Kerr and Faraday magneto-optical effects to provide maximum amplitude of rotation of the rays of the light beam.

U.S. Pat. No. 5,742,036 discloses a method for marking, capturing and decoding machine-readable matrix symbols using magneto-optic imaging techniques. The patent involves enhancing machine-readable matrix symbol markings on substrate materials by the addition of magnetisable materials, and then, at a later time, taking advantage of the magnetic properties associated with the matrix symbol marking to read the marking using a magneto-optic reading apparatus. However, the method described in the patent mainly deals with the detection of Vericode® or other machine readable matrix symbols made by depositing a viscous magnetic compound. In addition, the patent describes the detection of a magnetic anti-counterfeit symbols, but it does not consider magneto-optics for use in non-symbology applications; for example for use imaging the inherent randomness of scattered magnetic particles. In other words, the magneto-optic reader in the patent recognizes symbols written with magnetic particles but does not read individual particles and considers their random position in a fixed area such that the area possesses a non-repeatable pattern in fine resolution.

U.S. Pat. No. 5,920,538 discloses a magneto-optical readout method for reading stored data, a magneto-optical readout head and a method for making the same. The patent describes a magneto-optical readout head for reading magnetically stored data for use with a source of illuminating light having a wavelength. The magnetic-optical readout head comprises an optically transparent substrate having a surface adapted to face a magnetic storage medium, an optically transparent Faraday effect rotator, having a Faraday coefficient $\theta_F$ disposed on said surface of said substrate and having a Faraday effect rotator surface adapted to face said magnetic storage medium and an optically reflective Kerr effect rotator having a Kerr coefficient $\theta_K$ disposed on said Faraday rotator surface, with $\theta_K$ and $\theta_F$ having a same operational sign at said wavelength of said illuminating light.

In the field of anti-counterfeit technology, it is also found that it is highly advantageous to use combinations of technologies for enhanced protection, for example, reading both magnetic data and optical data. Some examples of combined optical and magnetic transducers are as such.

U.S. Pat. No. 3,612,835 discloses a combined optical and magnetic transducer for sensing both optical and magnetic properties of an article, for example, a piece of paper currency or other document having both visible and magnetic markings to be tested or read, an information-bearing medium such as a data-recording tape to be read, or the like. The transducer comprises a magnetic-sensing head having a transparent gap separating the poles of the magnetic core of the head, a photoelectric element being disposed in the head in alignment with the gap. Outside the head, one side of the article contacts or is in close proximity to the poles at the gap, and the article is illuminated by a light source, so that both magnetic properties and optical properties of the article may be detected simultaneously during relative movement of the article and the transducer.

U.S. Pat. No. 3,876,981 discloses a character recognition system and method for recognizing characters printed in magnetic ink in which recognition is enhanced by sensing the characters with both magnetic and optical transducers. At least a signal derived from the magnetic transducer output signal is combined with at least a signal derived from the optical transducer output signal either at or prior to the recognition stage.

U.S. Pat. No. 6,745,942 discloses a magnetic symbology reader having a housing containing a polarized light source which directs light through a magneto-optic sensor onto a reflector which reflects light back through the magneto-optic sensor and then through at least one analyzer and into at least one camera. A view finder allows the user to monitor the image on the magneto-optic sensor as seen by a viewfinder camera while a processor is coupled to possibly a second camera so that when an image is detected, the image from the camera may be processed by the processor to output information associated with the symbol to an external source. The analyzer and polarized light source provide contrast in the images detected by the sensor. A bias or erase coil located about the magneto-optic sensor can enhance or erase images on the sensor.

One of the early usages of magnetically readable identification can be found in U.S. Pat. No. 3,755,730. U.S. Pat. No. 3,755,730 discloses a vehicle, appliance or tool having a multiplicity of magnetisable identifying indicia hidden by an opaque, protective layer such as paint. The indicia may be read by the use of a magnetic reader.

Another example is disclosed in PCT publication number WO 2004/013735. The publication discloses a system and an associated method providing a marking of material to be applied to goods. In one embodiment, magnetic material is applied in a predetermined pattern. An accumulation of magnetic material in one orientation across the structured pattern may provide an automatically sensible value. Magnetically readable material may be provided as a predetermined, repeatable pattern, where the magnetic material is applied to a surface with a resolution in a range of at least 10,000 to 100 dots per inch.

Further prior art on repeatable magnetic pattern on documents and articles of manufacture are described in the following:

U.S. Pat. No. 3,878,367 discloses a security document having a magnetic recording layer containing uniformly dispersed magnetisable material having magnetic anisotropy wherein the material at a plurality of selected locations is differently physically aligned with respect to a reference location to provide a magnetically detectable permanent fixed information pattern such as a code pattern useful for authenticating the document.

U.S. Pat. No. 4,081,132 discloses a security document having a carrier and two layers of magnetisable material, one overlying the other, the carrier and layers being all bonded together. One layer is for the recording of information and the other layer has a magnetic structure which can be examined for verification purposes. The patent discloses that a preferred method of making the structured layer is to deposit magnetisable material to form the layer within the influence of a magnetic field from a recording on the information layer which is of the form of the structure. The recording is erased when the structured layer has been formed. The security document may be a credit card, a bank note or other valuable paper.

U.S. Pat. No. 3,803,634 discloses an apparatus and a method for magnetic printing in which one or more perforations are formed in a base plate of a master magnetic medium for magnetic pattern printing, and one or more magnetizing elements formed illustratively of permanent magnets are disposed in the perforations with their end faces projecting a small distance from the surface of the base plate. The surface of a magnetic film of a slave magnetic medium for copying is contacted closely with the end faces of the magnetizing elements, and an external magnetic field is impressed to the contacted portions. The desired magnetic patterns are formed by the arrangement of the magnetizing elements or by the relative movement of said magnetizing elements with respect to the slave magnetic medium for copying; as a result, said magnetic patterns are copied on the magnetic film of the slave magnetic medium.

U.S. Pat. No. 4,183,989 discloses a security paper which contains a security device e.g. a strip, thread or planchette having at least two machine verifiable security features thereon, one of which is a magnetic material, which may be magnetically coded or printed in a predetermined pattern on the device, and a second of which is a luminescent material, an X-ray absorbent or a metal. The provision of several features on one device provides a large increase in document security.

U.S. Pat. No. 3,701,165 discloses garments which are formed with marks or stitching which carry a substance detectable by magnetic detecting devices. When the magnetized substance on the garment part is detected in a process of making garments, subsequent garment making steps are actuated in response to the detection of the stitching.

U.S. Pat. No. 4,180,207 discloses a secure document is produced by securely attaching to a support, a body including a security feature and having a shape which conveys information to the eye. For example the body is a layer of magnetisable material having apertures of letters, numbers and the like. The document can be examined by both magnetic and optical examination apparatus to cross-check that no alteration has been made. A method of making a secure document and examination apparatus is also described. The security feature may be a pattern of magnetic anisotropy fixed into the material.

U.S. Pat. No. 3,755,730 discloses a vehicle, appliance or tool having a multiplicity of magnetisable identifying indicia hidden by an opaque, protective layer such as paint. The indicia may be read by the use of a magnetic reader.

In creating the preferred anti-counterfeit magnetic fingerprints, magnetic particles need to be aligned in a particular manner to give distinguishable signals. One approach is disclosed in United States Patent Application Number 20060081151. The patent application discloses a method and apparatus for printing using paste like inks such as those used in intaglio printing, wherein the inks include specialty flakes such as thin film optically variable flakes, or diffractive flakes. The patent application also discloses an apparatus having an energy source such as a heat source for temporarily lessening the viscosity of the ink during alignment of the flakes within the ink.

A similar method can also be found in U.S. Pat. No. 7,047,883. U.S. Pat. No. 7,047,883 discloses an apparatus and related methods to align magnetic flakes in a carrier, such as an ink vehicle or a paint vehicle to create optically variable images in a high-speed, linear printing operation. Images can provide security features on high-value documents, such as bank notes. Magnetic flakes in the ink are aligned using magnets in a linear printing operation. Selected orientation of the magnetic pigment flakes can achieve a variety of illusive optical effects that are useful for decorative or security applications.

However there is still a need for a reading device, system and method for identifying tags or objects adapted to be identified which provides sufficient security of verification, i.e. in which the reliability of the identification is sufficiently high.

It is an objective of the present invention to provide such a reading device, system, and method. This objective, and others, is solved by the reading device, method and system as defined by the respective independent claims.

SUMMARY OF THE INVENTION

In a first embodiment of the invention, a reading device for identifying a tag or an object adapted to be identified is provided. The reading device includes a first reading element for reading a first set of identification features located in the tag or the object adapted to be identified, wherein the first reading element is a magneto-optical reading element and a second reading element for reading a second set of identification features located in the tag or the object adapted to be identified. Note that herein where the prepositions "in" or "on" are used to describe the location of identification features with respect to a tag or an object it is also considered the use of the other preposition (for example "in a tag" should also be considered to be "on a tag" and vice versa). The reading device is configured such that a first signal generated from reading the first set of identification features and a second signal generated from reading the second set of identification features are independently used to derive a first signature and a second signature for identifying the tag or object.

In one embodiment, light used for the magneto-optic reading is internally reflected inside the magneto-optical reading element.

In a further embodiment, the magneto-optical reading element comprises at least one optical processing unit and at least one magneto-optical substrate. The at least one optical processing unit comprises a plurality of components, the components include: at least one optical detector, at least one lens, at least one polarizer, at least one light source. The magneto-optical substrate may include an optically transparent (base) substrate, a first coating layer such as a magneto-optic film and a second coating layer, for example reflective layer. The optically transparent (base) substrate, the first coating layer and the second coating layer may be in the form of a layer arrangement as also discussed below). The magneto-optical substrate and the layer arrangement may further include a protective layer. The magneto-optical substrate comprises at least one opening for a direct optical reading of a third set of identification features on the tag or the object adapted to be identified.

In a further embodiment, the components in the optical processing unit and the magneto-optical substrate may have a fixed spatial relationship with respect to each other.

In a further embodiment, the second reading element is selected from a group consisting of a barcode scanner, a radio frequency identification tag reader, a character recognition reader, an optical image capturing system, a gaussmeter, a magnetometer, a fluorescence meter, a residumeter and a transponder.

In a further embodiment, the first reading element comprises an engagement element for positioning the magneto-optical substrate over an area of the first set of identification features. The engagement element substantially surrounds the magneto-optical substrate. The engagement element is essentially complementary in shape to an engagement track in the tag or object thereby forming an interlocking means. The engagement element may be formed as a cavity or recess and the recess has a height of at least about 50 micrometers, at least about 150 micrometers, of at least about 200 micrometers or at least 250 micrometers. The engagement element may also be formed as a protrusion. The protrusion has a height of at least about 50 micrometers, at least about 150 micrometers, of at least about 200 micrometers or at least 250 micrometers. The engagement element has in cross-section a circular shape or a polygonal cross-sectional shape.

In a further embodiment, at least the first reading element is adapted to conform to the tag or object to be identified when brought into contact with the tag or object to be identified. The first reading element may comprise a conformation element facilitating at least the first reading element to conform to the tag or object to be identified when the first reading element is brought into contact with the tag or object to be identified. The conformation element may comprise at least one member such as a spring, a sponge, a suction system, a hydraulic system, or a pneumatic system. The conformation element is adapted to push at least the first reading element against an area to be read during reading. The conformation element may also be adapted to protect the surface of the first reading element from being damaged if the reading device is dropped or is brought against a hard surface. The conformation element may also be designed to allow the first reading element to sink below the level of the engagement element if the first reading element is pushed. The first reading element is housed below the level of the engagement element when not in use but when engaged with the tag or object to be read, the engagement element pushes the first reading element onto the surface of the area to be read. At least the first reading element is distanced from the engagement element allowing the first reading element to conform to the tag or object to be identified when brought into contact with the tag or object to be identified.

In a second embodiment of the invention, a reading device for identifying a tag or an object adapted to be identified is provided. The reading device includes a first reading element for reading a first set of identification features located in the tag or the object adapted to be identified, wherein the first reading element is a magneto-optical reading element wherein the first reading element is adapted to conform to the tag or object adapted to be identified when brought into contact with the tag or object adapted to be identified. Note that herein where the term "magneto-optical reading element" is used, all forms of magneto-optic reading elements are contemplated, particularly those where the magneto-optic reading element is configured such that the light being analyzed to determine the magnetic field of the features is reflected internally within the reading device—the configuration disclosed in U.S. Pat. No. 5,920,538 provides an example of such a configuration.

In one embodiment, the reading device further comprises a second reading element for reading a second set of identification features located in the tag or the object adapted to be identified. The reading device is configured such that a first signal generated from reading the first set of identification features and a second signal generated from reading the second set of identification features are independently used to derive a first signature and a second signature for identifying the tag or the object. Light used for the magneto-optic reading is internally reflected inside the magneto-optical reading element.

In a further embodiment, the magneto-optical reading element comprises at least one optical processing unit and at least one magneto-optical substrate. The at least one optical processing unit may comprise a plurality of components, wherein the components include: at least one optical detector, at least one lens, at least one polarizer, at least one light source. Optionally, the optical processing unit may also comprise at least one beam splitter. The magneto-optical substrate comprises an optically transparent (base) substrate, a first coating layer (for example, a magneto-optic film) and a second coating layer (for example, a reflective layer). The optically transparent (base) substrate, the first coating layer and the second coating layer may be formed as a layer arrangement. The magneto-optical substrate may further comprise a protective layer. The magneto-optical substrate comprises at least one opening for a direct optical reading of identification features and/or alignment marks on a tag or object adapted to be identified. In this context, it is noted that each magneto-optical substrate described herein can include an optically transparent substrate, a first coating layer and a second coating layer which may optionally be formed as a layer arrangement.

In a further embodiment, the components in the optical processing unit and the magneto-optical substrate have a fixed spatial relationship with respect to each other. In case the optically transparent substrate, the first coating layer and the second coating layer of a magneto-optical substrate as described in the present application are formed as a layer arrangement, this layer arrangement and the components in the optical processing units can have a fixed spatial relationship with respect to each other.

In a further embodiment, the second reading element is selected from a group consisting of a barcode scanner, a radio frequency identification tag reader, a character recognition reader, an optical image capturing system, a gaussmeter, a magnetometer, a fluorescence meter, a residumeter and a transponder.

In a further embodiment, the first reading element comprises an engagement element for positioning the magneto-optical substrate over an area of the first set of identification features. The engagement element substantially surrounds the magneto-optical substrate. The engagement element is essentially complementary in shape to an engagement track in the tag or object thereby forming an interlocking means. The engagement element may be formed as a cavity or recess and the recess has a height of at least about 50 micrometers, at least about 150 micrometers, of at least about 200 micrometers or at least 250 micrometers. The engagement element may also be formed as a protrusion. The protrusion has a height of at least about 50 micrometers, at least about 150 micrometers, of at least about 200 micrometers or at least 250 micrometers. The engagement element has in cross-section a circular shape or a polygonal cross-sectional shape.

In a further embodiment, the first reading element comprises a conformation element facilitating at least the first reading element to conform to the tag or object to be identified when the first reading element is brought into contact with the tag or object to be identified. The conformation element comprises at least one spring, a sponge, a suction system, a hydraulic system, a pneumatic system. The conformation element pushes at least the first reading element against an area to be read during reading. The conformation element is adapted to protect the surface of the first reading element from being damaged if the reading device is dropped or is brought against a hard surface. The conformation element is designed to allow the first reading element to sink below the level of the engagement element if the first reading element is pushed. The first reading element is housed below the level of the engagement element when not in use but when engaged with the tag or object to be read, the engagement element pushes the first reading element onto the surface of the area to be read. At least the first reading element is distanced from the engagement element allowing the first reading element to conform to the tag or object to be identified when brought into contact with the tag or object to be identified.

In a third embodiment of the invention, a reading device for identifying a tag or an object adapted to be identified is provided. The reading device includes a first reading element for reading a first set of identification feature located in the tag or the object adapted to be identified, wherein the first reading element is a magneto-optical reading element, the magneto-optical reading element comprises at least one optical processing unit and at least one magneto-optical substrate. The first reading element includes an engagement element for positioning the first reading element over an area of the first set of identification features wherein the engagement element substantially surrounds the first reading element and the engagement element is essentially complementary in shape to an engagement track in the tag or object adapted to be identified, thereby forming an interlocking means. The engagement element is formed as a recess or protrusion.

In a fourth embodiment of the invention, a reading device for identifying a tag or an object adapted to be identified is provided. Thus reading device includes a reading element for reading both magnetic features and optical features located in the tag or the object adapted to be identified. The reading element also includes least one optical processing unit and at least one magneto-optical substrate. The reading element also includes at least one opening for a direct optical reading of optical features and/or alignment marks on the tag or the object adapted to be identified.

In one embodiment of this reading device the at least one optical processing unit includes a plurality of components, wherein the components include: at least one optical detector, at least one lens, at least one polarizer, at least one light source.

The magneto-optical substrate of such reading device may include an optically transparent substrate, a first coating layer and a second coating layer. The first coating layer maybe a magneto-optic film or films and the second coating layer may be a reflective layer. The magneto-optical substrate may further include a protective layer (in line with the above disclosure, the optically transparent substrate, the first coating layer and the second coating layer can be provided as a layer arrangement.

In one embodiment of the reading device, the components in the optical processing unit and the magneto-optical substrate may have a fixed spatial relationship with respect to each other. In case a layer arrangement of the optically transparent magneto-optic substrate, a first coating layer and a second coating layer, this layer arrangement may have a fixed spatial relationship with respect to one or more of the other components of the optical processing unit.

In a further embodiment, the at least one opening of the reading element allows the optical detector to obtain within the same image both magnetic and optical information. The optical detector of the reading element may be any suitable imaging unit, including but not limited to a CMOS chip or a CCD chip.

In one embodiment of the reading device the at least one opening that allows direct optical reading of optical features and/or alignment marks on the tag or the object adapted to be identified is formed in the magneto-optical substrate. This at least one opening may be formed by patterning the one or more coating layers of the magneto-optical substrate.

In another embodiment, the at least one opening that allows direct optical reading of optical features and/or alignment marks on the tag or the object adapted to be identified is formed by an optically transparent portion of the reading element adjacent to the magneto-optical substrate.

In a fifth embodiment of the invention, a method of identifying a tag or an object adapted to be identified is provided. The method includes reading both magnetic features and optical features with a reading element. The reading element includes at least one optical processing unit and at least one magneto-optical substrate; and the reading element further includes at least one opening for a direct optical reading of said optical features on the tag or the object adapted to be identified.

In one embodiment of this method the magnetic features include a first set of identification features located in the tag or object to be identified.

In a further embodiment, the method includes generating a signal from the first set of identification features located in the tag or the object to be identified. The first set of identification features used in such a method may include a disordered arrangement of magnetic or magnetisable particles included in an identification layer of the tag or object. The disordered arrangement of magnetic or magnetisable particles may comprise a plurality of randomly distributed magnetic or magnetisable particles. The magnetic particles may comprise any high coercivity material or any ferrimagnetic material, antiferromagnetic material, ferromagnetic material or domains of varying magnetic properties within a continuous material (including voids causing variable magnetic properties) and combinations thereof as disclosed herein and explained with reference to the other embodiments of the invention.

In one embodiment of a method of this fifth embodiment, the optical features read are alignment marks and/or a second set of identification features.

In a further embodiment, the alignment marks may be used to determine the orientation and position of the reading of the first set of identification features relative to a reference reading used to obtain a reference signature of the first set of identification features located in the tag or the object to be identified.

In another embodiment, the information from both the magnetic features and optical features are obtained from the same image that is captured by an optical detector. The optical detector used in this method may be an imaging unit such as a CMOS chip or a CCD chip.

In a sixth embodiment of the invention, a method of identifying a tag or an object adapted to be identified is disclosed. The method includes generating a first signal from a magneto-optical reading of a first set of identification features located in the tag or object adapted to be identified only, wherein a first set of identification features includes a disordered arrangement of magnetic or magnetisable particles included in an identification layer of the tag or object. The first signal generated from reading the first set of identification features as such is used to derive a first signature for identifying the tag or object.

In one embodiment of this method, the disordered arrangement of magnetic or magnetisable particles comprises a plurality of randomly distributed magnetic or magnetisable particles. The magnetic particles may include a ferrimagnetic material, an antiferromagnetic material, a ferromagnetic material or domains of varying magnetic properties within a continuous material (including voids causing variable magnetic properties) and combinations thereof. The ferromagnetic material may be selected from the group consisting of MnBi, CrTe, EuO, $CrO_2$, MnAs, Fe, Ni, Co, Gd, Dy, Nd corresponding alloys and oxides of Fe, Ni, Co, Sm, Gd, Dy, and combinations thereof. An exemplary high coercivity material is a neodymium magnet comprising Nd, Fe and B.

In a further embodiment, the method further includes generating a second signal from reading a second set of identification features. The first signal generated from reading the first set of identification features and the second signal generated from reading the second set of identification features are independently used to derive a first signature and a second signature for identifying the tag or object. The second set of identification features comprises a chip, a magnetic strip, a serial number, or an optical marking. The chip is a radio frequency identification tag or a contact-based memory chip. The optical marking is a linear barcode, 2D barcode, matrix barcode or a hologram. The optical marking may not be visible to the naked human eye, but detectable in the ultraviolet or infrared regime of the electromagnetic spectrum.

In a further embodiment, the first set of identification features and the second set of identification features are located within an engagement track in the tag or object adapted to be identified. The first set of identification features and the second set of identification features may be on the same plane. Alternatively, the first set of identification features and the second set of identification features may be on different planes.

In a seventh embodiment of the invention, a method of identifying a tag or an object adapted to be identified is provided. The method includes generating a first signal from magneto-optical reading of a first set of identification features located in the tag or the object adapted to be identified, generating a second signal from reading a second set of identification features located in the tag or the object adapted to be identified, wherein the first signal generated from reading the first set of identification features and the second signal generated from reading the second set of identification features are independently used to derive a first signature and a second signature for identifying the tag or the object.

In one embodiment of this method, the first set of identification features comprises a disordered arrangement of magnetic or magnetisable particles. The disordered arrangement of magnetic or magnetisable particles may comprise a plurality of randomly distributed magnetic or magnetisable particles. The magnetic particles may comprise a ferrimagnetic material, an antiferromagnetic material, a ferromagnetic material or domains of varying magnetic properties within a continuous material (including voids causing variable magnetic properties) and combinations thereof. The ferromagnetic material may be selected from the group consisting of MnBi, CrTe, EuO, CrO$_2$, MnAs, Fe, Ni, Co, Gd, Dy, corresponding alloys and oxides of Fe, Ni, Co, Sm, Gd, Dy, and combinations thereof. An exemplary high coercivity material is a neodymium magnet comprising Nd, Fe and B.

In a further embodiment, the second set of identification features comprises a chip, a magnetic strip, a serial number, or an optical marking. The chip is a radio frequency identification tag or a contact-based memory chip. The optical marking is a linear barcode, 2D barcode, matrix barcode or a hologram. The optical marking may not be visible to the naked human eye, but detectable in the ultraviolet or infrared regime of the electromagnetic spectrum.

In a further embodiment, the first set of identification features and the second set of identification features are located within an engagement track in the tag or object adapted to be identified. The first set of identification features and the second set of identification features may be on the same plane. Alternatively, the first set of identification features and the second set of identification features may be on different planes.

In an eighth embodiment of the invention, a method of dispensing a tag is provided. The method includes locating an alignment mark on the tag, temporarily physically engaging the tag with a reading device, reading a first set of identification features located in the tag, wherein the first set of identification features comprises a disordered arrangement of magnetic or magnetisable particles, adhering the tag on a substrate, releasing the tag from the reading device.

In one embodiment of this method, the method further comprises determining a scan area of the reading device. The method may also further include reading a second set of identification features located in the tag or the object adapted to be identified.

In a further embodiment, the substrate forms part of the tag or the object adapted to be identified.

In a ninth embodiment of the invention, a method of manufacturing a tag is provided. The method includes providing a film of material with an adhesive layer, preferably forming at least one alignment mark on the film of material indicating the direction the tag should be read, forming a first set of identification features on the film of material, wherein the first set of identification comprises a disordered arrangement of magnetic or magnetisable particles, determining the magnetic field strength of the disordered arrangement of magnetic or magnetisable particles, assessing if the determined magnetic strength is within an acceptable value, depositing a cover layer over the disordered arrangement of magnetic or magnetisable particles, forming a second set of identification features on the cover layer and forming to a desired shape. The cover layer may be in the form of a film which is laminated on top of the second set of identification features or it may be a liquid or vapour coating layer such as an ink, lacquer, vapour-deposited metal or ceramic coating.

In one embodiment of this method, the disordered arrangement of magnetic or magnetisable particles comprises a plurality of randomly distributed magnetic or magnetisable particles. The magnetic particles may comprise a ferrimagnetic material, an antiferromagnetic material, a ferromagnetic material or domains of varying magnetic properties within a continuous material (including voids causing variable magnetic properties) and combinations thereof. The ferromagnetic material may be MnBi, CrTe, EuO, CrO$_2$, MnAs, Fe, Ni, Co, Gd, Dy, corresponding alloys and oxides of Fe, Ni, Co, Sm, Gd, Dy, and combinations thereof. An exemplary high coercivity material is a neodymium magnet comprising Nd, Fe and B.

In a further embodiment, the second set of identification features comprises a chip, a magnetic strip, a serial number, or an optical marking. The chip is a radio frequency identification tag or a contact-based memory chip. The optical marking is a linear barcode, 2D barcode, matrix barcode or a hologram. The optical marking may not be visible to the naked human eye, but detectable in the ultraviolet or infrared regime of the electromagnetic spectrum.

In a further embodiment, the first set of identification features is positioned adjacent the second set of identification features. Alternatively, the second set of identification features overlaps the first set of identification features.

In a further embodiment, the alignment mark comprises optical marks or magnetic marks. The alignment marks comprises arrows or alphanumeric characters.

In a tenth embodiment of the invention, an identification system for identifying a tag or an object adapted to be identified is disclosed. The system includes a tag for identifying an object to which the tag may be attached and a reading device for reading at least a first set of identification features located in the tag or object adapted to be identified.

In one embodiment of this system, the first signal obtained from the first reading element is normalized against a signal obtained from the same first reading element in the absence of a substantial magnetic field. The normalization is achieved by subtracting the signal obtained from the first reading element in the absence of a substantial magnetic field from the signal obtained from the first reading element when engaged with the area to be read. The normalization further comprises identifying portions of data in the signal being read which may be less reliable than the other data because of damage or variations within the reading element, said less reliable data being processed differently to the other data.

In a further embodiment, the first signal obtained from the first reading element is processed by setting all data in the signal which is below a predefined threshold to a predefined value or by ignoring the data and only storing data (including the physical positioning of the data) that is above the predefined threshold.

In a further embodiment, the identification system further comprises a data storage medium in which a reference signature obtained from a reference reading of the identification tag is stored. The data storage medium for the pre-stored reference signature is a data storage medium remote with respect to the reading device. The data storage medium for the pre-stored reference signature may be located in the tag which is attached to the object. Alternatively, the data storage medium for the pre-stored reference signature may be located in the object. The data storage medium is a magnetic strip, a memory chip, a media disk, a hard disk, a smart-card, a RAM module, a magnetic tape or conventional optical means such as a 2D barcode or bitmap.

In a further embodiment, the identification system further comprises a data processing device remote with respect to the reading device, wherein the data processing device is adapted to perform the data processing in order to match the read signature with the pre-stored reference signature.

In an eleventh embodiment of the invention, structures for tags are considered. Exemplary such structures preferably include a protective layer covering the magnetic features comprising the first set of identification features, with the second set of identification features being positioned near the first set of identification features (often directly on top of the protective layer). Further, such structures may be formed to have a degree of compliance in them such that the tag itself may to some extent comply to the surface of the reading element. This facilitates good contact between the reading element and the tag even in the case where the surface of the reading element is rigid and planar but the tag is attached to rough (for example undulating) surface or where a piece of dust may otherwise separate the reading element from the tag over a sizable area.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 8A and FIG. 8B respectively shows a top view and a perspective view of magnetic particles used in a tag in accordance with an embodiment of the invention;

FIG. 15A shows a tag adapted to have an optical barcode and a magnetic fingerprint region read simultaneously and FIG. 15B shows respective areas in which an optical reading element and a magneto-optical reading element may need to scan in order to read the respective optical barcode and the magnetic fingerprint region in accordance with another embodiment of the invention;

FIG. 16A shows a desired scan area of a tag using a reading device in accordance with an embodiment of the invention; FIG. 16B shows a scan area of a tag when the reading device is misaligned; FIG. 16C shows graphically how signals from an initial reading and a subsequent reading can be compared in order to authenticate the tag's identity;

FIG. 17A shows a cross-sectional view of a single magnetic particle on a substrate covered by a cover layer, the magnetic particle having a magnetic field parallel to the plane of the substrate and FIG. 17B shows a magnetic particle having a magnetic field perpendicular to the plane of the substrate in accordance with an embodiment of the invention;

FIG. 20A shows a method of fabricating a tag via extrusion and attaching the resulting tag to an object adapted to be identified in accordance with an embodiment of the invention; FIG. 20B shows a resultant tag in accordance with an embodiment of the invention;

FIG. 25A to 25D shows a method of reading a tag on an uneven surface using a magneto-optical reading element in accordance with another embodiment of the invention;

FIG. 35A shows a method of method of dispensing tags with magnetic fingerprint regions onto items of value adapted to be identified in accordance with another embodiment of the invention; FIG. 35B and FIG. 35C show the item of value before and after a tag has been dispensed in accordance with another embodiment of the invention FIG. 36A shows a cross-sectional view of a tag in accordance with one embodiment of the invention; FIG. 36B shows an isometric view of the tag shown in FIG. 36A;

FIG. 37A shows a process of a tag being attached to an item of value in accordance with a further embodiment of the invention; FIG. 37B shows a tag being attached to an item of value in accordance with a further embodiment of the invention;

FIG. 38A shows a bottle sealed by a lid and being straddled by a tamperproof label in accordance with an embodiment of the invention; FIG. 38B shows a plan view of a label which comprises a tag and a human readable number; FIG. 38C shows a cross-sectional view of a label in accordance with an embodiment of the invention;

FIG. 40A and FIG. 40B show the process of reading the fingerprint region of a label according to an embodiment of the invention where the surface of the label is not flat and where the label is not sufficiently compliant to ensure good contact with the flat surface of a magneto-optical reading element in accordance with an embodiment of the invention;

FIG. 45A shows an optical top view of a tag that is being produced in accordance with an embodiment of the invention; FIG. 45B shows a magnetic top view of a tag that is being produced in accordance with an embodiment of the invention; FIG. 45C shows a configuration of a reading element which may be used to read the optical and magnetic information on the tag in accordance with an embodiment of the invention; FIG. 45D shows an image of the tag taken using the reading element of FIG. 45C in accordance with an embodiment of the invention;

FIG. 46C shows a superposition of the grid pattern from FIG. 46A and the datamatrix code from FIG. 46B in accordance with an embodiment of the invention;

DESCRIPTION

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

In an embodiment of the invention, a reading device is provided that is able to read individual magnetic particles and considers their random position in a fixed area such that the area possesses a non-repeatable pattern in fine resolution.

Figure 1:
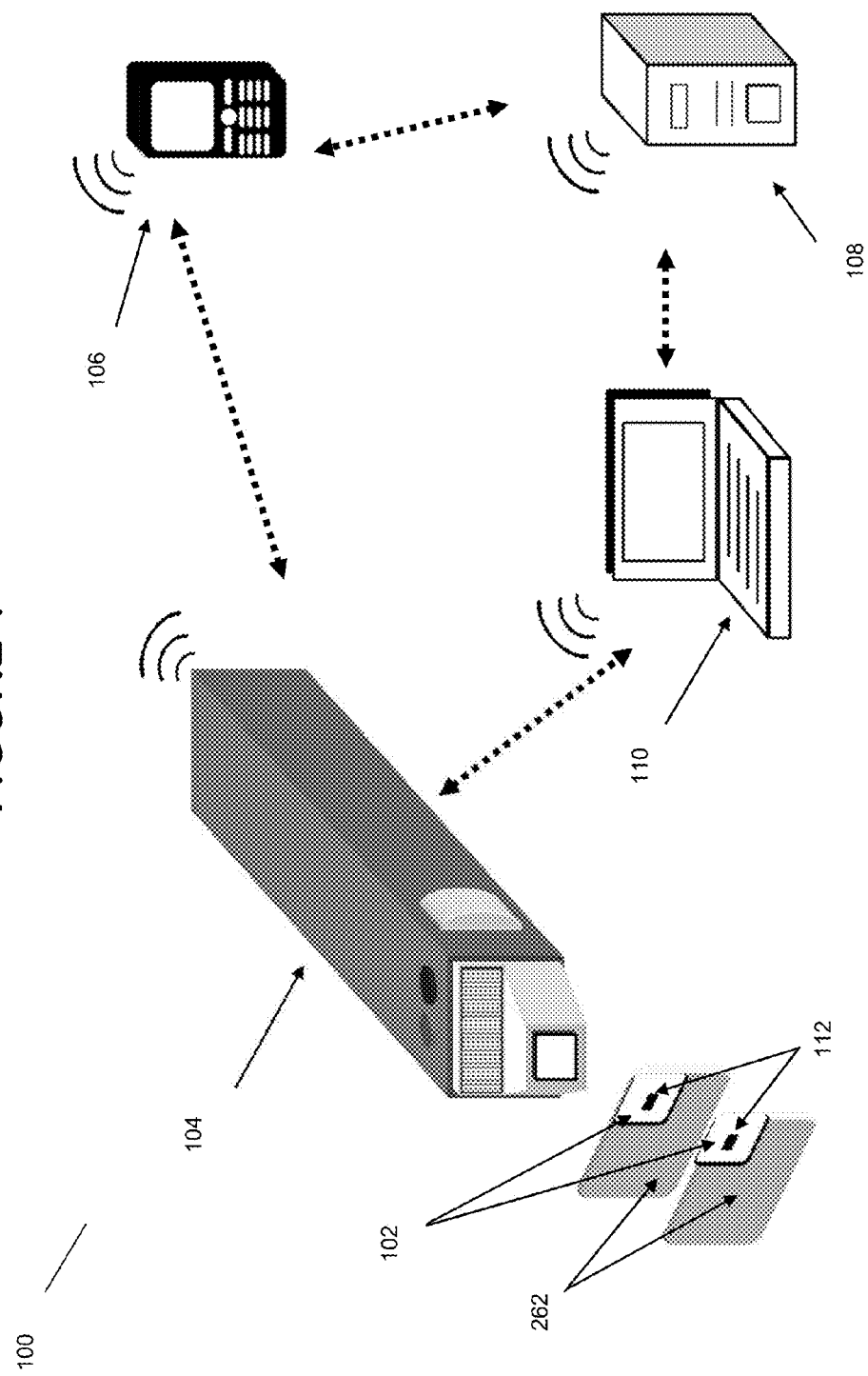
FIG. 1 shows an anti-counterfeit system utilizing a reading device in accordance with an embodiment of the invention.

FIG. 1 shows an anti-counterfeit system 100 utilizing a reading device 104 in accordance with an embodiment of the invention. Note that although the system 100 shown here shows a basic reading device 104 communicating with a data server 108 via a mobile device 106 (such as a mobile phone) or a computer 110, it is also contemplated that the reading device 104 may itself be more elaborate and may, for example, communicate to a database or data server 108 via methods such as using data cables, local area networks, Bluetooth, Worldwide Interoperability for Microwave Access (WiMAX) technology, or even including using a built in General Packet Radio Service (GPRS) chip or 3G/Universal Mobile Telecommunication System (UMTS) chip to itself act as a mobile telephonic device to communicate to the data server 108. The reading device 104 may also include methods for direct communication with the user, for example a screen and a keyboard which may allow the user to read and enter information on the reading device 104 itself. The anti-counterfeit system 100 may include at least one tag 102, a reading device 104, a mobile device 106 or a computer 110 (if no direct communication means between the reading device 104 and data server 108 exists), and a remote data server 108. Each tag 102 comprises at least one set of identification features. Some examples of identification features include a disordered array of magnetic or magnetisable particles, a magnetic strip, a serial number, an optical marking such as a bar-code or a hologram. The identification features as shown in FIG. 1 includes a disordered array of magnetic or magnetisable particles forming a magnetic fingerprint region 112. Each tag 102 is attached to an object or an item of value 262 to be identified or adapted to be identified. The reading device 104 is used for reading at least one set of identification features on the tag 102. The reading device 104 has the capability to send a signal generated from reading the set of identification features to the mobile device 106 or the computer 110. Encrypted signals from the reading device 104 can be sent out to the mobile device 106 or the computer 110 either through a wireless connection or a wired connection. Some examples of wireless connection include Bluetooth and Wi-Fi and some examples of wired connection include Recommended Standard 232 (RS232) and Universal Serial Bus (USB). The computer 110 can be a personal computer, a workstation a laptop or palmtop. The mobile device 106 can be a mobile (cellular) phone or a personal digital assistant (PDA) for example. The mobile device 106 or the computer 110 can connect to the remote data server 108, via the internet. The mobile device 106 connects via a local network using General Packet Radio Service (GPRS) or 3G/UTMS technology, for example.

Figure 2:
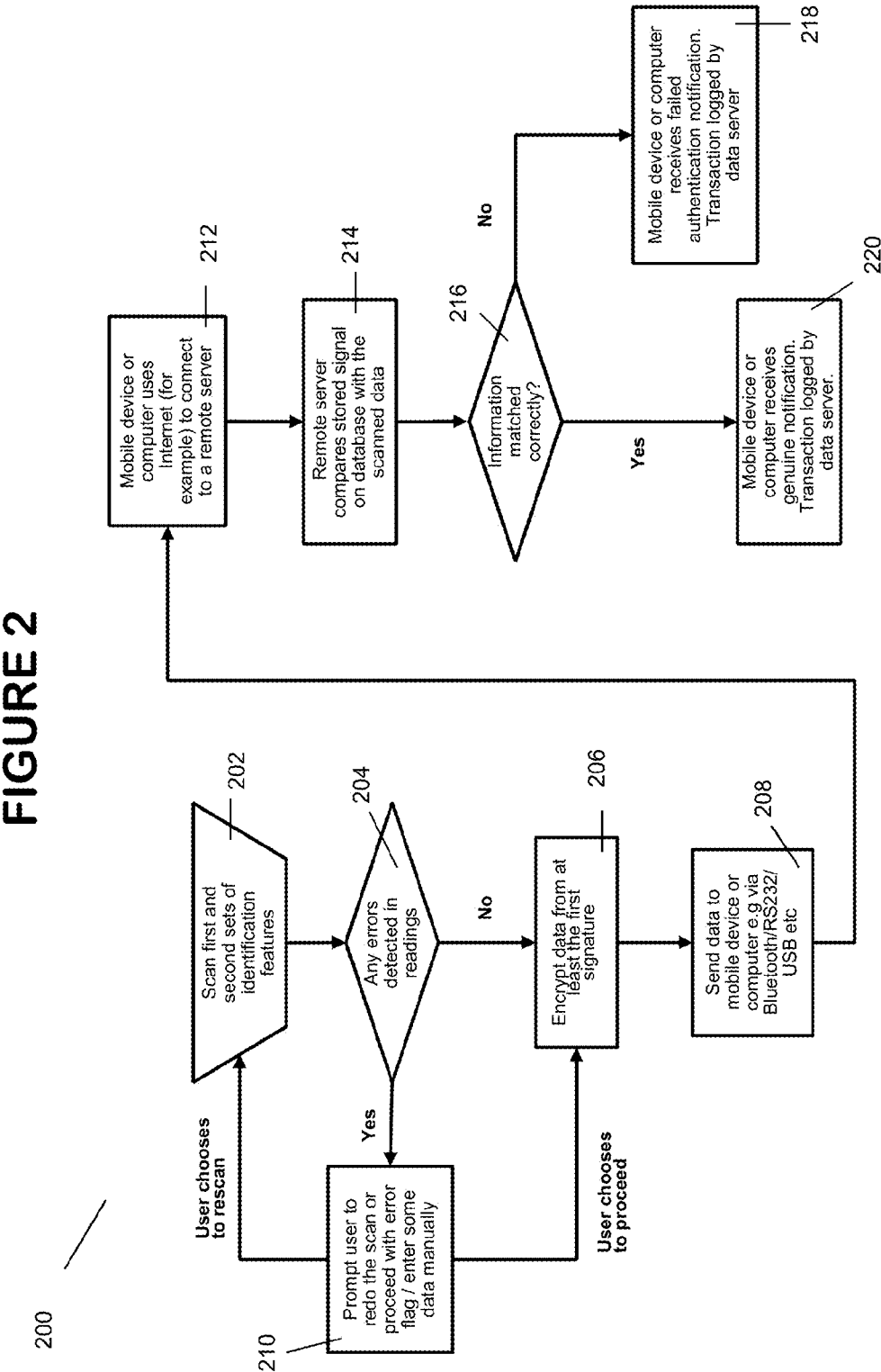
FIG. 2 shows a flow-chart illustrating an authentication process using the reading device in accordance with an embodiment of the invention.

FIG. 2 shows a flow-chart 200 illustrating an authentication process using the reading device 104 in accordance with an embodiment of the invention. Firstly in 202, a reading device 104 is used to scan a first set of identification features and a second set of identification features. The scanning of the first set of identification features and the second set of identification features may be performed in a single step or in two steps. The first set of identification features may include magnetic information such as a magnetic fingerprint region 112 and the second set of identification features may include optical information such as a linear barcode, 2D barcode, or matrix barcode such as a Data Matrix (all such types of barcodes being referred to generally as a barcode herein). The scanning of the first set of identification features and the second set of identification features takes into account the relative position of the first set of identification features in relation to the second set of identification features. Then in 204, the reading device 104 checks the read signals to see if any errors can be detected in the readings. If the reading device 104 detects errors, in 210, it provides a prompt to the user to choose to either redo the scan of the first set of identification features and the second set of identification features or (in the case the error is not fatal) to proceed with the error flag and data transmission. If the user chooses to continue with the data transmission, the user may for example also be prompted to manually enter some of the data using the mobile device or computer keyboard (for example if a barcode is misread, the user may opt to type the barcode number in rather than rescan). Thereafter, in 206, at least the signals or data generated from reading the first set of identification features (i.e. magnetic fingerprint region 112) are encrypted. Optionally, the signals or data generated from reading the second set of identification features are also encrypted. In 208, the at least partially encrypted data are sent to a mobile device 106 or a computer 110 via a wired or a wireless connection. In 212, the mobile device 106 connects to a remote data server 108 via the internet using, for example, GPRS or the computer 110 connects to the remote server 108 through an internet connection. In 214, the remote server 108 compares a stored signal (from a prior scan of the magnetic fingerprint region and/or the optical information) on database with the scanned signal from the magnetic fingerprint region. In 216, the server determines if the stored signal and the scanned signal can be matched (here a matching threshold is used to determine if the data matches to an adequate degree of certainty or not). If the respective signals do not match, in 218, a failed authentication notification is sent to the mobile device 106 or computer 110. If the information matches, in 220, the mobile device 106 or computer 110 receives a successfully matched notification. This notification may also be accompanied by additional information about the tag or object that may be of use to the user. Note that as in FIG. 1, it is contemplated that the reading device 104 may be more elaborate and may itself be able to communicate with the remote data server 108 without the peripheral mobile device or computer. This more elaborate reading device 104 may include a keyboard and display screen for direct communication with the user. Note further that the term "signal" or "signals" refer to the data read from identification features—therefore a signal may, for example, be an image representing the magnetic features of the fingerprint region.

Figure 3:
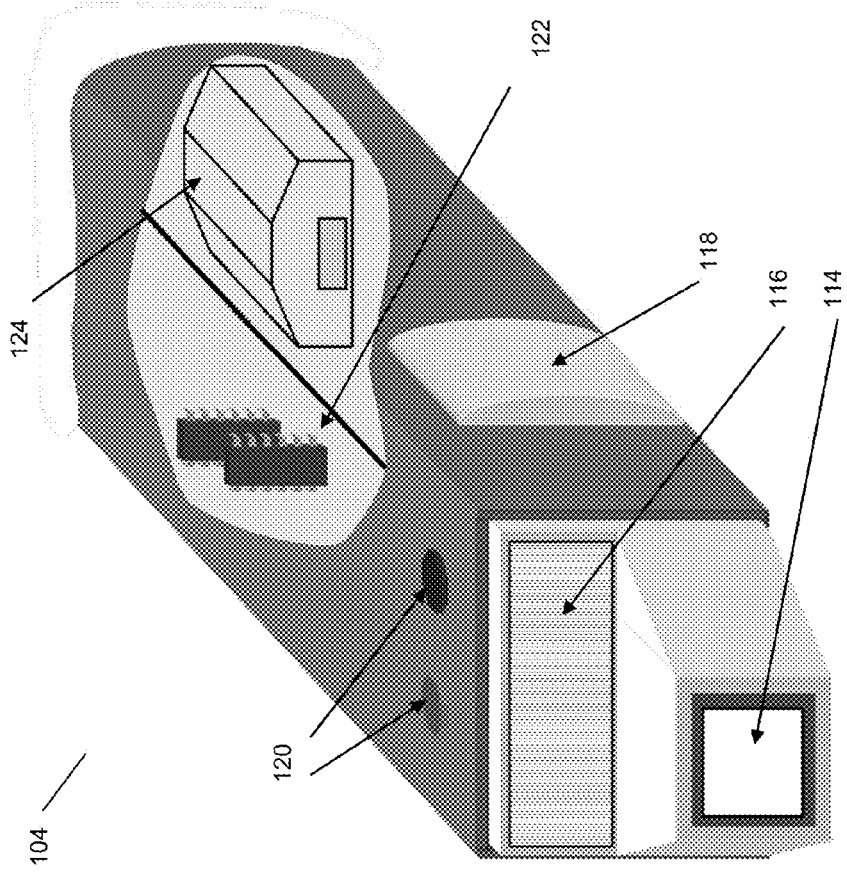
FIG. 3 shows a reading device in accordance with an embodiment of the invention.

FIG. 3 shows a reading device 104 in accordance with an embodiment of the invention. The reading device 104 includes a first reading element 114, a second reading element 116, a switch 118, two light-emitting diode (LED) indicators 120, two microcontroller chips 122, a portable power source 124 and communication electronics and software (for example a Bluetooth module, Wi-Fi module, USB module or RS232 module). The first reading element 114 is used for reading a first set of identification features on a tag 102. The first reading element 114 may be a magneto-optical reading element. The second reading element 116 is used for reading a second set of identification features on the tag 102. The second reading element 116 may be a barcode scanner, a radio frequency identification (RFID) tag reader, a character recognition reader, an optical image capturing system, a gaussmeter, a magnetometer, a fluorescence meter, a residumeter or a transponder. The switch 118 is used for activating or deactivating the reading device 104 and may be positioned at any suitable position on the reading device 104. The LED indicator 120 provides an indication of the status of the reading device 104, for example, if it is on, reading data or transmitting data. Each microcontroller chip 122 is a single integrated circuit, including a processing unit, input and output interfaces, a serial communication interface, a storage device for example. The number of required microcontroller chips 122 or LED indicators 120 depends on the requirements of the reading device 104. The portable power source 124 is typically a normal battery or a rechargeable battery for example (but if communication means such as USB are used, the reading device 104 may be powered via the USB cable).

Figure 4:
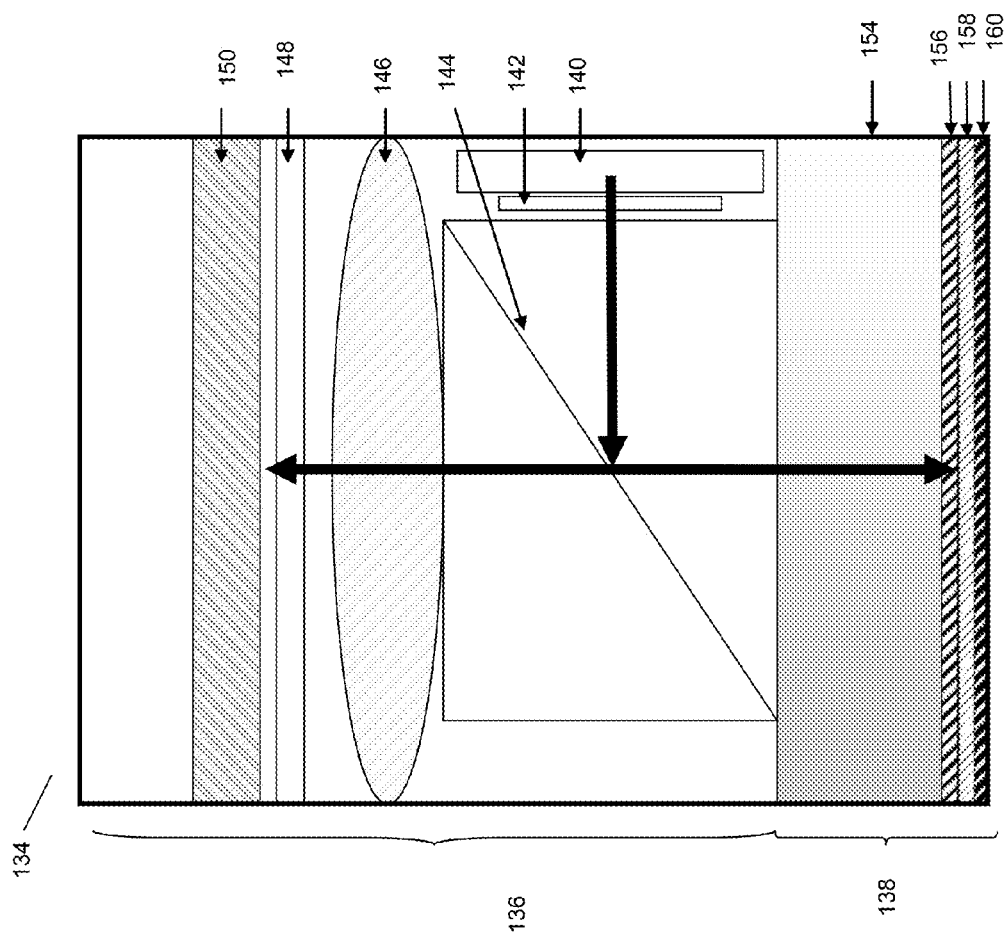
FIG. 4 shows a cross-sectional view of a suitable reading element based on prior art.

FIG. 4 shows a cross-sectional view of a suitable reading element 134 based on prior art. Note that this reading element 134 or any of the reading elements shown in FIGS. 4 to 7 may be suitable to be used as the first reading element 114 shown in FIG. 3. The reading element 134 in FIG. 4 includes an optical processing unit 136 and a magneto-optical substrate 138. The optical processing unit 136 includes a plurality of components, the components including a light source 140, two polarizers 142, 148, (if the light source does not emit polarized light, then either two polarizers as shown, are necessary, or it is also possible to use one polarizer combined with a polarizing beam splitter, for example) a beam splitter 144, a lens system 146 (although just one lens is shown in the FIG. 4, it will be apparent to anyone skilled in the art that, in general, a series of lens elements may be needed to achieve a good quality image) and at least one imaging unit such as an optical detector 150 (for example a charge-coupled device (CCD), or a complementary metal-oxide-semiconductor (CMOS) chip which is able to take an image). Note that configuration shown and described in relation to FIGS. 4 to 7 are merely for illustration and the exact configuration may vary, for example the positioning of the polarizer 148 and the lens system 146 can be interchanged or the polarizer 148 can be placed in between the lens system 146. Further, some of the lens within the lens system 146 may be positioned in front of the beam splitter 144 or that the beam splitter 144 may be within the series of lens within the lens system 146.

The magneto-optical substrate 138 comprises an optically transparent (base) substrate 154 and a plurality of magneto-optic coatings such as a first coating layer 156, a second coating layer 158 and a protective layer 160. Various suitable arrangements are possible. For example, as disclosed in U.S. Pat. No. 5,920,538, the optically transparent substrate 154 can be a mono-crystalline garnet (such as a gadolinium gallium garnet which may further contain other components such as scandium), the first coating layer or magneto-optic film(s) 156 may be a Faraday rotator (comprising, for example, a ferrite-garnet film), the second coating layer or reflective layer 158 can be a Kerr rotator (comprising, for example, multiple layers of platinum or cobalt or platinum-nickel and cobalt with small coercivity or monolayers of GdFe or GdFeCo), wherein the second coating layer 158 may be further coated with a protective layer 160. Other configurations of magneto-optical layers may be used, for example the first coating layer 156 may comprise a magneto-optic film or films of $(Y,Bi)_3(Fe,Ga,Al)_5O_1$, for example, while the reflective layer 158 may be any reflective coating (such as chromium). Depending on the strength of the mirror layer a protective layer 160 may also be present. Illustrative examples of suitable magneto-optic films are provided by T. Aichele et at Cryst. Res. Technol. 38, No. 7-8, 575-587 (2003).

The light source 140 may be a polarized source or a non-polarized source. Some examples light sources include a laser, an incandescent lamp, an arc lamp, a metal halide lamp and a light emitting diode (LED). Further, the light source 140 may be monochromatic, although other options such as a white light source may also be suitable. Light from the light source 140 passes through a first polarizer 142 and is then incident on the beam splitter 144. A significant proportion of the light is reflected by the beam splitter 144 towards the magneto-optical substrate 138. This light is reflected by one or more of the coatings 156, 158 and 160 and travels back towards the beam splitter 144. A significant proportion of the light passes through the beam splitter 144, travels through the lens system 146 and the second polarizer 148 before it reaches the optical detector 150 which captures an image representative of the magnetic fields present at the coating layers 156, 158, 160. Note that although in FIGS. 4 to 7 the light path is generally represented by a single arrow, this is not intended to imply that the light only travels along that single path, generally the light may be over an area wide enough to image the desired area of the magneto-optical substrate 138. Note further that the second polarizer 148 is rotated with respect to the polarization of the incoming light (in FIG. 4 the "polarization of the incoming light" means the polarization immediately after the light has passed through the first polarizer 142). The second polarizer 148 may be tuned with respect to the polarization of the incoming light (or vice versa) to ensure the maximum image contrast depending on the magnetic fields being measured. Note that when a polarized source is used, only one polarizer is needed.

The protective layer 160 serves to protect the first coating layer or magneto-optic film 156 and the second coating layer or reflective layer 158 from any damage. The protective layer 160 may be diamond like carbon (DLC) or tetrahedral amorphous carbon (ta-C) but not so limited. The thickness of the protective layer 160 is in the range of a few nanometers to a few microns, depending on the chosen material and its internal stresses, but not so limited.

The components in the optical processing unit 136 and magneto-optical substrate 138 (or the layer arrangement in the magneto-optical substrate 138) may have a fixed spatial relationship with respect to each other. By "fixed spatial relationship" as used in the context of the present invention it is meant that it is preferable that at least the main optical components such as the optical detector, the lens system, the one or more polarizer and the magneto-optical substrate (illustrated in FIG. 4 by the optical detector 150, the lens system 146, the polarizers 142, 148, and the magneto-optical substrate 138) are all fixed with respect to each other such that they may be considered as forming a solid unit or module, i.e. the reading element, 134. Note that the reading element 134 utilizes magneto-optical reading of the tag 102 wherein light is internally reflected inside the reading element 134. This means that the light being used to analyze the magnetic fields does not reflect off the surface of the tag 102.

Figure 5:
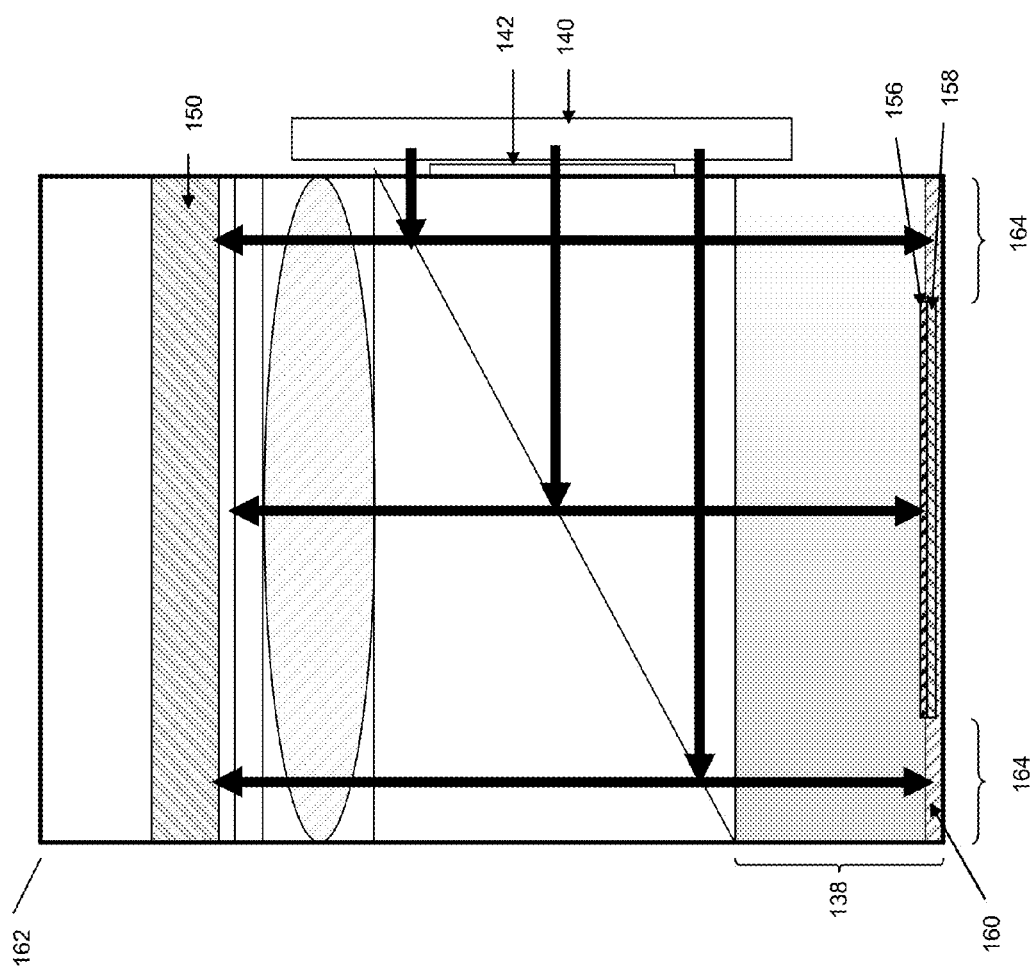
FIG. 5 shows a cross-sectional view of a reading element in accordance with an embodiment of the invention.

FIG. 5 shows a cross-sectional view of a reading element 162 in accordance with an embodiment of the invention. This reading element 162 is adapted to read both magnetic and optical information. The reading element 162 includes an imaging unit/optical detector 150 such as CCD chip or a CMOS chip. The reading element 162 also includes openings 164 on both sides of a magneto-optical substrate 138 for a direct optical reading of identification features on a tag 102 or object 262 adapted to be identified. Preferably, the protective layer 160 extends across the base of the reading element 162 but the magneto-optic film 156 and the reflective layer 158 only cover the middle section of the reading element 162. The openings 164 allow the light rays to escape in order to capture any optical image positioned adjacent to the magnetic fingerprint region 112. As mentioned before, the arrows indicating the light path are for illustration purposes only and in general the light will actually flood the entire area to be read (both that to be read magnetically and that to be read optically). In one embodiment, the protective layer 160 may be transparent.

Figure 6:
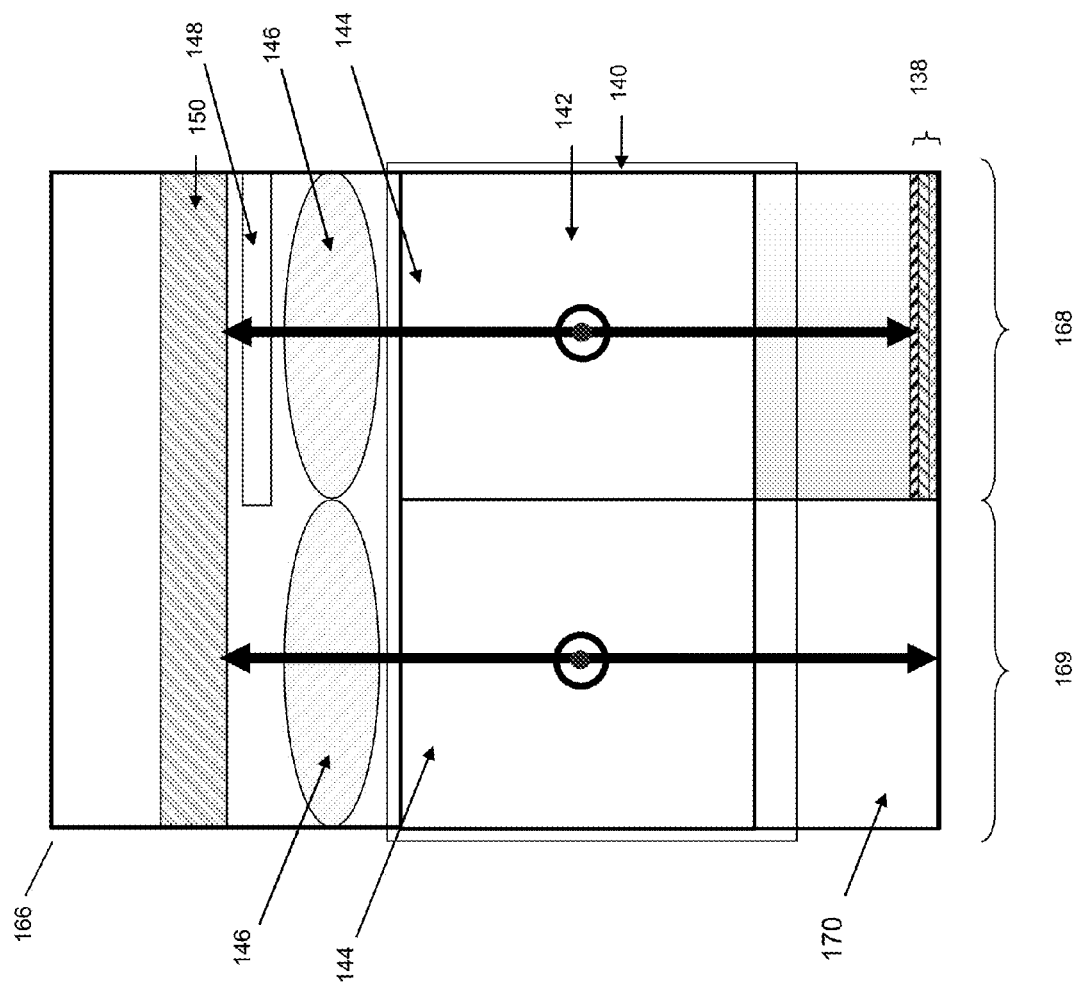
FIG. 6 shows a cross-sectional view of a reading element in accordance with another embodiment of the invention.

FIG. 6 shows a cross-sectional view of a reading element 166 in accordance with another embodiment of the invention. This reading element 166 is adapted to read both magnetic and optical information. The reading element 166 has two separate columns 168, 169. The first column 168 is used for magneto-optical imaging and the second column 169 is used for optical imaging. In this asymmetrical arrangement, the first column 168 has a similar arrangement to that as shown in FIG. 4. The second column 169 includes a clear window or other such optically transparent opening 170 instead of a magneto-optical substrate 138. The window 170 is thus formed in a portion of the reading element adjacent to the magneto-optical substrate 138. In this FIG. 6 the light source 140 is at the back of the reading element 166 as shown. The small filled circles surrounded by the large empty circles indicate that the light from the light source 140 is initially shining out of the plane of the page towards the observer. Each of the first column 168 and the second column 169 has its own beam splitter 144 and each beam splitter 144 in this view is shown as a hollow box. The magneto-optical imaging column 168 is shown as having polarizers 142 and 148, but polarizers may not generally be necessary for the optical imaging column 169, and as such they are not shown for the optical imaging column 169. The imaging unit/the optical detector 150 is depicted as a single (shared) detector in FIG. 6. It is however also possible to have separate two more optical detectors in the reading element. The columns 168, 169 may share a single light source 140 or it may be desirable to have separate light sources for each column. Similarly, the columns 168, 169 may have separate lens systems 146 as shown or alternatively they may share a common lens system.

Figure 7:
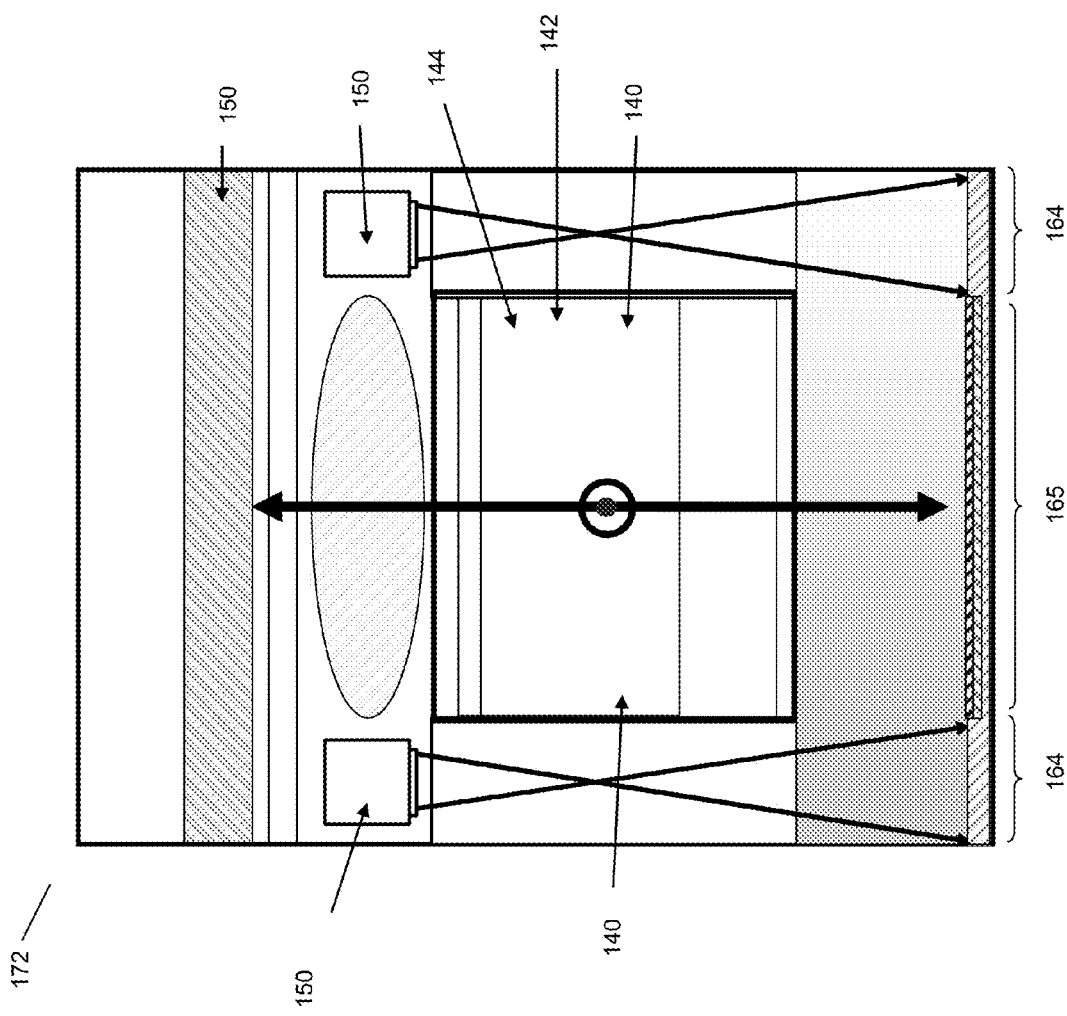
FIG. 7 shows a cross-sectional view of a reading element in accordance with a further embodiment of the invention.

FIG. 7 shows a cross-sectional view of a reading element 172 in accordance with a further embodiment of the invention. This reading element 172 is adapted to read both magnetic and optical information. The reading element 172 has a light source 140 and a first polarizer 142. The reading element 172 has a similar arrangement as shown in FIG. 5 but includes an additional light source 140 and an additional optical detector 150 on the other side of the magneto-optical imaging column 168. The light source 140 and optical detectors 150 may include their own built in lens system (as shown) or may require external lens systems. The reading element 172 is not limited to just two additional light sources 140 and optical detectors 150 but may include only one or a plurality of light sources 140 and optical detectors 150 depending on requirements. The magneto-optical substrate 138 has two openings 164 corresponding to the number of light source 140 and optical detectors 150, each opening 164 allowing light to pass through the magneto-optical substrate 138 for a direct optical reading of identification features on a tag 102 or object 262 adapted to be identified. Like the reading element 166 in FIG. 6 the light source 140 at least for the magneto-optical imaging column 168 in FIG. 7, is shown as being behind the reading element 172. The small filled circles surrounded by the large empty circles indicate that the light from the light source 140 is initially shining out of the plane of the page towards the observer.

FIG. 8A and FIG. 8B respectively show a top view and a perspective view of magnetic particles 176 (preferably of high magnetic coercivity) used in a tag 102 in accordance with an embodiment of the invention. To obtain a clear magneto-optical signal, particles 176 of high coercivity magnetic materials forming the magnetic fingerprint region 112 should be used. FIG. 8B shows that in this embodiment, the magnetic particles 176 form a layer sandwiched between a base layer 192 and a cover layer 194. The base layer 192 and cover layer 194 are generally formed from films of material, with the base layer 192 providing a support for the magnetic particles 176 and the cover layer 194 providing protection from the environment and from abrasion. The maximum thickness of the cover layer 194 that can be used is dependent on the strength of the magnetic fields produced by the magnetic particles 176 (the strength of the magnetic field is itself a function, for example of the remnance magnetization of the magnetic particles 176, their size, the orientation of the magnetic particles 176 and the direction of magnetism), the sensitivity of the reading element being used to read the magnetic fields and the expected resolution of the overall system.

The magnetic particles 176 may include a high coercivity material. An exemplary high coercivity material is a neodymium magnet comprising Nd, Fe and B. The magnetic particles 176 may include a ferrimagnetic material, an antiferromagnetic material, a ferromagnetic material or domains of varying magnetic properties within a continuous material (including voids causing variable magnetic properties) and combinations thereof. The ferromagnetic material is selected from the group consisting of MnBi, CrTe, EuO, $CrO_2$, MnAs, Fe, Ni, Co, Gd, Dy, corresponding alloys and oxides of Fe, Ni, Co, Sm, Gd, Dy, and combinations thereof.

Figure 9:
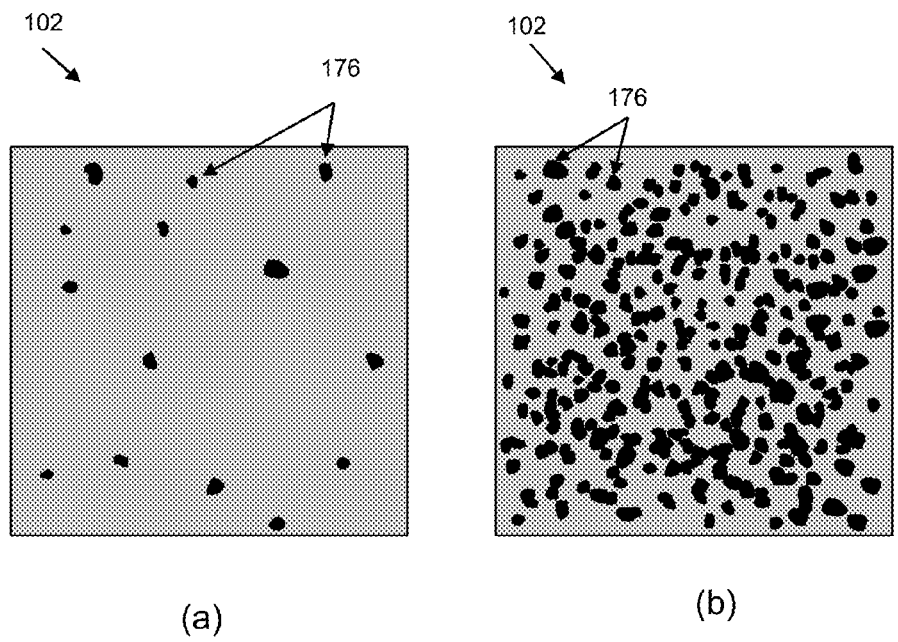
FIG. 9A and FIG. 9B show different densities of magnetic particles used in a tag in accordance with an embodiment of the invention.

In order to be suitable, the area on a tag 102 to be read by a reading element may contain a suitable density of particles. FIG. 9A and FIG. 9B show different densities of magnetic particles contained within the areas of two tags 102 to be read in accordance with an embodiment of the invention. FIG. 9A shows a very low density of magnetic particles 176 while FIG. 9B shows a very high density of magnetic particles 176. If the area of the average tag 102 to be read contains too few magnetic particles 176, as may be the case with FIG. 9A, it may be difficult to achieve a large number of tags 102 with uniquely identifiable fingerprints. Similarly if the area of the average tag 102 to be read contains too many magnetic particles 176, as may be the case with FIG. 9B, it may also be difficult to achieve a large number of tags 102 with uniquely identifiable fingerprints. Consequently it is generally desirable to ensure that the tags 102 being used have a suitable density of magnetic particles 176, for example it is possible to set a threshold that all tags 102 used must have between 20 and 50 magnetic particles 176 of at least a certain size. Tags 102 which either have too many or too few magnetic particles 176 can be rejected on the production line.

Since most imaging chips (for example CMOS chips) are actually digital representations of the image (i.e. they are pixilated), in some cases it is simpler to base the acceptance criteria directly on the pixels of the image, as described hereafter. Assume for example that the magneto-optical reading element is configured such that a more intense magnetic field results in a brighter image and the imaging sensor records the brightness on a scale of 0 to 255 (with 255 being the brightest). Then another way of ensuring that there is a suitable magnetic fingerprint is to count the number of pixels which are registering a brightness value above a certain threshold value (for example above a threshold value of 128 on the scale of 0 to 255). If a sufficient number of pixels are above the threshold then it can be assumed that the tag 102 has sufficient number of magnetic particles 176 (or at least that those magnetic particles 176 which are present are particularly large). On the other hand, in order to check that the tag 102 does not contain too many magnetic particles 176, it can be sufficient to check that not more than a maximum number of pixels are above the threshold.

Figure 10:
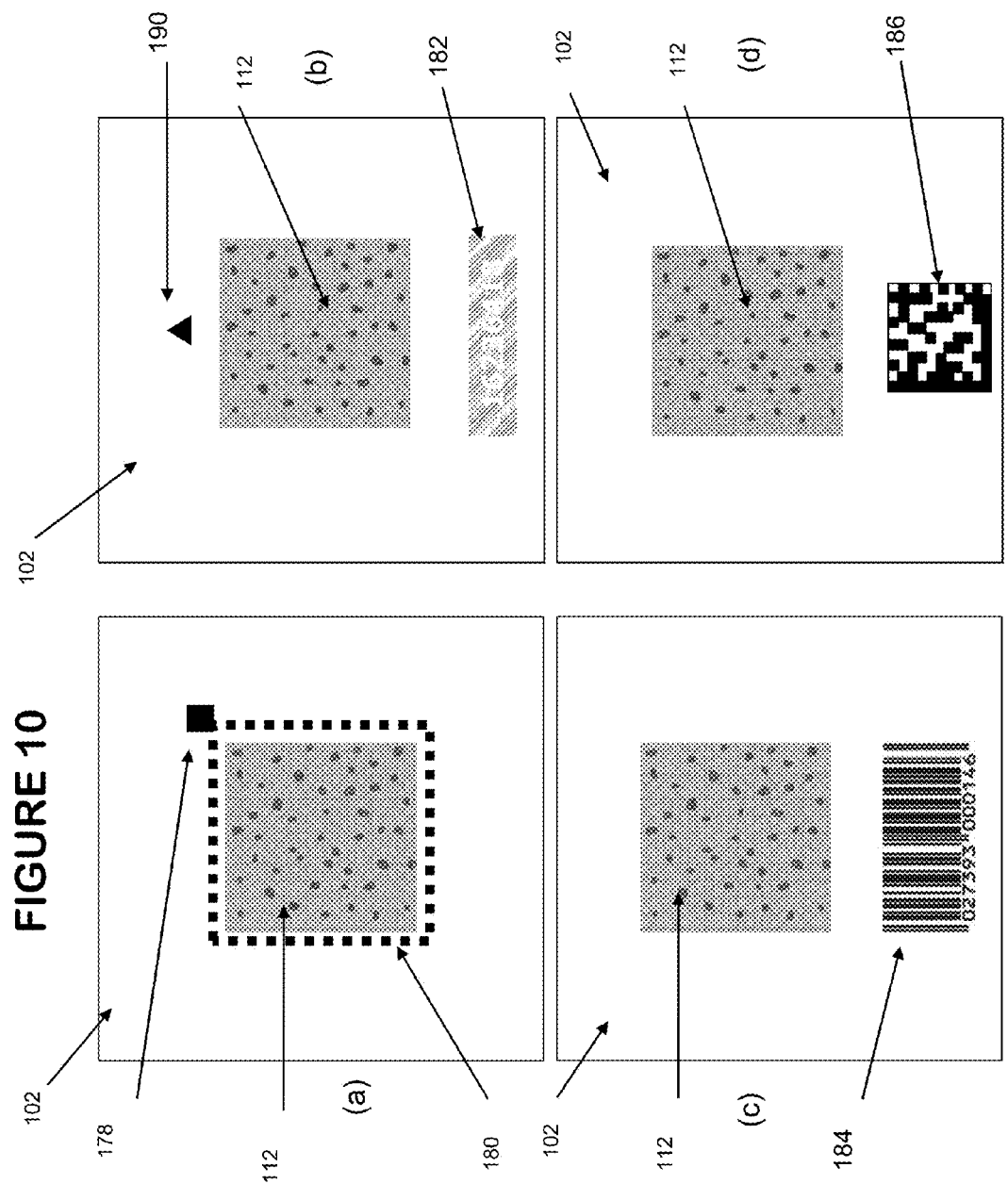
FIG. 10A to FIG. 10D show examples of tags with identification features in accordance with an embodiment of the invention.

FIG. 10A to 10D shows examples of tags 102 with identification features in accordance with an embodiment of the invention. Various identification features may be incorporated onto a tag 102. To be used in an anti-counterfeiting field, a tag 102 essentially consists of at least one magnetic fingerprint region 112. The unique magnetic fingerprint region 112 can either be made visible or hidden under a cover layer. FIG. 10A shows a tag 102 which incorporates only a fingerprint region 112 and no other identification features. However the tag 102 does incorporate a first fiducial marking 178 and a second fiducial marking 180. The first fiducial marking 178 and the second fiducial marking 180 may be magnetically readable (e.g. magnetic inks) or optically readable, for example. In the configuration shown in FIG. 10A, the second fiducial marking 180 serve to delineate the outline of the fingerprint region 112 while the first fiducial marking 178 serves to identify the orientation of the tag 102 (i.e. which side is up).

FIG. 10B shows a tag 102 with a serial number or alphanumeric characters 182 (second set of identification features) in addition to the magnetic fingerprint region 112 (first set of identification features) and a third fiducial marking 190. The alphanumeric characters 182 may be optical or magnetic readable. The third fiducial marking 190 is an optical marking to indicate to the user which way to orient the reading device 104 when reading the tag 102. The serial number 182 is printed using magnetic ink and is to be imaged using the magneto-optical reading element at the same time as the fingerprint region 112 is imaged. Pattern recognition software is then used to recognize the serial number 182 that is written on the tag 102.

FIG. 10C and FIG. 10D show respective tags 102 with a first optically readable barcode 184 and a second optically readable barcode 186 (second set of identification features) printed on the tags 102 in addition to the magnetic fingerprint region 112 (the first set of identification features). The reading device 104 shown in FIG. 3 is adapted to read such tags 102 if the second reading element 116 is a barcode reader. Such a reading device 104 may be configured to read both sets of identification features (for example the first barcode 184 or the barcode 186 and the magnetic fingerprint region 112) simultaneously, or both may be read in sequence. In one embodiment of the invention, the reading device 104 containing a barcode reader as the second reading element 116 is configured such that when the reading device 104 is activated, it is ready to read the first barcode 184 or the second barcode 186, once the first barcode 184 or the second barcode 186 is read correctly the reading device 104 provides a prompt (such as an audible beeping sound) to the user indicating that the first barcode 184 or the second barcode 186 has been read and the reading device 104 is ready to read the magnetic fingerprint region 112. The reading device 104 is repositioned to read the magnetic fingerprint region 112, and the first reading element 114 proceeds to take an image of the magnetic fingerprint region 112 when the user pushes the button 118 to indicate that the reading device 104 shall read the magnetic fingerprint region 112.

FIG. 11A to 11D show further examples of tags 102 with identification features in accordance with an embodiment of the invention. As additional identification features provide additional security or information, multiple identification features may be adopted. Some of these additional identification features include magnetic barcodes, magnetic borders, magnetic alphanumeric characters, magnetic fiducial mark, optical barcodes (linear and 2-dimensional, including various industry standards such as Data Matrix), optical fiducial mark, optical alphanumeric characters, visible markings but not so limited, for example the tag 102 may include an Radio Frequency Identification (RFID) chip, security inks or a hologram. The first barcode 184 or the second barcode 186 may be printed using covert inks such as ultraviolet or infrared "optical" inks that cannot be detected by the naked human eye but can be detected and read by using a suitably adapted reading device 104 or by illuminating the tag 102 with one or more particular wavelengths of the electromagnetic spectrum. Magnetic and optical identification features may be positioned at the same position with respect to the scan area by means of using multiple layers.

Figure 11:
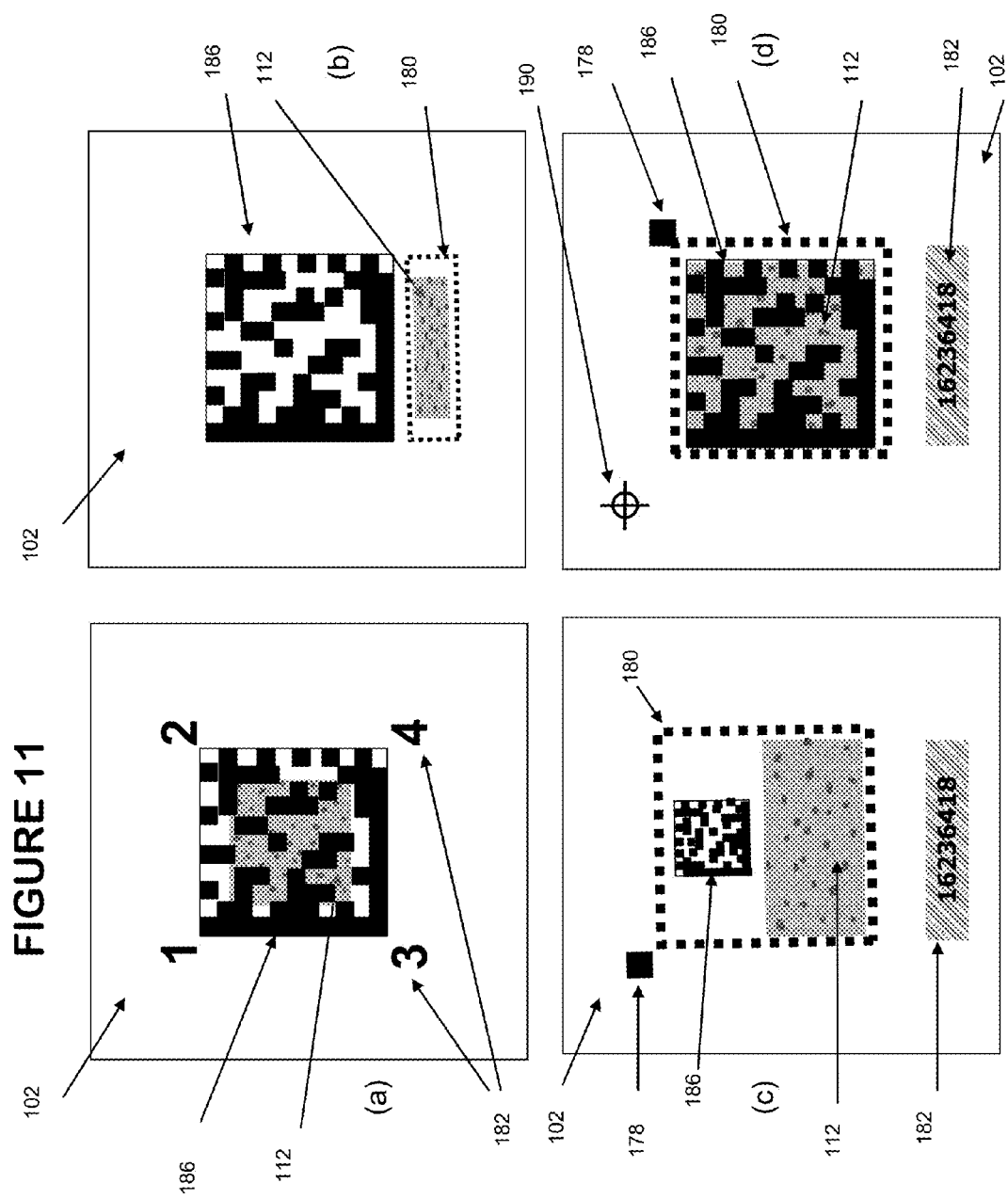
FIG. 11A to FIG. 11D show further examples of tags with identification features in accordance with an embodiment of the invention.

FIG. 11A shows a tag 102 with a magnetic fingerprint region 112. A second two-dimensional barcode 186 is positioned on top of the magnetic fingerprint region 112 and a plurality of magnetic alphanumeric characters 182 are positioned at the four corners of the second two-dimensional barcode 186. Note that although the magnetic fingerprint region 112 is shown in FIG. 11A to FIG. 11D, in reality the fingerprint region 112 may preferentially be situated behind an opaque cover layer which the second barcode 186 is printed on, therefore a user may not actually see the fingerprint region 112.

FIG. 11B shows a tag 102 with a magnetic fingerprint region 112. The magnetic fingerprint region 112 is surrounded by second fiducial marking 180 and a two-dimensional barcode 186 is positioned adjacent to the magnetic fingerprint region 112. The second fiducial marking 180 may help the user position the magneto-optical reading element correctly, furthermore this may be used as reference markings for the analysis of the fingerprint data 112 if a magneto-optical reading element is used which is able to simultaneously read magneto-optical data as well as optical data (reading elements such as those shown in FIG. 5 to FIG. 7 are suitable for this). The second fiducial marking 180 can be used to allow the fingerprint identification software to cater for readings while the magneto-optical reading element is misaligned, or, if the magneto-optical reading element is equipped with some form of internal actuation system, such markings may be used to allow the magneto-optical reading element to be accurately positioned prior to a reading being made.

FIG. 11C shows a tag 102 with a magnetic fingerprint region 112. A second two-dimensional barcode 186 is positioned adjacent to the magnetic fingerprint region 112. Both the magnetic fingerprint region 112 and the second two-dimensional barcode 186 are surrounded by a second fiducial marking 180. A first fiducial marking 178 is positioned at the upper-left corner of the second fiducial marking 180. Magnetic alphanumeric characters 182 are positioned adjacent to the second fiducial marking 180.

FIG. 11D shows a tag 102 with a magnetic fingerprint region 112. A second two-dimensional barcode 186 is positioned on top of the magnetic fingerprint region 112. The second two-dimensional barcode 186 is surrounded by a second fiducial marking 180 and a first fiducial marking 178 is positioned at the upper-right corner of the magnetic border 180. A third fiducial marking is positioned on the upper-left corner, adjacent to the second fiducial marking 180. Magnetic alphanumeric characters 182 are positioned adjacent to the second fiducial marking 180.

Figure 12:
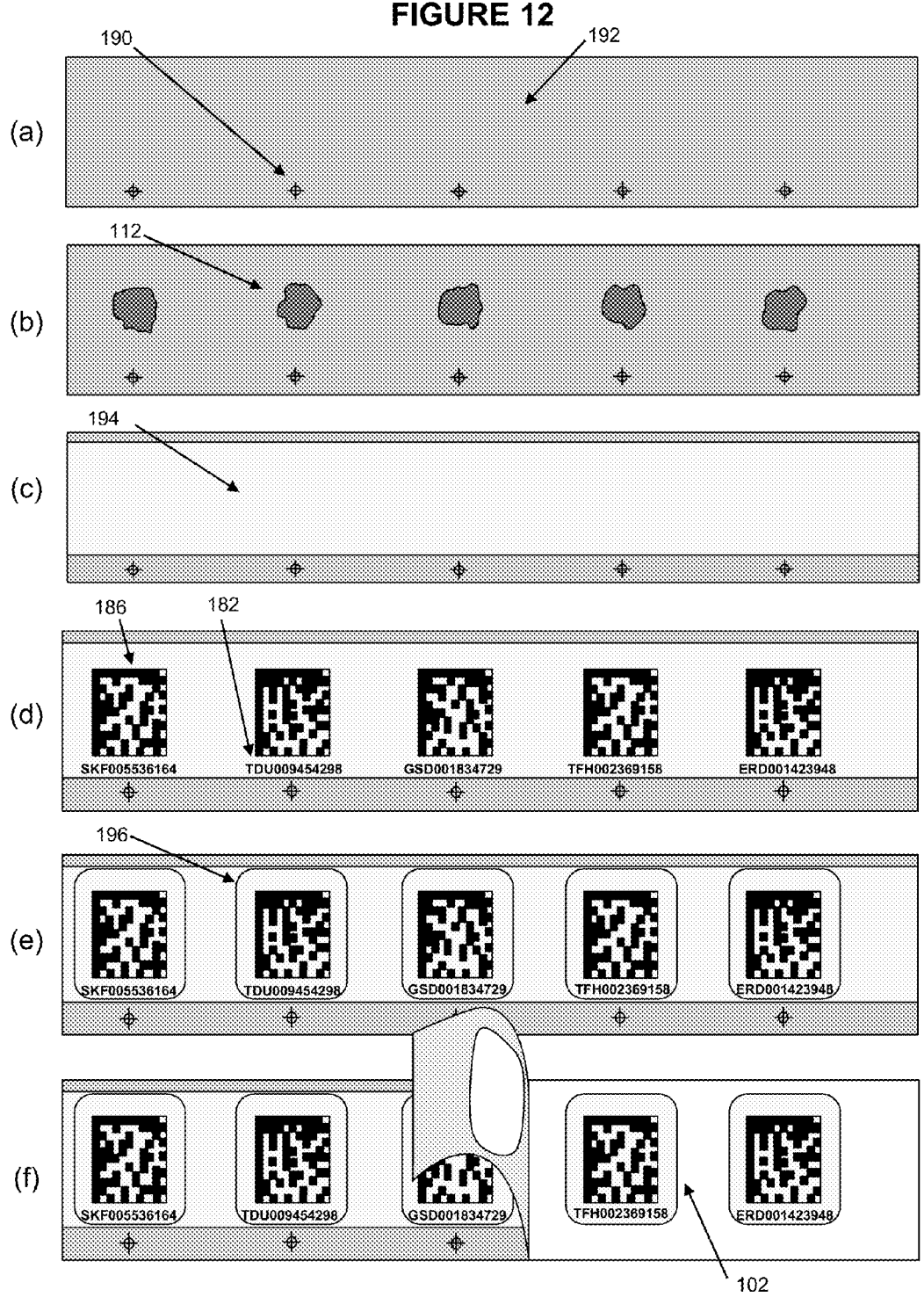
FIG. 12A to FIG. 12F shows a method of making tags with identification features in accordance with an embodiment of the invention.
Figure 13:
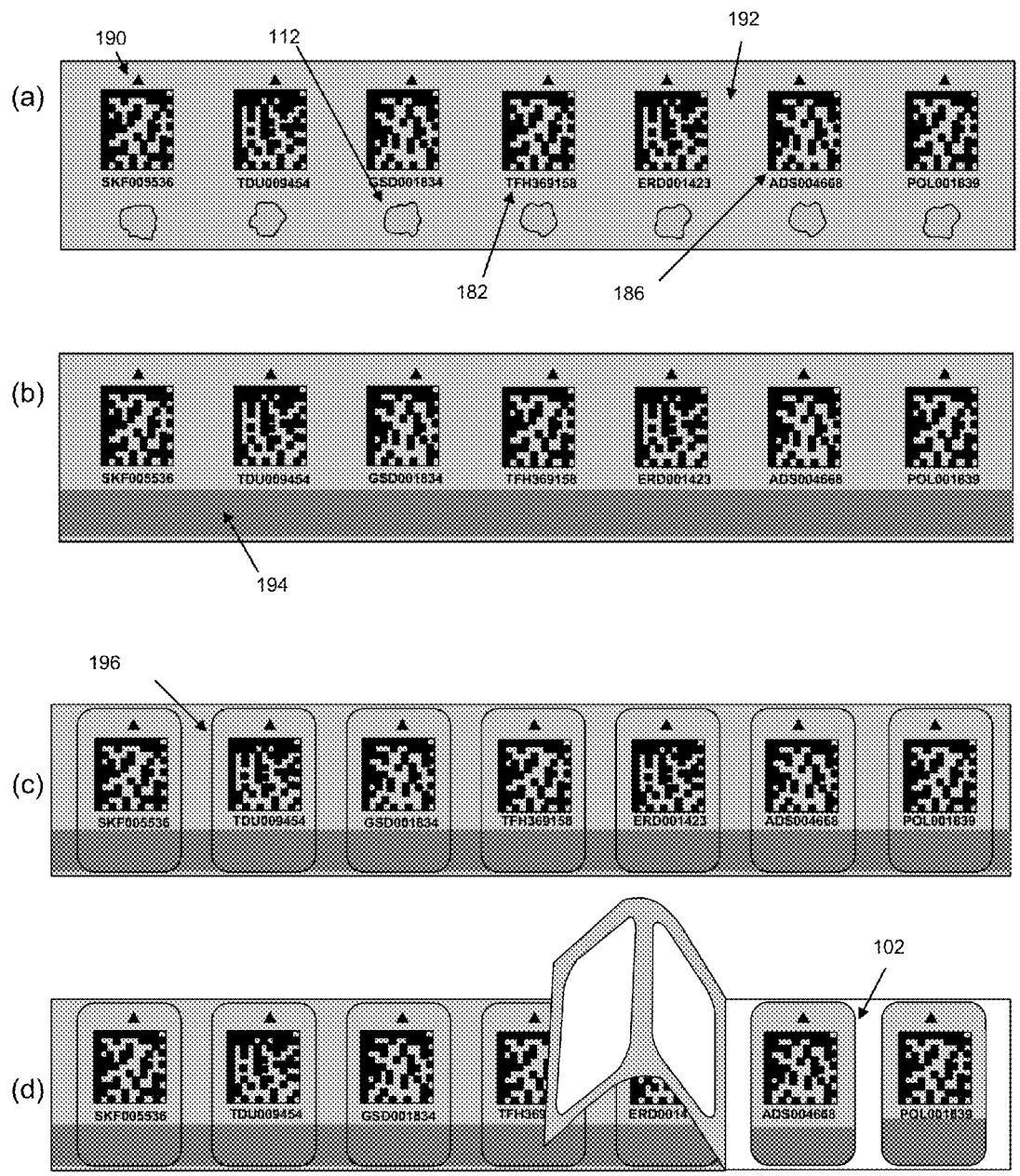
FIG. 13A to FIG. 13D shows a method of making tags with identification features in accordance with another embodiment of the invention.
Figure 14:
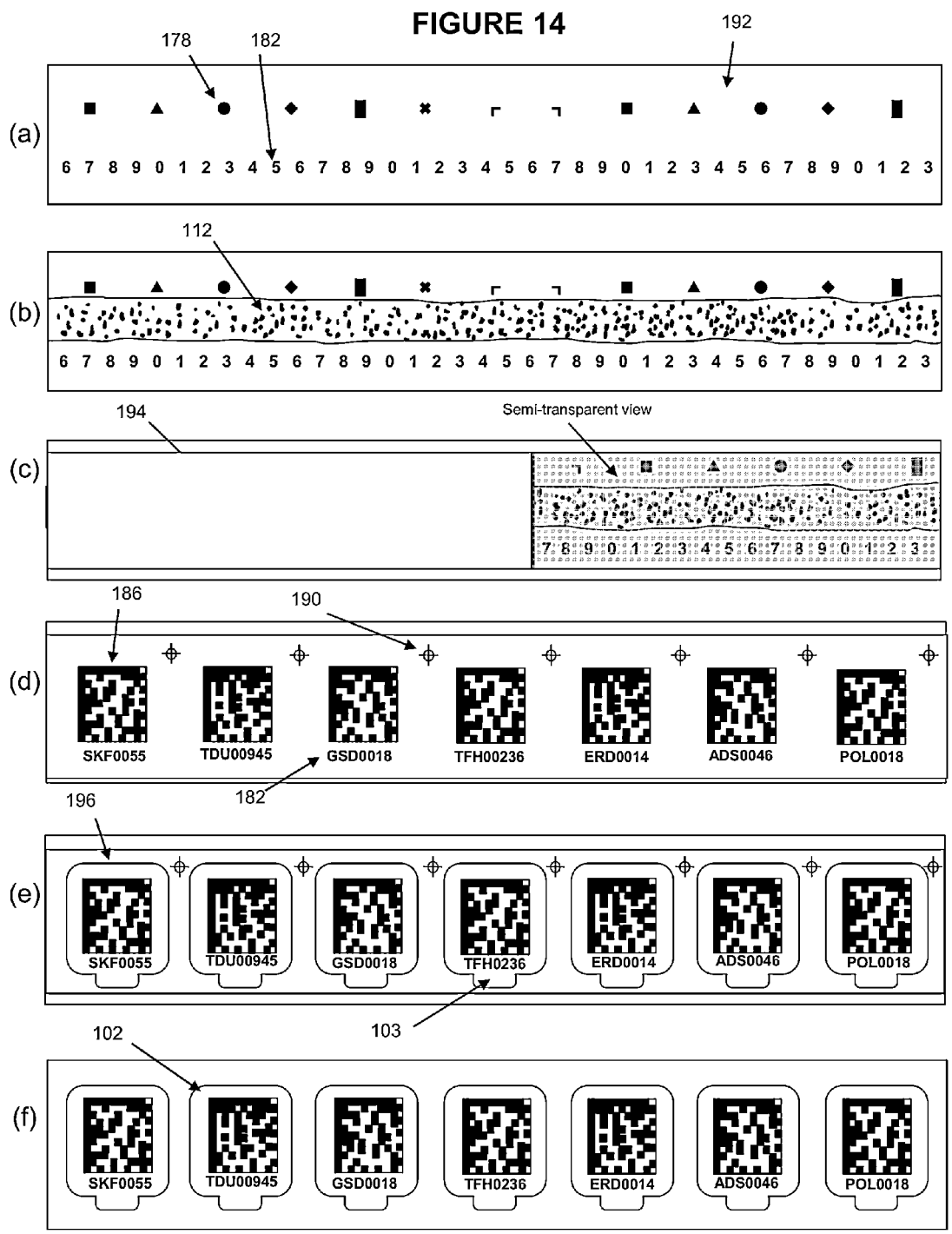
FIG. 14A to FIG. 14F shows a method of making tags with identification features in accordance with a further embodiment of the invention.

There are several methods of making tags 102 with identification features as shown in FIG. 12 to FIG. 14. These methods are normally applicable when the magnetic fingerprint regions 112 are formed on what may otherwise be conventional labels. FIG. 12A to FIG. 12F show a method of making tags 102 with identification features in accordance with an embodiment of the invention. In FIG. 12A, process optical marks 190 are printed at a defined interval on a first printable adhesive layer 192 (the base layer). Note that in this process optical marks 190 are used solely as alignment markings for the production process (e.g. printing and die-cutting steps) and do not form part of the final tags 102. Next in FIG. 12B, magnetic fingerprint materials are deposited adjacent to the optical marks 190 forming the magnetic fingerprint regions 112. The magnetic fingerprint regions 112 are spaced apart with similar defined interval. In FIG. 12C, a second printable adhesive layer 194 (the cover layer) is further deposited on the first printable adhesive layer 192, covering the magnetic fingerprint regions 112 but not the optical marks 190. The second printable adhesive layer 194 serves as a cover and protective layer for the magnetic fingerprint regions 112. In FIG. 12D, other identification features, for example two-dimensional barcodes 186 and corresponding optical alphanumeric characters 182 or serial numbers may be printed on the second printable layer 194, adjacent to the optical marks 190. In this regard, each magnetic fingerprint region 112 is located directly beneath each two dimensional barcode 186. Subsequently in FIG. 12E, a die cut 196 is performed where the desired shape of the tag 102 is obtained. This involves cutting the shape from respective printable layers 192, 194 by pressing a shaped knife edge (die) into the respective printable layers 192, 194. The optical marking 190 can be used to ensure that the die cut is correctly aligned. After die cutting, in FIG. 12F, the excessive layers 192, 194 containing the optical marks 190 are removed in order to obtain the final tag 102. Note that it is important to choose the second printable layer 194 to be thin enough such that the magnetic fields of the particles can be adequately resolved by the reading element. Typically polymeric printable layers (for example polyethylene terephthalate "PET") which are suitably strong and are around 10-50 microns in thickness. Polystyrene (PS) and Polyvinyl alcohol (PVA) are also suitable polymeric layers, for example. If a protective layer is needed but it is imperative to have it very thin, it can be desirable to use a thin-film deposition method rather than laminating a film on the substrate. For example an ink may be printed on top of the fingerprint region or a polymeric coating may be applied by dip coating, spin coating or screen printing, for example. Alternatively a metal layer can be vapour deposited, for example. If the tag 102 is going to be subjected to hard abrasion it may even by desirable to coat the fingerprint region 112 with a hard film such as a diamond-like carbon (DLC) film, for example.

FIG. 13A to FIG. 13D shows a method of making tags 102 with identification features in accordance with another embodiment of the invention. The method of making tags 102 corresponds to the method disclosed in FIG. 12A to FIG. 12F but involves printing the barcode and magnetic material on separate areas of the base layer and covering only the fingerprint region 112 with a second adhesive printable layer 194. In FIG. 13A, the optical marks 190, two dimensional barcodes 186 and optical alphanumeric characters 182 are first printed and thereafter magnetic fingerprint regions 112 are aligned and applied adjacent to the optical marks 190 on a first printable adhesive layer 192. Next in FIG. 13B, the magnetic fingerprint regions 112 are covered with a second adhesive layer 194 to protect their magnetic properties. The second adhesive layer 194 need not be a printable layer as the two-dimensional barcodes 186 and optical alphanumeric characters 182 or serial numbers are printed on the first adhesive printable layer 192 in FIG. 13A. In FIG. 13C, a die cut 196 is performed to achieve the desired shape of the tag 102. The die cut region may include the optical mark 190, the two-dimensional barcode 186, the optical alphanumeric character 182 or serial number and the magnetic fingerprint region 112. In FIG. 13D, the final tag 102 can be revealed by removing the excess adhesive layers 192, 194.

FIG. 14A to FIG. 14F shows a method of making tags 102 with identification features in accordance with a further embodiment of the invention. First in FIG. 14A, magnetic markings can be printed with magnetic inks on a first adhesive printable layer 192. The magnetic markings can be in the form of symbols 178 or magnetic alphanumeric characters 182 which can give an indication of the magnetic fingerprint region 112 orientation. The magnetic markings can serve as fiducial marks or alignment guides during the scanning or matching of the fingerprint information. Next in FIG. 14B, the magnetic material is deposited between two magnetic markings 178, 182 along the first adhesive printable layer 192, the deposited magnetic material forming the magnetic fingerprint region 112. Then in FIG. 14C, a second adhesive printable layer 194 is deposited on top of the first adhesive printable layer 192. As mentioned earlier, the second adhesive printable layer 194 serves as a cover and protective layer for the magnetic fingerprint regions 112. A semi-transparent view is as shown on the right side of FIG. 14C. In FIG. 14D, two-dimensional barcodes 186, optical alphanumeric characters 182 or serial numbers and process optical markings 190 are printed on the second adhesive printable layer 194. The optical markings 190 are used for die cutting alignment purposes. In FIG. 14E, a die cut 196 is subsequently performed to obtain the desired shape of the tag 102. Here the die cut 196 is performed such that the resulting tags 102 are shown to have a tab 103 at the base of each tag 102. If the tag 102 is made sufficiently thick (for example at least 50 microns, but more preferably at least 100-200 microns thick) the entire tag 102 and in particular the tab 103 can be used as a physical alignment feature to ensure that the reading device is correctly mechanically aligned with respect to the tag and more particularly, with respect to the magnetic fingerprint region 112. This kind of physical alignment mechanism is described in more detail later in the description of the invention. Note that if the tab 103 is not used as a physical alignment method it is still useful as a visual cue to the user indicating how the reading device should be aligned with respect to the tag during reading (e.g. which direction is up). In FIG. 14F, the excess adhesive layers 192, 194 are removed to reveal the final tag 102 which remains attached to a non-stick liner until it is to be applied to an object to be tagged.

Tag reading normally involves two steps, an optical scan and a magneto-optical scan. Typically, an optical scan is performed first and a magneto-optical scan is performed subsequently. However, by aligning the optical markings and magnetic fingerprint region correctly with respect to each other and with respect to the configuration of the reading device, it is possible (and even advantageous) to read both the magnetic fingerprint region and optical markings concurrently. FIG. 15A shows a tag 102 adapted to have its optical barcode 186 and its magnetic fingerprint region 112 read simultaneously. FIG. 15B shows the approximate area 224 which an optical reading element needs to scan in order to read barcode 186 and the approximate area 226 which a magneto-optical reading element needs to scan in order to read the magnetic fingerprint region 112. The reading device 104 shown in FIG. 3 is able to concurrently read the barcode 186 and magnetic fingerprint region 112 of tag 102 provided that the reading element 116 and reading element 114 are arranged to correspond with the spatial arrangement of the barcode 186 and magnetic fingerprint region 112 of tag 102 (and of course providing that reading element 116 were a barcode reader). Note that the reading element 116 need not be in physical contact with tag 102, instead it is only necessary to ensure that it is aligned to read at least area 224 while reading element 114 is reading area 226. However certain reading elements, such as those shown in FIG. 5 to FIG. 7 may be adapted to read both the optical markings and magnetic information simultaneously and these elements may be used to read the tag 102. Note that the tag 102 shown in FIG. 15 does not necessarily need to have its optical barcode 186 and magnetic fingerprint region 112 read simultaneously and consecutive readings may be appropriate in certain applications.

Figure 39:
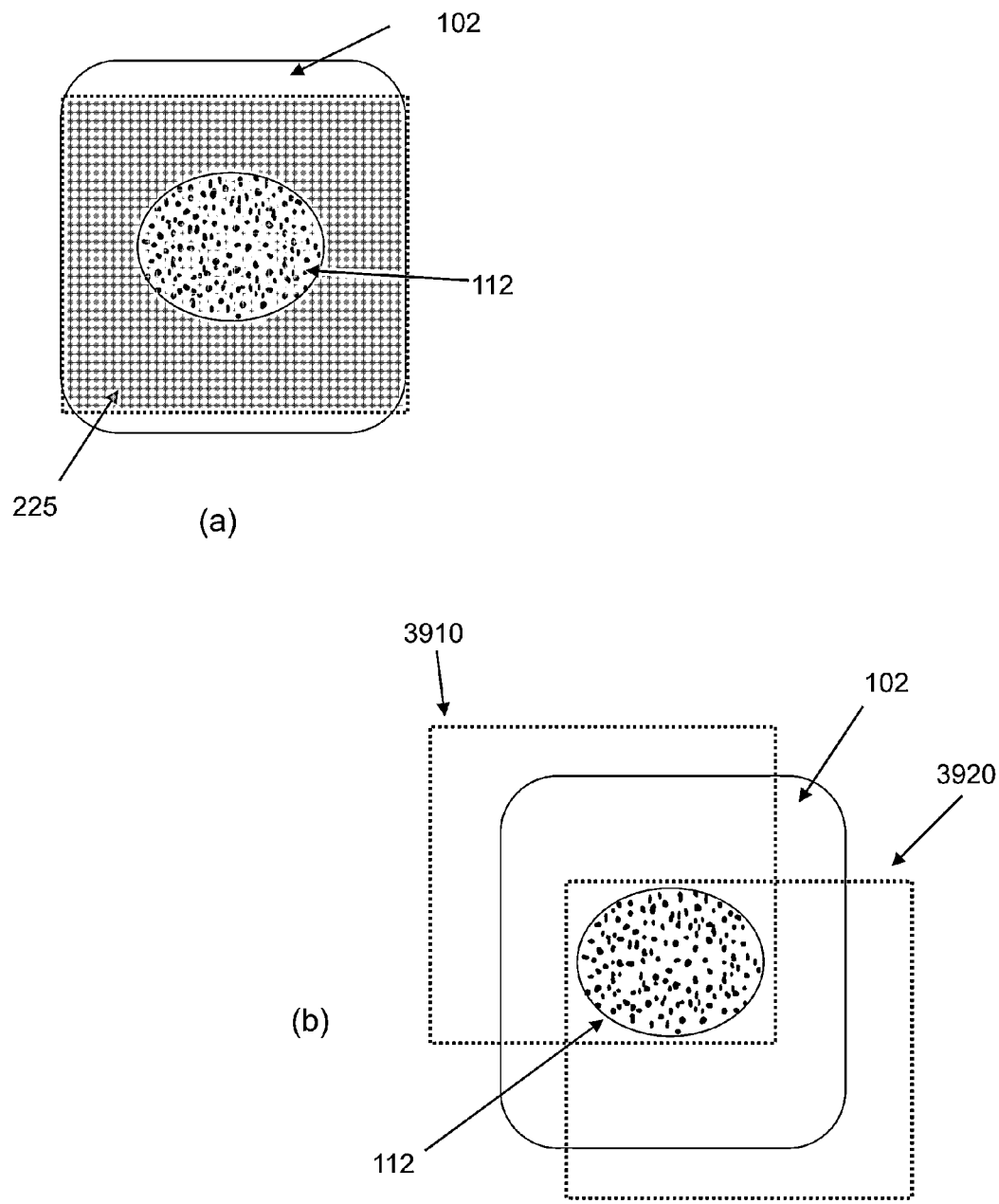
FIG. 39A and FIG. 39B show one method of dealing with misalignments between the scanner and fingerprint region of a tag in accordance with an embodiment of the invention.

As described in relation to FIG. 2 a system according to an embodiment of the invention compares signals obtained from a scan of the tag (or object's) magnetic fingerprint region with a signal obtained previously from the same magnetic fingerprint region. In order for the tag or object's fingerprint to be authenticated, these two signals must match to within a predefined threshold value. FIG. 16A shows a desired scan area of a tag using a reading device in accordance with an embodiment of the invention. FIG. 16B shows a scan area of a tag when the reading device is misaligned. FIG. 16C shows graphically how signals from an initial reading and a subsequent reading can be compared in order to authenticate the tag's identity. Here a tag 102 containing a magnetic region 112 and magnetic fiducial markings 178. A first reading of the magnetic features of the tag 102 covers a reading area shown by 225, as shown in FIG. 16A. This reading of the magnetic features is done on the tag production line, or under other controlled conditions, such that reading area is well-aligned in order capture all the magnetic features of the tag (for example the entire fingerprint region as well as all the magnetic fiducial markings). The signal (or data) from this initial reading is stored in a remote server and allows subsequently read signals to be compared with the initially read signal in order to authenticate the tag 102 (as described in relation to FIG. 2). However since subsequent readings of the tag 102 are often done outside of a controlled environment by users who do not correctly align the reading device with respect to the tag 102, it is possible for subsequent readings of the tag 102 to be highly misaligned. This situation is shown in FIG. 16B, where the reading device is misaligned such that the magnetic reading area 232 only covers a portion of the fingerprint region 112 and only some of the magnetic fiducial markings 178. FIG. 16C shows graphically how the signals from the initial reading and subsequent reading can be compared in order to authenticate the tag's identity. Here the signal 1610 from the initial reading is compared with the signal 1620 from the subsequent reading. The overlap of the reading areas 1610 and 1620 is shown as 1630. When comparing the signals from 1610 and 1620 it is practical to limit the comparison to comparing features contained within the overlapping area 1630. In this representation the signals can be assumed to be images of the magnetic features of the tag 102. The shapes and spatial arrangement of the magnetic fiducial markings 178 have been arranged in such a way that there is only one possible way to arrange the images with respect to each other (as shown in FIG. 16C). This allows the signals to be easily compared with each other to determine whether the identification features within the magnetic fingerprint region matches adequately. If the matching is above some predetermined threshold then the tag is authenticated. The threshold also determines a minimum amount of overlap area 1630 between the signals, for example if the misalignment is so severe that the magnetic fingerprint region 112 within the overlap area 1630 does not contain enough identification features to allow the readings to be adequately compared, then the tag 102 will not be authenticated by that reading. Although FIG. 16A to FIG. 16C show magnetic fiducial markings 178, if the reading element allowed both magneto-optical and optical (such as those reading elements shown in FIG. 5 to FIG. 7) then optical fiducial markings or a combination of optical and magnetic fiducial markings may be used for the purposes described in relation to FIG. 16A to FIG. 16C. A further embodiment showing how to deal with misalignments is described in relation to FIG. 39. Another method which is also contemplated is for the initial scans for one or both of the optical and magneto-optical data to have a larger scan area than for subsequently readings.

The magnetic particles 176 used in forming the magnetic fingerprint region 112 are usually of high coercivity. One form of such high coercivity magnetic particles 176 is a flake-like geometry.

FIG. 17A shows a cross-sectional view of a single magnetic particle 176 on a substrate 236 covered by a cover layer 194 in accordance with an embodiment of the invention. FIG. 17A shows the magnetic particle 176 having a magnetic field parallel to the plane of the tag substrate 236 and FIG. 17B shows a magnetic particle 176 having a magnetic field perpendicular to the plane of the tag substrate 236 in accordance with an embodiment of the invention. As a strong magnetic signal which is easy to read with a reading element is desirable, perpendicular magnetization as shown in FIG. 17B is usually advantageous for this. Therefore having a magnetic field perpendicular rather than parallel to the plane of the tag substrate 236 is preferred. It is also important therefore that the magnetic particles 176 are chosen such that the magnetic particles 176 facilitate strong fields perpendicular to the plane of the tag substrate 236. Certain magnetic particles 176 are anisotropic and allow stronger magnetization in one direction over another. For flake-like particles such as the one shown in FIG. 17A and FIG. 17B, it is common that the crystal orientation of the magnetic particle 176 allows stronger magnetization parallel to the plane of the magnetic particle 176 rather than perpendicular to the plane of the magnetic particle 176. In such cases a strong out-of-plane magnetization such as is required for FIG. 17B may be difficult to achieve. Therefore if the geometry of the tag 102 is such that magnetic particles 176 are likely to lie in the plane of the tag 102, then it is important to choose magnetic particles 176 which are magnetically isotropic (i.e. can be magnetized equally in any direction) or nearly isotropic, or, if they are anisotropic their primary magnetic direction is out-of-plane.

Figure 18:
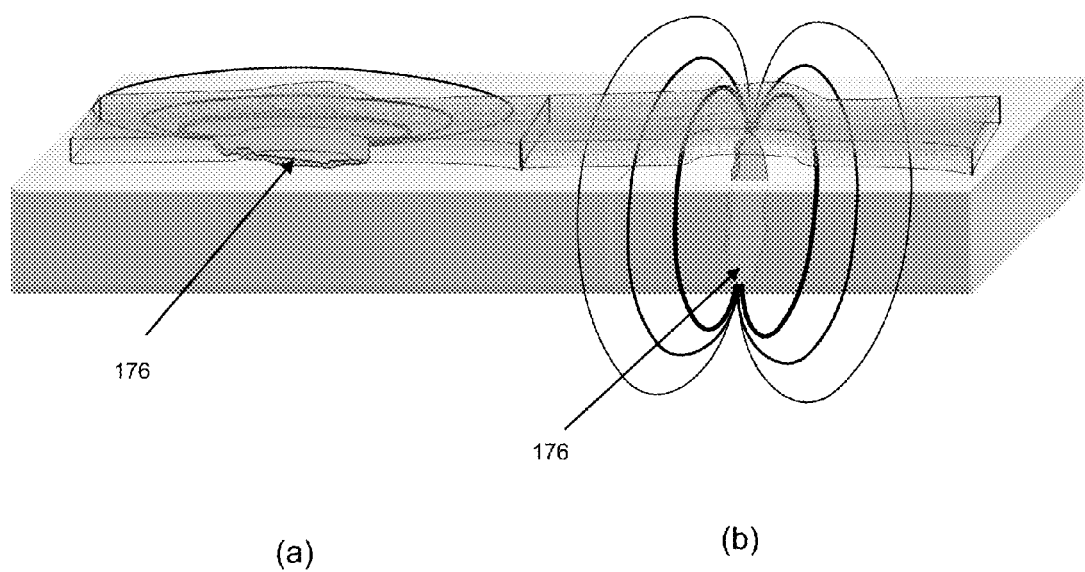
FIGS. 18A and 18B show magnetic particles positioned in different orientations in accordance with an embodiment of the invention.

If magnetic particles 176 are used which exhibit a strong preference for in-plane magnetism then it is desirable to try to ensure that at least some of the magnetic particles 176 are aligned perpendicular to the plane of the tag 102. FIGS. 18A and 18B show magnetic particles 176 positioned in different orientations in accordance with an embodiment of the invention. FIG. 18A shows a magnetic particle 176 positioned parallel to the plane of the tag substrate 236 and FIG. 18B shows a magnetic particle 176 positioned perpendicular to the plane of the tag substrate 236. Clearly the configuration shown in FIG. 18B means that the layer of magnetic material must be thicker than that necessitated by the configuration shown in FIG. 18A. One method to achieve magnetic particles 176 aligned out-of-plane is to put the magnetic material into some form of cavity or recess and then cover the recess with a thin protective layer.

Figure 19:
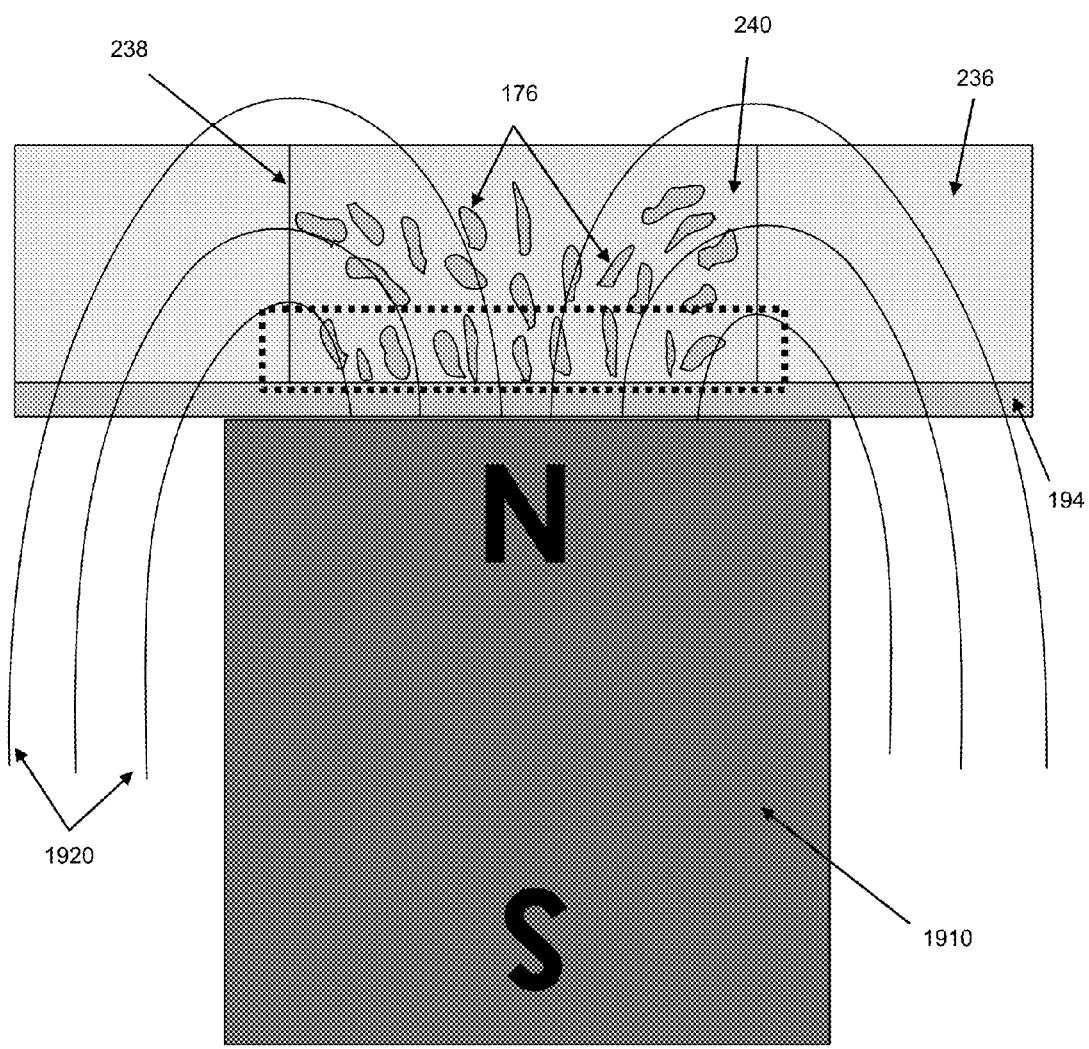
FIG. 19 shows a method to align flake-like particles out-of-plane of a tag in accordance with an embodiment of the invention.

FIG. 19 shows a method to align flake-like particles 176 out-of-plane of the tag 102 in accordance with an embodiment of the invention. Here the substrate 236 has a cavity 238 cut through it. A cover layer 194 is laminated over one opening of the cavity 238. The magnetic particles 176 have been mixed into a non-magnetic matrix material 240. The matrix material 240 is a viscous liquid which can be set (that is solidified) upon heating, exposure to ultraviolet light or upon some other trigger; an epoxy resin, for example, may work well as the matrix material 240. The magnetic particle 176 and matrix material 240 is deposited into the cavity 238 (this deposition may occur, for example, by screen printing, squeegee or dispensing). Once the mix is in the cavity 238, the tag 102 is subjected to a strong magnetic field. For illustration purposes the magnetic field is depicted by a bar magnet 1910 and its associated field lines 1920 (although the north pole of the magnet 1910 is shown as being closest to the tag 102 it may also be that a configuration is used where the south pole is closer). The magnetic field draws the magnetic particles 176 towards the cover layer 194 and the viscosity of the matrix material 240 plus the magnetic field combine to help to orient the magnetic particles 176 vertically, that is with their longest axis pointing perpendicular to the plane of the tag 102. Thereafter the matrix material 240 is solidified or set (in the case of an epoxy resin this setting or solidification can be achieved by curing the resin, cross-linking the epoxy to form a solid). The magnetic field may be sufficient to ensure that the magnetic particles 176 are adequately magnetized; however it is also contemplated that a stronger magnetic field may be applied after solidification of the matrix material 240, thereby magnetizing the magnetic particles 176 to a sufficient degree. Note that in FIG. 19 the tag 102 has been inverted (compared with the other figures) nevertheless it is intended as before that the reading occurs by bringing the reading element in contact with the cover layer 194. This means that the magnetic particles 176 closest to the cover layer 194 (that is those within the hashed box) will have the strongest effect on the magnetic fingerprint 112 of the tag 102. These magnetic particles 176 are largely aligned out-of-plane of the tag 102 and, if their strongest magnetic axis coincides with their longest axis, they should provide a strong magnetic signal to be read.

In the above description, high coercivity particles are contemplated as exemplary, because they retain their internal magnetic field sufficiently over the lifetime of the tag 102. However, it is also contemplated that very soft magnetic materials (low coercivity particles) can be used in the tag 102. In such cases a magnetic field is applied to the tag 102 prior to it being read on each occasion. This can be achieved with a permanent magnet or a solenoid and may form part of an adapted reader device. This approach has the advantage that the tag 102 may be used above its Curie point during service and also provides a means to reset the tag 102 prior to reading where such a situation is merited.

FIG. 20A shows a method of fabricating a tag 102 via extrusion and attaching the resulting tag 102 to an object adapted to be identified in accordance with an embodiment of the invention. During the extrusion process pellets 250 of, for example, plastic material, are mixed with magnetic particles 176 in a hopper 246. Pressure inside the extrusion machine 244 causes the plastic to flow around the magnetic particles 176 and finally a solid piece of material 252 comprising plastic containing magnetic particles 176 is extruded. The resulting material 252 can be used as part of a tag 102 or, as shown in FIG. 20B, can itself be embedded into an item of value 254 (it may also be embedded into a label which is then affixed to an item of value). The process described in relation to FIG. 20A may be varied in many ways, for example, it is not necessary to use pellets 250, instead the magnetic particles 176 may be mixed into a liquid or slurry, the extrusion process may be replaced with dispensing, for example, and the matrix material need not be a polymer but it can be a metal or a ceramic/"green" composite.

Figure 21:
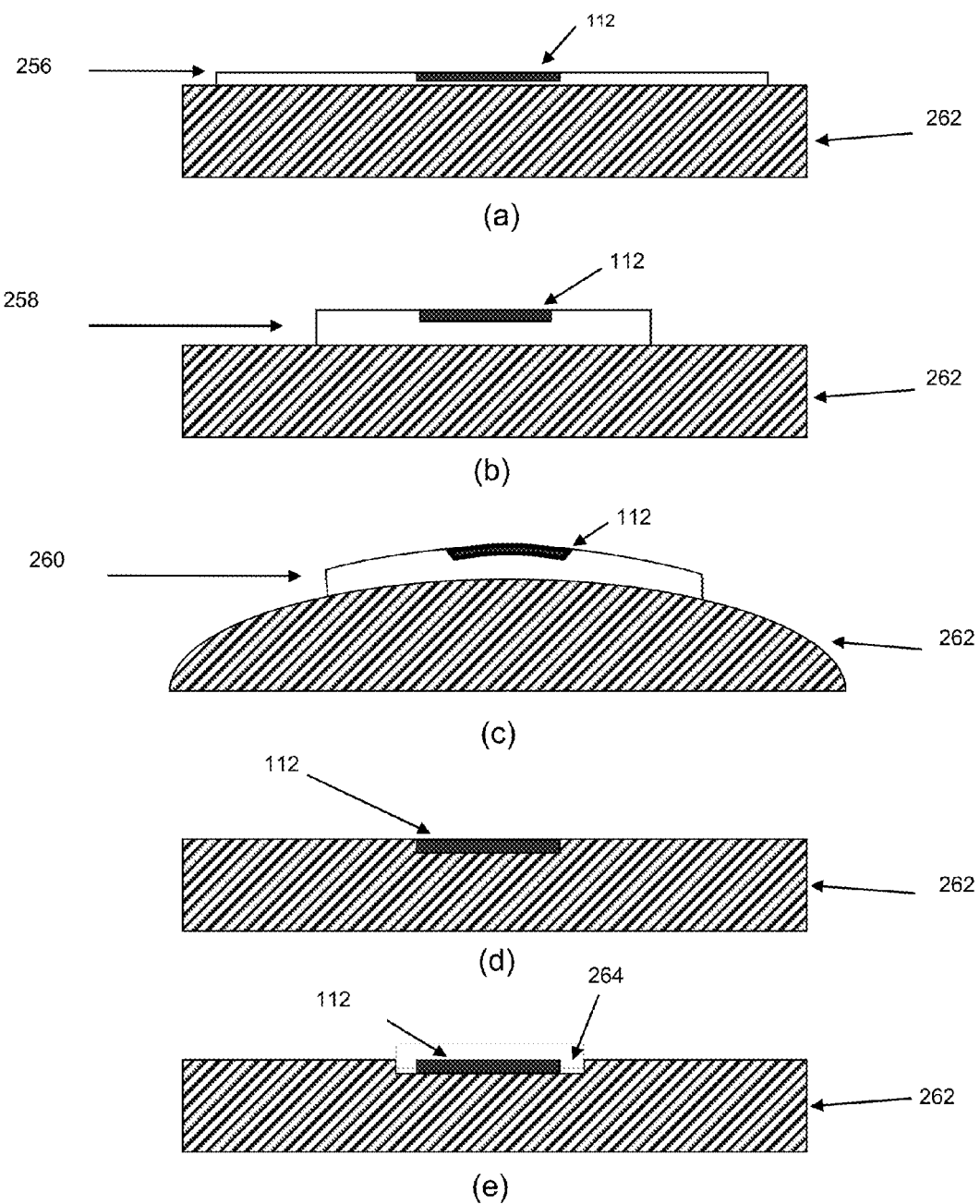
FIG. 21A to 21E shows different embodiments where a tag is attached to an object to be identified in accordance with an embodiment of the invention.

FIG. 21A to 21E shows different embodiments where a tag 102 is attached to an object 262 to be identified in accordance with an embodiment of the invention. In FIG. 21A, the tag 102 containing the magnetic fingerprint region 112 is included in a printed label 256. The printed label 256 is attached to an item of value 262. The printed label 256 may be self-adhesive for ease of attaching to the item of value 262. Some examples of printed labels 256 include roll labels, die-cut labels and self-adhesive labels. In the case shown in FIG. 21A, the label 256 is essentially a thin flat label which does not help to physically guide the positioning of the scanner. Such a label 256 may typically be less than 250 micrometers in thickness. The label 256 may form part of the substrate under the magnetic fingerprint material 112, or it may be part of the cover layer, or, the magnetic fingerprint region 112 may be embedded into the label 256.

Figure 23:
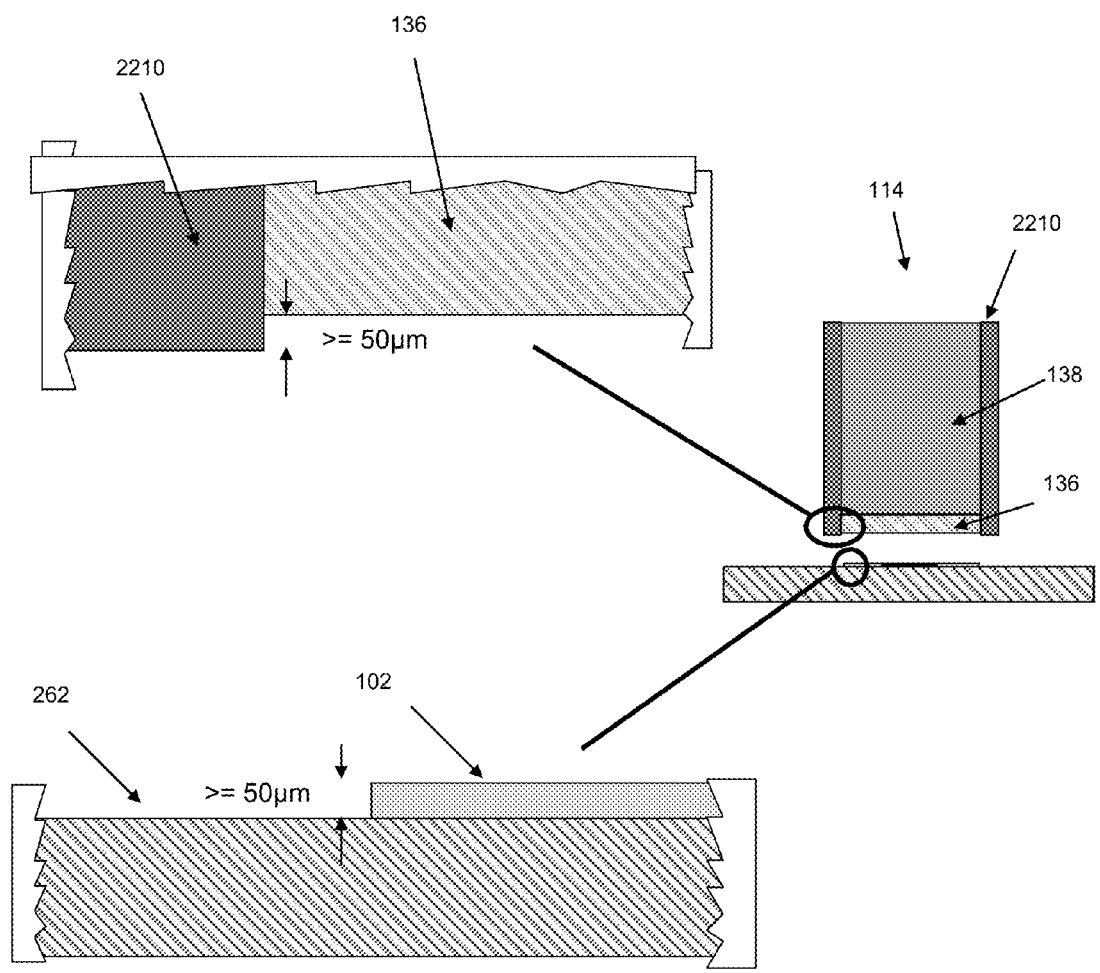
FIG. 23 shows a magneto-optical reading element and a tag in accordance with an embodiment of the invention.
Figure 26:
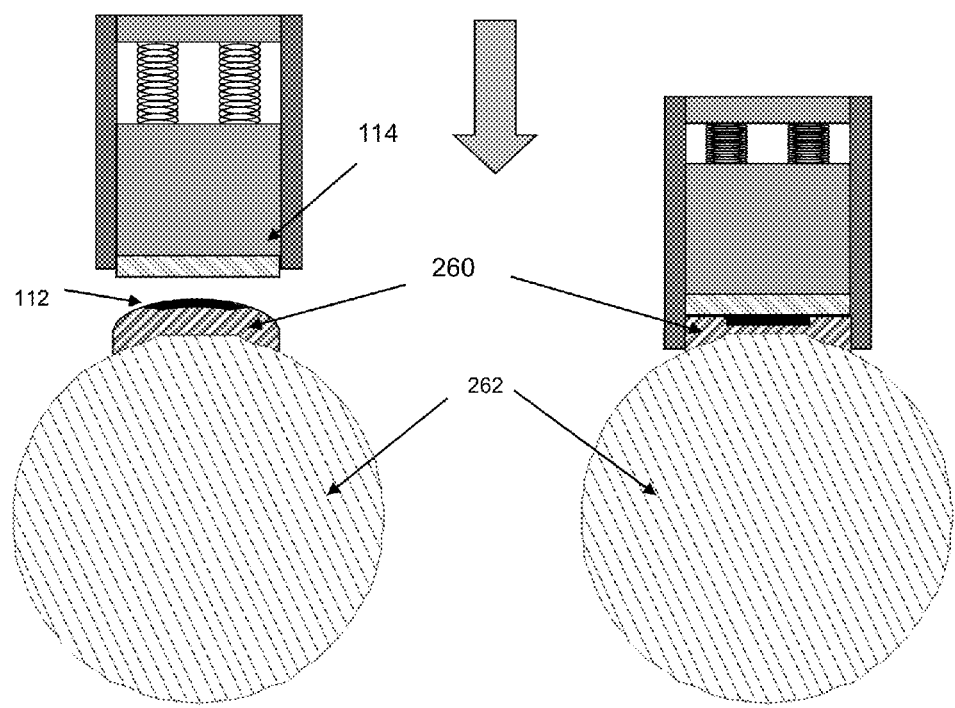
FIG. 26 shows a method of reading a fingerprint contained in a compliant label using a magneto-optical reading element in accordance with an embodiment of the invention.
Figure 27:
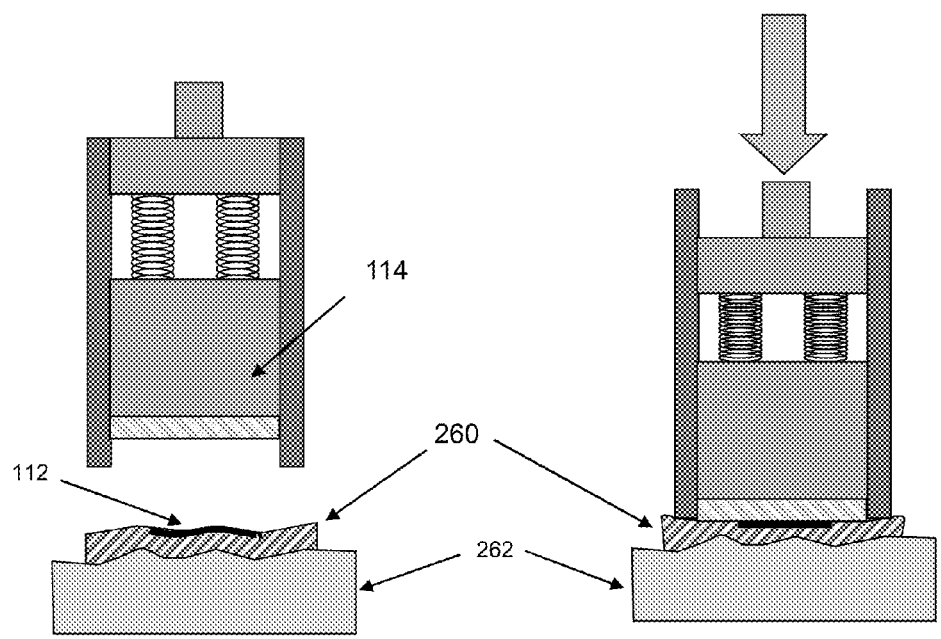
FIG. 27 shows how a compliant label can assist when an item of value to which the label is affixed, has a rough surface in accordance with an embodiment of the invention.
Figure 28:
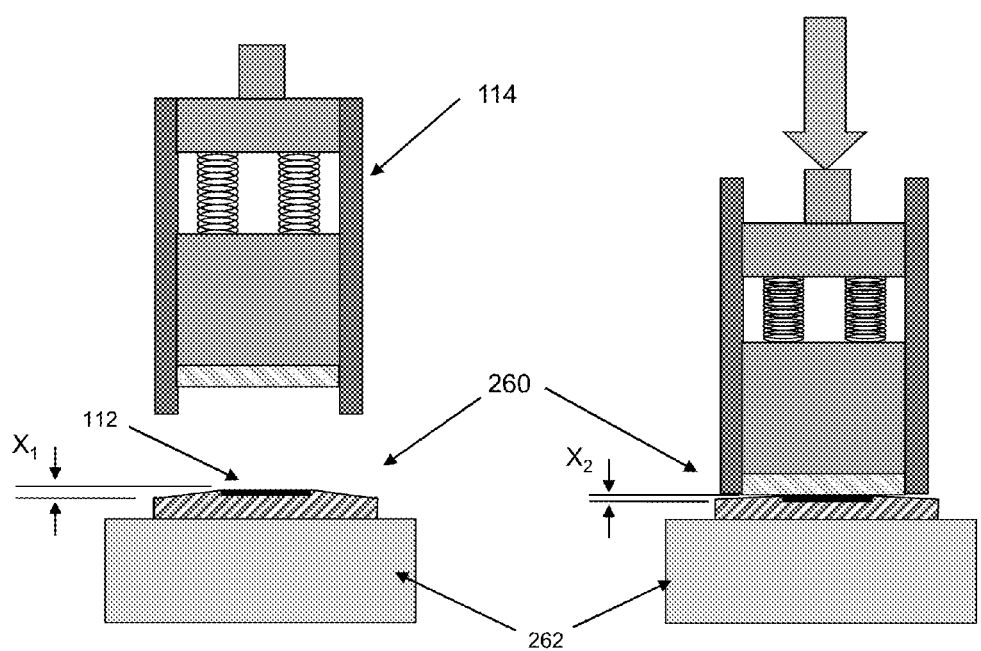
FIG. 28 shows a further compliant label formation in accordance with an embodiment of the invention.

In FIG. 21B, the tag 102 containing the magnetic fingerprint region 112 is included in a thick label 258. The thick label 258 is then attached to the item of value 262. Some examples of thick labels 258 include multilayer material, metal or ceramic substrates, plastics, extruded material or cast material. Thick labels 258 also include any other form of materials that has a thickness at least 50 micrometers. A thick label 258 may be used as a physical alignment mechanism allowing a certain degree of interlocking with the scanner such as is shown in FIG. 23. Alternatively, or in addition, the tag 102 may be made at least in part from a compliant material allowing it to conform to the shape of the magneto-optical reading element in order to ensure that good contact is achieved between the reading element and the tag, this may help to ensure that the magnetic fingerprint region 112 is read accurately. FIGS. 26 to 28 show examples of how compliant tags 102 may help to ensure good contact between the tag 102 and the reading element.

In FIG. 21C, the tag 102 containing the magnetic fingerprint region 112 may be included in a label 260 with a compliant layer. The label 260 with the compliant layer may be attached to a curved surface of an item of value 262. Some examples of labels 260 with the compliant layers include foams such as the commercial product "Poron" sold by Rogers Corporation, silicones, polyurethanes, polyethylenes. Note that if the item of value 262 is itself compliant then the compliance of the item 262 may be used to achieve the effect of the compliant tag.

In FIG. 21D, the tag 102 containing the magnetic fingerprint region 112 is embedded in an item of value 262. Alternatively the fingerprint material 112 can be directly embedded into the item of value 262.

FIG. 21E, the tag 102 containing the magnetic fingerprint region 112 is positioned within a groove or recess 264 on an item of value 262.

Figure 22:
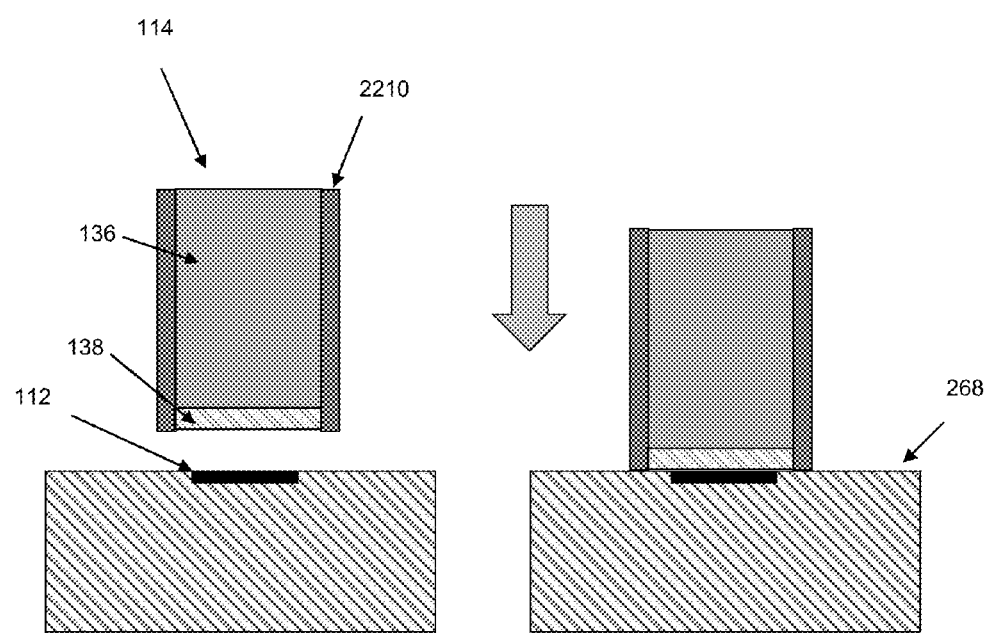
FIG. 22 shows a method of reading a tag on a level surface using a magneto-optical reading element in accordance with an embodiment of the invention.

FIG. 22 shows a method of reading a fingerprint region 112 on a tag 102 embedded on the level surface 268 of an item of value using a magneto-optical reading element 114 in accordance with an embodiment of the invention. The reading element 114 is a magneto-optic reading element and consists of a magneto-optical substrate 138 and an optical processing unit 136 combined to form the reading element 114. The reading element 114 is surrounded by a sheath 2210 which protects the reading element 114 from damage. The sheath 2210 can be made from non-magnetic material such as non-magnetic metals (such as aluminum), non-magnetic ceramics or plastic. In certain circumstances it is desirable to make the sheath 2210 (or other component around, or of, the reading element) weakly magnetic as this can enhance the magnetic field being detected by the reading element 114. For example if the tag 102 is magnetized such that the magnetic features of the fingerprint region 112 have their north pole facing the reading element 114 during reading it can be advantageous to have weakly magnetize the reading element 114 or some component near the reading element 114 such that the reading element 114 appears to be a south pole of a magnet. This can enhance the field being detected since the south pole of the reading element 114 will attract the north poles of the features thereby warping the magnetic flux lines such that they extend further out of the plane of the tag 102. Alternatively it can be advantageous to make, for example the left side of the reading element 114 a weak north pole and the right hand side a weak south pole. This may warp the magnetic flux lines in the plane of the magnet (predominantly) and may mean that the readings may be reader dependent (i.e. dependent on the specific magnetization of the reading element used). This may be used to ensure that different scanners may not be able to read certain tags (since the fingerprints may not match). The left side of FIG. 22 shows the reading element 114 before it is contacted with the magnetic fingerprint 112 and the right side of FIG. 22 shows the reading element 114 in contact with the magnetic fingerprint 112. The method of reading the fingerprint region 112 on the level surface 268 is achieved by first bringing the magneto-optical reading element 114 into contact with the magnetic fingerprint region 112 and then activating a button on the reading device 104. Once the button is activated, an image signal can be obtained and the reading procedure is completed.

FIG. 23 shows a magneto-optical reading element 114 and a tag 102 in accordance with an embodiment of the invention. On the left side of FIG. 23, the components have been magnified so that it is easy to see how they can fit together. In on embodiment, the sheath 2210 may act like an engagement element for positioning the magneto-optical substrate 138 over an area of the magnetic fingerprint on the tag 102. Also in order to minimize potential damage on the magneto-optical reading element 114, the magneto-optical reading element 114 can be designed to lie below the surface of the sheath 2210. If a tag 102 or portion of a tag 102 is at least 50 micrometers thick the recess formed by the sheath 2210 and reading element 114 can be used as a physical alignment method to allow the user to align the reading element 114 to the tag 102. The reading element 114 lies at least about 50 micrometers, at least about 150 micrometers, of at least about 200 micrometers or at least 250 micrometers, for example, below the surface of the sheath 2210. Usually the tag 102 used for this may be designed to have a thickness of at least 50 micrometers, and may be at least as thick if not thicker than the distance that the reading element 114 lies below the surface of the sheath 2210. Note that in certain circumstances effective physical alignment may be achieved by having only one side of the sheath 2210 lying above the level of the reading element 114, in this case the lip formed by the sheath 2210 sticking above the level of the reading element 114 may be used to guide the edge of the reading element 114 to the edge of the tag 102 or other physical step formed in the surface of the tag 102, or label, or item of value.

Figure 24:
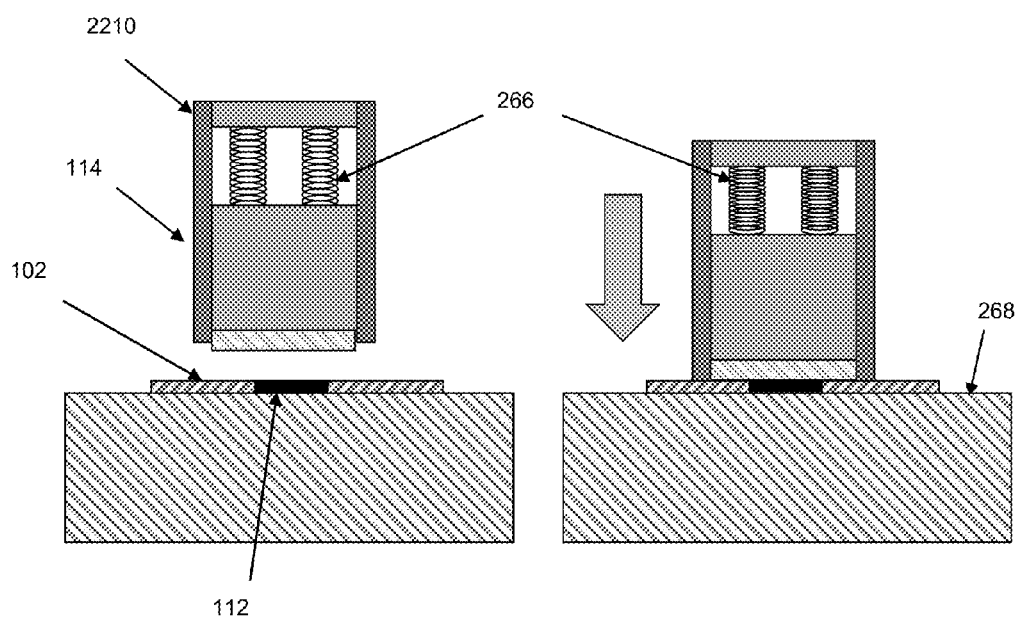
FIG. 24 shows a method of reading a tag on a level surface using a magneto-optical reading element in accordance with another embodiment of the invention.

FIG. 24 shows a method of reading a tag 102 on a level surface 268 using a magneto-optical reading element 114 in accordance with another embodiment of the invention. The magneto-optical reading element 114 is able to slide within a protective sheath 2210 via a conformation element 266 (shown as a simple set of springs). The left side of FIG. 24 shows the reading element 114 before it is contacted with the tag 102 and the right side of FIG. 24 shows the reading element 114 in contact with the tag 102. When the reading device 104 is brought in contact with the tag 102, the reading element 114 is pushed against the surface of the tag 102. The conformation element 266 ensures that the reading element 114 exerts some pressure on the tag 102, but not so much pressure as to damage the reading element 114 or the critical, fingerprint region 112 of the tag 102. This is because the design of the conformation element 266 defines the maximum pressure that the reading element 114 will exert on the tag 102, even if the reading device 104 is pushed very hard, the reading element 114 will retreat into the sheath 2210 and eventually the walls of the sheath 2210 will take the excess pressure. The conformation element 266 may include a spring system, a sponge system, a suction system, a hydraulic system and a pneumatic system. The conformation element 266 allows the magneto-optical read head 114 and the tag 102 to be in constant contact during the reading process even if the user applies uneven force during reading.

FIG. 25A to FIG. 25D shows a method of reading a tag 102 on an uneven surface 268 using a magneto-optical reading element 114 in accordance with another embodiment of the invention. FIG. 25A shows a magneto-optical reading element 114 having a small gap 267 to the surrounding protective sheath 2210. In addition, the magneto-optical reading element head 114 is connected to the sheath 2210 via a conformation element 266, for example a spring mechanism. Both the gap 267 and the spring mechanism 266 provide a certain degree of compensation when reading the magnetic fingerprint region 112 or the tag 102 on an uneven surface 268. FIG. 25A shows the reading element 114 prior to engaging it with the tag 102. In FIG. 25B, the magneto-optical reading element 114, as shown in FIG. 25A, is brought to be in contact with the tag 102 on an uneven surface 268, the magneto-optical reading element 114 is able to move within the sheath 2210 so as to conform to the tag 102 on the uneven surface 268. In FIG. 25C and FIG. 25D, the gap 267 may be replaced with a compliant layer 269 to compensate for the movement of the magneto-optical read head 114 (FIG. 25C shows the situation prior to contact and FIG. 25D shows the situation during contact with the tag 102). Note that the strength of the magnetic fields of the magnetic features within the fingerprint region 112 decay rapidly with distance. Assume that two magnetic features are situated at the same depth into the tag (that is measured from the tag surface) and that these two features have the exact same magnetic strength and orientation of their magnetic fields. If one such feature is situated at location 2510 on the tag 102 and the other at 2520, a reading of the tag as shown in FIG. 25D will result in the reading element 114 measuring a stronger contribution from the magnetic feature at a location 2520 than from the magnetic feature at a location 2510 since, because of the topography of the surface 268, the magnetic feature at the location 2520 is physically closer to the reading element 114 than the magnetic feature at the location 2510. Consequently the reading will actually be a measurement of the magnetic features of the tag 102 convoluted with the topography of the tag 102 or surface 268. In some cases this may be used as a powerful tamper-proofing or tamper-resisting mechanism since if the tag 102 is removed from one surface and placed on another the fingerprint reading will change with the change of topography that it is placed on. In other circumstances, particularly in the case where tags are initially read on a production line prior to being applied to the surface of an item of value, this may cause problems since the initial reading of the tag 102 may not match well with the subsequent readings of the tag 102 due to the topography. In such circumstances it can be advantageous to use a compliant tag as described in FIG. 21C. Another method may be to use tags 102 which can be molded to have their reverse sides fit with the contours of the surface they are applied to, however the front surface of the tag should remain planar. An example of such a tag 102 may be a multilayer tag with a hard planar front layer and an underlying layer (below the fingerprint region) made from a thermoplastic material. When the tag 102 is applied to the item of value, it is heated such that the thermoplastic layer melts or at least softens such that it may conform to the surface of the item of value.

FIG. 26 shows a method of reading a fingerprint 112 contained in a compliant label 260 using a magneto-optical reading element 114 in accordance with an embodiment of the invention. Here the compliant label 260 is shown attached to an item of value 262 having a circular cross section. Due to the shape of the item of value 262, the surface of the compliant label 260 is also curved prior to engagement with the reading element 114 (as shown on the left side of the figure). Due to its compliance, the surface of the label 260 is able to deform to a flat surface when engaged by the reading element 114 (as shown on the right side of the figure). This allows good contact between the fingerprint region 112 of the label and the reading element 114. It is important however that the label 260 is not so thick or so compliant that the fingerprint region 112 is significantly distorted in the plane of the label 260 during reading—significant distortion may allow the magnetic features within the fingerprint region 112 to be displaced relative to each other and this may reduce the matching between the stored fingerprint signal and the read fingerprint signal.

FIG. 27 shows how a complaint label 260 can assist when the item of value 262, to which the label 260 is affixed, has a rough surface. The left side of FIG. 27 shows the situation prior to engagement with the reading element 114. The label 260 conforms to the surface of the item of value 262 causing the label's surface to be undulating. In general, the fingerprint 112 is first read on a production line where the label 260 is kept flat. If the subsequent reading is made when the label 260 has an undulating surface, certain magnetic features of the fingerprint region 112 may be further away from the surface of the reading element 114 if the label 260 is not compliant. However during reading (engagement with the reading element 114 with some pressure applied to the reading element 114) with a compliant label 260, as shown on the right side, the surface of the fingerprint region 112 is able to conform to the reading element 114, thereby facilitating an accurate reading of the fingerprint region 112.

FIG. 28 shows another compliant label formation in accordance with an embodiment of the invention. Here the label 260 is constructed such that the surface of the fingerprint region 112 is slightly raised with respect to the remaining surface of the label 260 surrounding the fingerprint region 112. As shown on the right side of the figure, when attached to a flat item of value 262 prior to engagement with the reading element 114, the surface of the fingerprint region 112 is raised by a distance of $X_1$ above the surface at the edge of the label 260. As shown on the left side of FIG. 28, during engagement this distance is compressed to $X_2$, that is the surface of the fingerprint region 112 is compressed to lie closer to the plane of the surrounding surface. Depending on the shape or size of the reading element 114 and the pressure exerted on the reading element 114 during reading, $X_2$ may be zero (i.e. lying in plane with the surrounding surface) or even negative (i.e. the fingerprint region's surface is pushed below the surrounding surface). This label 260 design facilitates good contact between the fingerprint region 112 and the reading element 114 since all the pressure exerted on the reading element 114 is concentrated towards flattening the surface of the fingerprint region 112, and if the other portions of the label 260 are slightly raised (for example due to a burr or lip formed during die cutting, or due to damage), or if the other portions have dirt on them, they will not have a marked effect on the reading of the fingerprint region 112.

Figure 29:
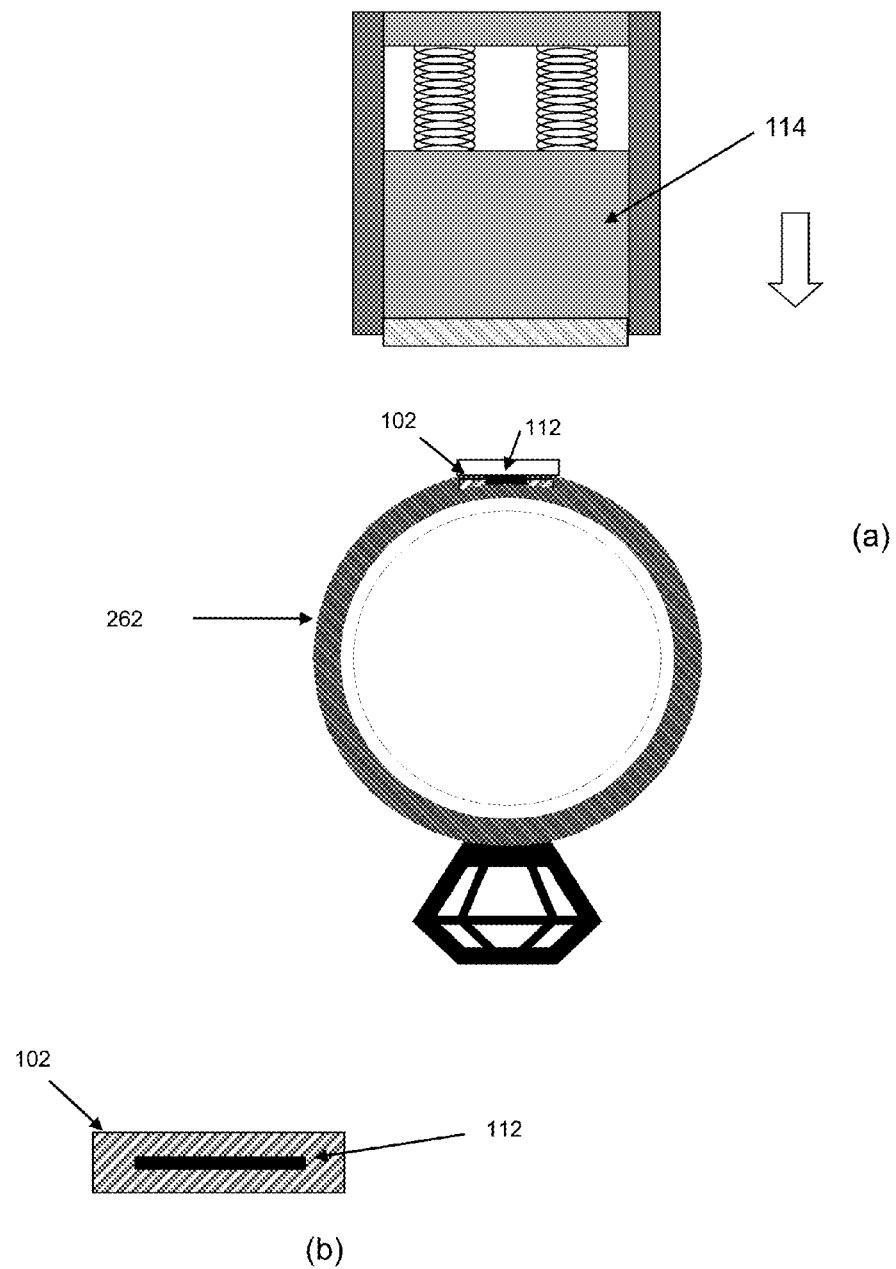
FIG. 29A shows a cross-sectional view of a tag containing a fingerprint region in accordance with an embodiment of the invention.
FIG. 29B shows a plan view of a tag and a fingerprint region in accordance with an embodiment of the invention.

FIG. 29A shows a cross-sectional view of a tag 102 containing a fingerprint region 112 in accordance with an embodiment of the invention. The tag 102 is embedded in an object of value 262 (for example a ring) to be identified and a magneto-optical reading element 114 in accordance with an embodiment of the invention. The surface of the ring 262 which contains the tag 102 has been flattened to ensure good contact between the surface of the tag 102 and the reading element 114. The magneto-optical reading element 114 is brought into contact with the tag 102 for reading the magnetic fingerprint 112. FIG. 29B shows a plan view of the tag 102 and a fingerprint region 112 in accordance with an embodiment of the invention. Here the tag 102 is rectangular to fit with the space available on the ring surface. The fingerprint region 112 is an elongated groove containing fingerprint material. It may also be feasible and may be desirable to plate a thin metal layer over the tag 102 for aesthetic purposes (for example to look the same as the surrounding ring)—for example if the ring is gold then the plating of the ring 262 can be gold. This plating (or other coating) can also serve to protect the tag 102 and fingerprint region 112 from the environment (for example scratching and corrosion). An important feature of the invention is highlighted in this embodiment: that a single scanner with one standard reading element can read fingerprint regions of various shapes and sizes and contained in or attached to the surface of a variety of items of value. Provided that the standard reading device 104 (and associated magneto-optical reading element) is able to read a sufficiently large proportion of the fingerprint region 112 in order to ensure fingerprint matching above an acceptable threshold value it is not necessary that all the fingerprint regions 112 are the same shape and size. This is very important commercially because it allows the use of a standard reading device 104 or scanner for use with a wide variety of products.

Figure 30:
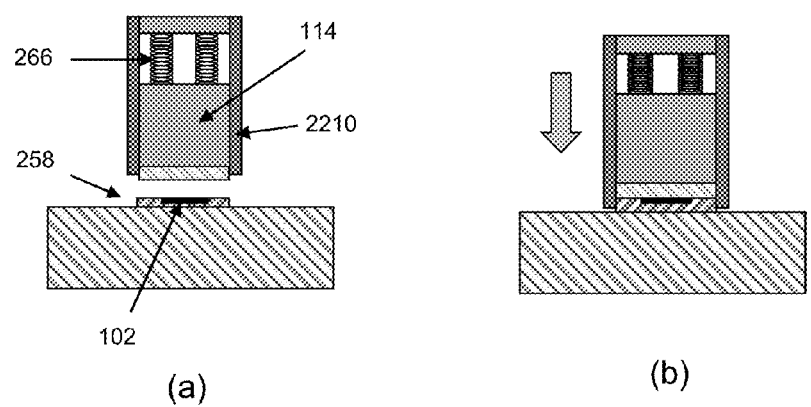
FIG. 30A shows a situation prior to engaging a magneto-optical reading element with a thick label in accordance with an embodiment of the invention.
FIG. 30B shows a magneto-optical reading element being compressed against a thick label when reading a tag in accordance with an embodiment of the invention.

FIG. 30A and FIG. 30B show cross-sectional views of a magneto-optical reading element 114 when reading a tag 102 in accordance with an embodiment of the invention. The magneto-optical reading element 114 is surrounded by a protective sheath 2210. The magneto-optical read head 114 is connected by means of a spring mechanism 266, to the sheath 2210. The internal walls of the sheath 2210 are essentially complementary in shape to a perimeter of a thick label 258 in which the tag 102 with a set of identification features is positioned.

FIG. 30A shows the situation prior to engaging the magneto-optical reading element 114 with the thick label 258. The springs 266 are in an uncompressed state. FIG. 30B shows the magneto-optical reading element 114 being compressed against the thick label 258 when reading the tag 102. The protective sheath 2210 substantially surrounds the thick label 258. When the magneto-optical read head 114 is compressed against the thick label 258, the springs 266 are compressed and the magneto-optical reading element 114 is pushed inside the sheath 2210. The internal walls of the sheath 2210 surround the label 258 and provide the user with a physical engagement mechanism to ensure that the reading device 104 is correctly aligned to the label 258 (and therefore to the tag 102 and its fingerprint region 112). The label 258 and sheath 2210 can be of any suitable shape, for example a square, rectangle, triangle or polygon, however it is preferable that the shape is not completely symmetrical, i.e. that the shape uniquely defines the orientation of the reading device 104 or scanner with respect to the label 258. Such a label 258 and sheath 2210 configuration is shown in FIG. 31, described below.

Figure 31:
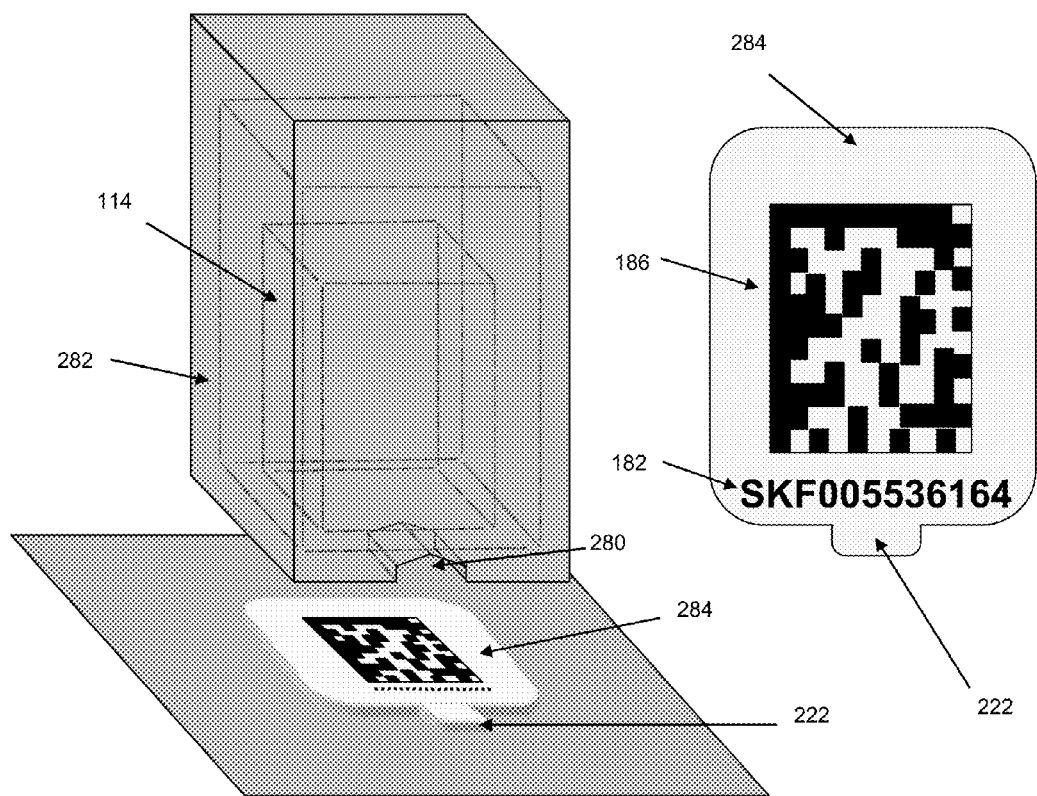
FIG. 31 shows a method of reading a label with an alignment feature using a magneto-optical reading element in accordance with an embodiment of the invention.

FIG. 31 shows a method of reading a label 284 with an alignment feature 222 using a magneto-optical reading element 114 in accordance with an embodiment of the invention. The label 284 contains an embedded fingerprint region 112 covered by a thin cover layer (the fingerprint region 112 is not shown since it is hidden by the cover layer). A data matrix barcode 186 and human-readable serial number 182 are printed on the surface of the cover layer. To achieve a desired alignment for reading the fingerprint on the label 284, a combination of a notch 280 on a housing 282 surrounding or adjacent to the magneto-optical reading element 114 and a stub 222 on a label 284 can be used to provide an interlocking means. As the magneto-optical reading element 114 is brought upon the label 284, the notch 280 on the housing 282 of the magneto-optical reading element 114 provide a mechanical guide to ensure accurate alignment and orientation of the scanner with respect to the label. The interlocking prompts the user to adjust the magneto-optical reading element 114 to the label 284 in a preferred alignment. Note that the housing 282 may be a protective sheath as described with reference to previous figures.

Figure 32:
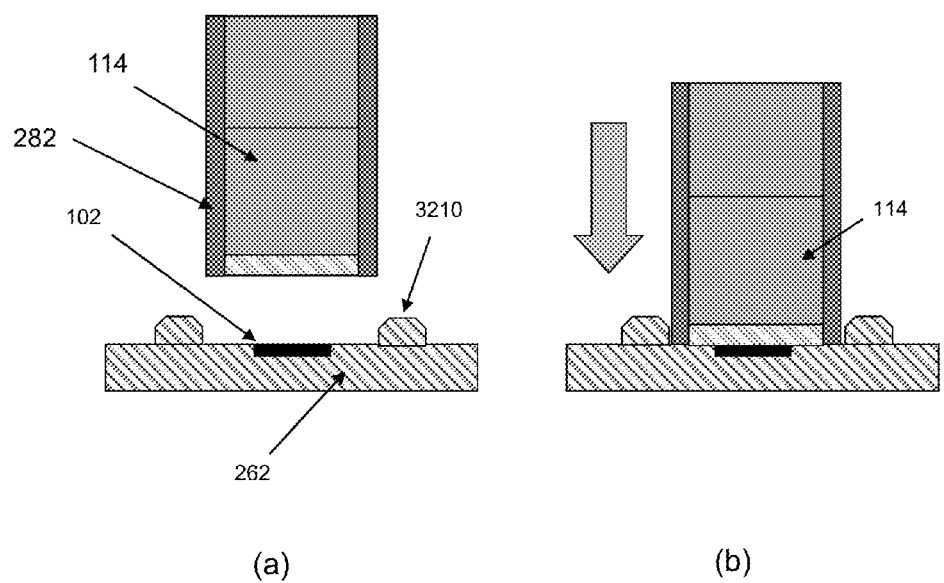
FIG. 32 shows a method of reading a tag containing a fingerprint in accordance with an embodiment of the invention.

FIG. 32 shows a method of reading a tag 102 containing a fingerprint 112 in accordance with an embodiment of the invention. The tag 102 is embedded in the surface of an item of value 262. The item of value 262 has a protrusion or protrusions 3210 adjacent to the tag 102. These protrusions 3210 are designed to guide or interlock with the housing 282 of the magneto-optical reading element 114. FIG. 32A shows the situation prior to engagement between the reading element 114 and tag 102. FIG. 32B shows the situation during engagement. Here the magneto-optical reading element 114 is moved down such that the magnetic reading element 114 contacts (or at least is in close proximity to) the surface of the tag 102. The protrusions 3210 act to guide the position of the reading element 114 with respect to the tag 102. Note that protrusions 3210 may completely surround the tag 102 or the housing 282 and protrusions 3210 may also be formed on the tag 102 itself or on a label to help guide the alignment.

Figure 33:
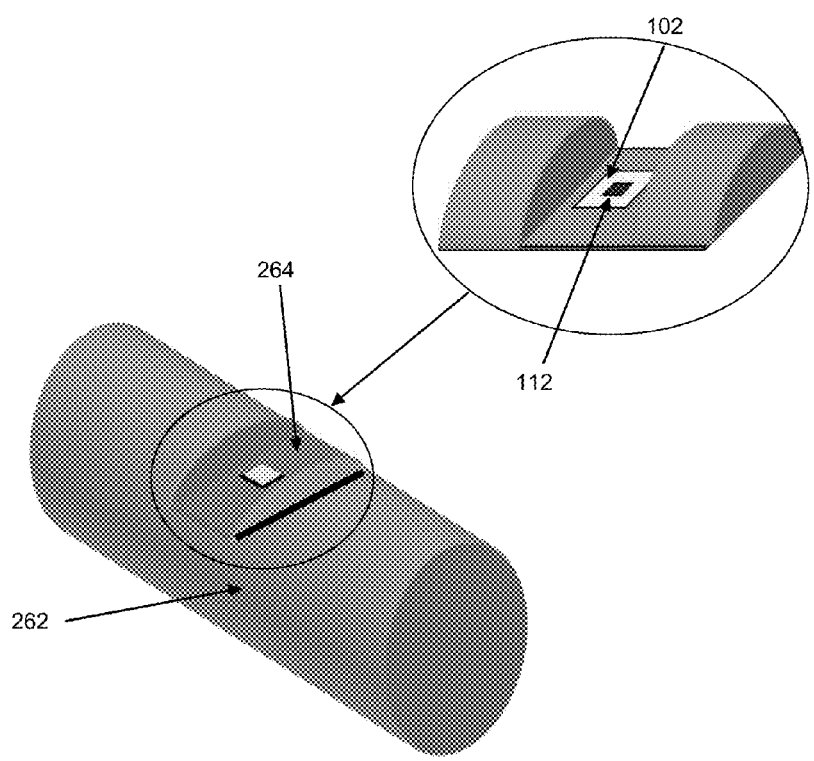
FIG. 33 shows a tag in a groove of an object to be identified in accordance with an embodiment of the invention.

FIG. 33 shows a tag 102 containing a magnetic fingerprint 112 in a groove 264 of an object 262 to be identified in accordance with an embodiment of the invention. The walls of a groove 264 for the tag 102 can be used to help align the reading device 104 or scanner and tag 102 as is described in relation to FIG. 32. Such a groove 264 is also advantageous if the object 262 to be identified has no suitable flat surfaces on which to attach the tag 102. Such objects include cylindrical objects but not so limited. Such a groove 264 also has the advantage that it helps to protect the tag 102 from mechanical abrasion and inadvertent contact with objects. Note that the groove 264 need not be an open-ended trough as shown in FIG. 33, any depression, e.g. a four-walled square section depression may be suitable.

Figure 34:
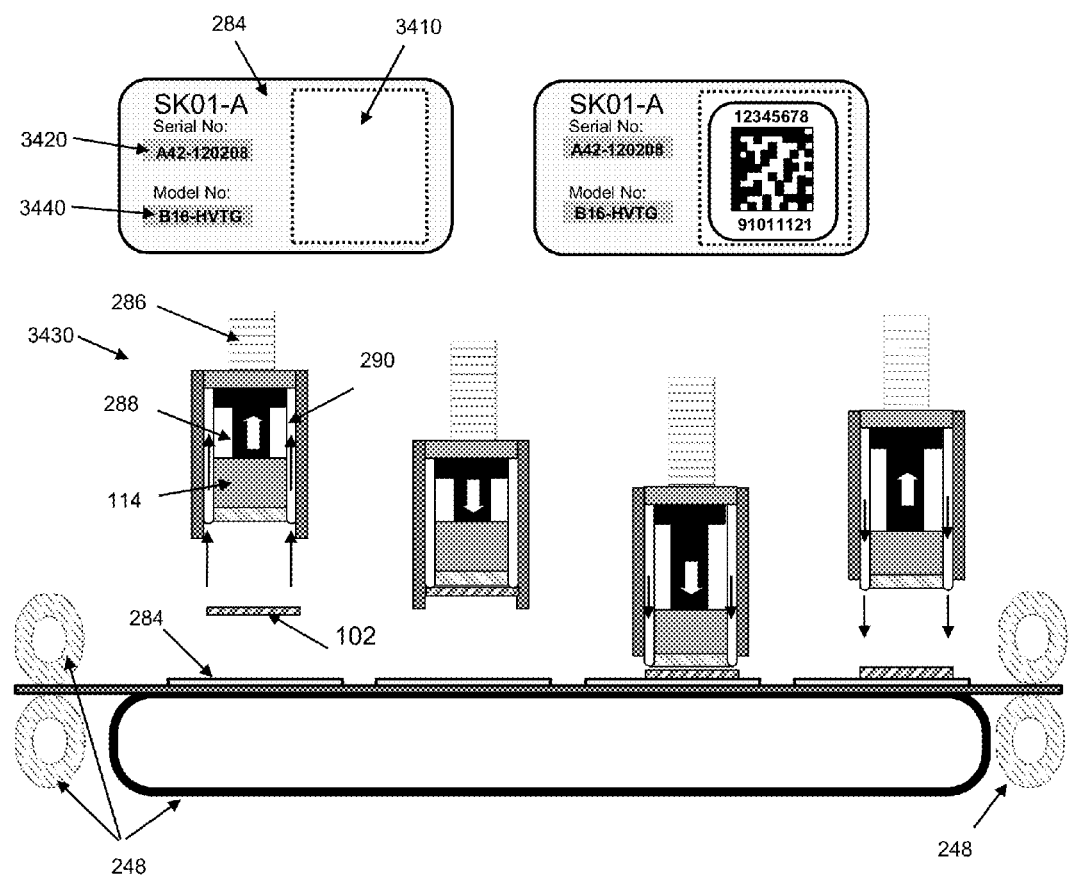
FIG. 34 shows a method of applying a tag on a label in accordance with an embodiment of the invention.

FIG. 34 shows a method of applying a tag 102 to a label 284 in accordance with one embodiment of the invention. In FIG. 34, the applicator head 3430 is equipped with magneto-optical reading element 114. The applicator head 3430 also contains a barcode scanner (not shown), and both the tag's identity 3410 including the two-dimensional barcode 186 and the magnetic fingerprint region 112 are read before applying it to the label 284. The fingerprint region 112 is not shown as the fingerprint region 112 is situated below the cover layer on which the two-dimensional barcode 186 is printed and so is not visible. The applicator head 3430 also contains a printer (not shown) which prints a serial number 3420 and a model number 3440 on the label 284 immediately prior to applying the tag 102 to the label 284. The applicator head 3430 links the information which has been printed to the label 284 (i.e. the serial number 3420 and model number 3440) with the two-dimensional barcode number 186 on the tag 102 and reading of the fingerprint region 112. This linked information, that is the label's serial number 3420 and model number 3440 and corresponding barcode and fingerprint information of the tag 102 are sent to a data server which may be the remote server 108 (or may be linked to the remote server) described in relation to FIG. 1 and FIG. 2. This linking of the information ensures that if the tag 102 is scanned as described in relation to FIG. 2 and a successful match occurs, the additional information sent to the mobile device or computer of the end user can include the label's serial number 3420 and model number 3440 so that the user may verify visually that the numbers printed on the label match what is stored in the data server. This linking of tag 102 and label 284 data also allows the system to interface seamlessly with a brand owner's database, for example, since the brand owner will maintain their database using their information printed on the label 284 and may most likely not associate that information with the two-dimensional barcode number 186 on the tag 102 and fingerprint 112. In such an assembly line, the tags 102 are dispensed by air suction and piston movement. The magneto-optical reading element 114 is mounted at the bottom of the reading element piston 288 to enable reading of the tag's fingerprint region whenever a tag 102 is being dispensed. The labels 284 are moved by means of a system 248 comprising pinch rollers and a flat surface, the dispensing arm 286, the piston 288, the air suction column 290 and the magneto-optical reading element 114 may be controlled locally or remotely. The configuration of the labels 284, tags 102 and applicator head 3430 may vary widely. In this regard, the process of the application and data linking may be varied, and the type of data may also be varied (not limited to serial number or model number, but may include manufacturing date and time, expiry date, warranty information, calibration information, batch number and so on). Note that the example given was that of a brand owner tagging a branded item of value, but an example may also be that the data owner is an organization or government body and the item or object being tagged or labeled may be an identification document, license, financial instrument, etc. For example another method to link the data is to read the tag information first then attach the tags 102 to labels 284 and finally print information on the labels 284 and apply the labels 284 to the items of value. In this case the barcode number 186 of the tag 102 may be read immediately prior to, or immediately after, printing the information on the label 284, this may allow the tag 102 and label information to be linked since the computer controlling the printer may also have the read barcode number of the tag 102 on the label 284. Yet another method may be to have machine readable label information on the labels 284 (for example barcodes corresponding to the serial and model numbers) and machine readable information on the tag 102. When the tag 102 is applied to the label 284, both sets of information (that is that of the label 284 and that of the tag 102) may be read and linked. If the label 284 is subsequently attached to the item of value then either the label 284 or the tag 102 information may be read again and the database is updated such that that tag 102 or label 284 is now active (that is on an item of value) and the time and date of the application (plus other information as required) is stored on the database. Clearly the tag information can also be linked to information which has been directly printed on the item of value itself, this concept is shown in relation to FIG. 35 described below. Or the item of value may use only the tag as its identification and all relevant information about the item of value may be stored on the database and not be shown on the label or on the item of value itself.

FIG. 35A shows a method of dispensing tags 102 with magnetic fingerprint regions 112 onto items of value 3510 adapted to be identified in accordance with another embodiment of the invention; FIG. 35B and FIG. 35C show the item of value 3510 before and after a tag 102 has been dispensed. The item of value 3510 is shown as marked with a machine readable marking 3520 and human readable information including the item's serial number 3420 and model number 3440. The markings on the item of value 3510 can be done through direct part marking for example. Direct part marking includes methods such as dot peen marking, laser marking and ink jet marking among others. Alternatively the item of value 3510 may be marked using a radio frequency identification (RFID) tag for example. In the example shown in FIG. 35 the machine readable marking 3520 is read either immediately before or immediately after dispensing the tag 102 onto the item of value 3510. At least one identification feature of the tag 102 is also read and this allows the label or tag 102 to be linked in the database with the item of value 3510 and the information printed on the item of value 3510.

FIG. 36A shows a cross-sectional view of a tag 102 according to the invention. FIG. 36B shows an isometric view of the same tag 102. The tag 102 comprises a fingerprint region 112 which consists of magnetic particles mixed into a viscous polymeric material (e.g. a polyurethane or epoxy, for example), the mixture has been dispensed or screen printed onto the back of a cover layer 3610 and has been cured such that the magnetic particles are set into position with respect to each other. The cover layer 3610 is between 1 micron and 200 microns thick, but preferably between 25 and 50 microns thick and is made from a non-magnetic material, such as a polyethylene terephthalate "PET" film. The cover layer 3610 also has both a machine readable marking 3640 (e.g. a barcode) and a human readable marking 3650 (e.g. a number corresponding to the number coded into the barcode) on its surface. Such markings are generally applied by printing for example ink jet or thermal ribbon transfer printing, but may be applied by other means such as laser marking if appropriate. The tag 102 further comprises a compliant base layer 3630 at least 10 micrometers thick, but more preferably between 100 and 750 micrometers thick. Examples of compliant base layer materials which are suitable for certain applications include "Poron" sold by Rogers Corporation and the "Norton" range of foams made by Saint Gobain Performance Plastics Corporation. The base layer 3630 material has a thin adhesive layer (not shown) on both its upper and lower surfaces. After the fingerprint material has been dispensed onto the back of the cover layer 3610, the cover layer 3610 is laminated onto the base layer 3630. The adhesive on the top surface of the base layer 3630 allows the cover layer 3610 to be firmly bonded to the base layer 3630. After lamination, the laminated films are die cut such that the individual tags 102 are left on the liner 3620. This liner 3620 is a disposable carrier so that the individual tags can be handled easily (e.g. rolled into rolls and fed into a tag applicator, for example). The liner 3620 also serves to ensure that the adhesive on the bottom surface remains in good condition so that when the tag 102 is applied to the surface to which is must bond, the bond formed is strong. Typically a liner 3620 has a non-stick coating on its upper surface (i.e. where it contacts the adhesive of the base layer 3630) so that the tag 102 can be easily removed from the liner 3620.

FIG. 37A shows a process of a tag 102 being attached to an item of value 3510 in accordance with a further embodiment of the invention and FIG. 37B shows a tag 102 attached to an item of value 3510 in accordance with a further embodiment of the invention. FIG. 37A shows a tag 102 being attached to an item of value 3510 according to a further embodiment of the invention. In this embodiment the tag 102 and attachment mechanism is adapted to prevent tampering with the tag 102, for example if the tag 102 is removed from the item of value 3510 and placed on another item, it will no longer function—hence the "tamperproofing". On the left side of FIG. 37A an application head 3730 picks up a tag 102. Note that here the application head 3730 is shown without any magneto-optical reading element to emphasize that in this and other embodiments it is not necessary that the applicator head 3730 must include a magneto-optical reading element and the applicator head 3730 or dispenser need not have any tag or fingerprint reading functionality. In the example shown in FIG. 37, the tag 102 has the fingerprint region 112 printed on the underside of a thin cover layer 194. The bond strength between the fingerprint region 112 and the cover layer 194 is purposefully chosen to be of moderate strength, for example not to be excessively strong. Also shown on the left side of FIG. 37A, a droplet of adhesive 3710 (e.g. an epoxy) is applied to the surface of the item of value 3510 immediately prior to the tag application. Here a dispensing nozzle 3720 is used to dispense the droplet of adhesive 3710. While the droplet of adhesive 3710 is still substantially liquid, the application head 3730 pushes the tag 102 into the adhesive 3710. The droplet of adhesive 3710 is cured (or cooled if a thermoplastic is used) either while the application head 3730 is still in contact with the tag 102 or shortly after the application head 3730 is withdrawn. Since the surface of the application head 3730 which touches the tag 102 is substantially flat, this ensures that the tag 102 remains flat after the application head 3730 is removed. The process is tuned to ensure that the tag 102 remains flat even after the adhesive 3710 is cured. Provided that the bond between the adhesive 3710 and the fingerprint material is stronger than the bond between the fingerprint region 112 and the cover layer 194, then if an attempt is made to remove the tag 102, the cover layer 194 will peel away while the fingerprint region 112 will remain firmly embedded in the cured adhesive 3710, providing a good tamperproofing or tamper-resistant mechanism. Another advantage of this method of attaching a tag 102 to an item of value 3510 is that even if the surface of the item of value is uneven (as shown in FIG. 37A) the adhesive 3710 serves to effectively flatten the surface such that the surface of the tag 102 which can help to ensure that the magneto-optical reading element 114 makes good contact with the tag surface and reads the fingerprint region 112 effectively. An example where this kind of tag attachment method is particularly useful is if the tag 102 is bonded across the junction between a bottle and its lid. Using this method the tag 102 can be bonded across the uneven interface between the bottle and lid and if the adhesive is chosen correctly the tag 102 will shear if the lid is opened (hence providing tamperproofing or tamper-resistance). Another example of a tag 102 adapted to provide a tamperproof seal for a bottle is shown in FIG. 38 described below.

FIG. 38A shows a bottle 3820 sealed by its lid 3810 being straddled by a tamperproof label 3830 in accordance with an embodiment of the invention. FIG. 38B shows a plan view of the label 3830 which comprises a tag 102 and has a human readable number 3840. The label 3830 is made from molded plastic and the tag is integrally embedded into the surface of the label 3830. FIG. 38C shows a cross-sectional view of the label 3830 in accordance with an embodiment of the invention. The label 3830 may include a tag 102 (barcode) printed on a thin cover layer 3850. A fingerprint region 3860 attached to the underside of the cover layer 3850. The label 3830 further comprises a notch 3870 situated directly below the fingerprint region 3860 of the tag 102. One of the bottom surfaces 3880 of the label 3830 is securely bonded to the lid 3810 while a second bottom surface 3890 is securely bonded to the bottle 3820. If the lid 3810 is removed, the label 3830 shears at the notch 3870 thereby destroying the fingerprint 112. This provides tamperproofing or tamper-resistance for the bottle 3820.

FIG. 39A and FIG. 39B show one method of dealing with misalignments between the reading device 104 and fingerprint region 112 of a tag 102 in accordance with an embodiment of the invention. A first reading of the magnetic features of the tag 102 covers a reading area shown by 225, as shown in FIG. 39A. The fingerprint region 112 is confined to an area which is smaller than reading area 225. FIG. 39B shows subsequent reading areas 3910 and 3920 of a tag 102 when the reading device 104 is misaligned. In this example both the subsequent reading areas 3910 and 3920 are of the same dimension as the first reading area 225, however, as shown they are both misaligned, i.e. neither 3910 nor 3920 is aligned as the first reading area 225 was. However since the fingerprint region 112 is smaller than the reading areas 225, 3910 and 3920, in each case, even with misalignment, the reading device 104 is able to capture all the magnetic features of the fingerprint region 112. This facilitates matching of the fingerprint readings taken. An example of dimensions which may be suitable for this approach are: If the magnetic fingerprint region 112 is essentially a circular region with diameter of approximately 3 mm, then if the magnetic reading areas are of square dimension of approximately 5 mm by 5 mm, it may allow misalignments of 1 mm in any direction before the magnetic reading area does not capture some features of the fingerprint region 112. It is also advantageous in this kind of approach to use some form of alignment markings or method on the tag 102 to ensure that the reading areas are always at least roughly aligned in the same direction, in other words to prevent subsequent reading areas to be rotated by 90° or even 180° from the first reading orientation. Such alignment makes the matching algorithms simpler and provides a higher confidence in matching.

FIG. 40A and FIG. 40B show the process of reading the fingerprint region 112 of a label 260 according to an embodiment of the invention where the surface of the label 260 is not flat and where the label 260 is not sufficiently compliant to ensure good contact with the flat surface of a magneto-optical reading element 114. In this case the label 260 surface is not flat because the label 260 is attached to a curved item of value 262. FIG. 40A highlights the problem in scanning the fingerprint region 112 of a label 260 when the surface of the label 260 is not flat as can be seen in FIG. 40A. If the reading element 114 is contacted with the label 260 surface, it does not contact with the entire label 260 surface but instead gaps exist between the reading element 114 and the label 260 surface. Since magnetic fields of small particles decay rapidly with distance, such gaps can reduce the accuracy of the fingerprint reading. FIG. 40B shows one method of dealing with the issue. Here the scanning device is equipped to "rock" the reading element 114 during reading of the fingerprint region 112. On the left side of FIG. 40B the reading element 114 is shown in its position of being tilted to the left and on the right side of FIG. 40B it is shown as it is rocked across to the right. Here the fingerprint reading is affected by continuously capturing the magneto-optical signal during the rocking process. For example if a CMOS imaging chip (such as described in relation to FIGS. 4 to 7) is used to capture an image then it may continuously capture during the rocking motion to form one final image. An analogy to this continuous capturing method can be found in basic photography where the photographer chooses to leave the camera shutter open for an extended period such that the final image is essentially the integration of all light which has reached the camera's imaging plane during the time the shutter was open. It is important in such a rocking imaging method to ensure that the lateral movement (i.e. sliding) between the reading element 114 and label 260 surface is kept to a minimum during the rocking, otherwise the image may become blurred. Although this method is shown in two dimensions in FIG. 40B, it can be used as the three dimensional rocking (i.e. where the rocking is also into and out of the plane of the page). Furthermore other schemes are contemplated such as taking a continuous video during the rocking to deal with issues such as sliding between the reading element 114 and label 260 surface.

Figure 41:
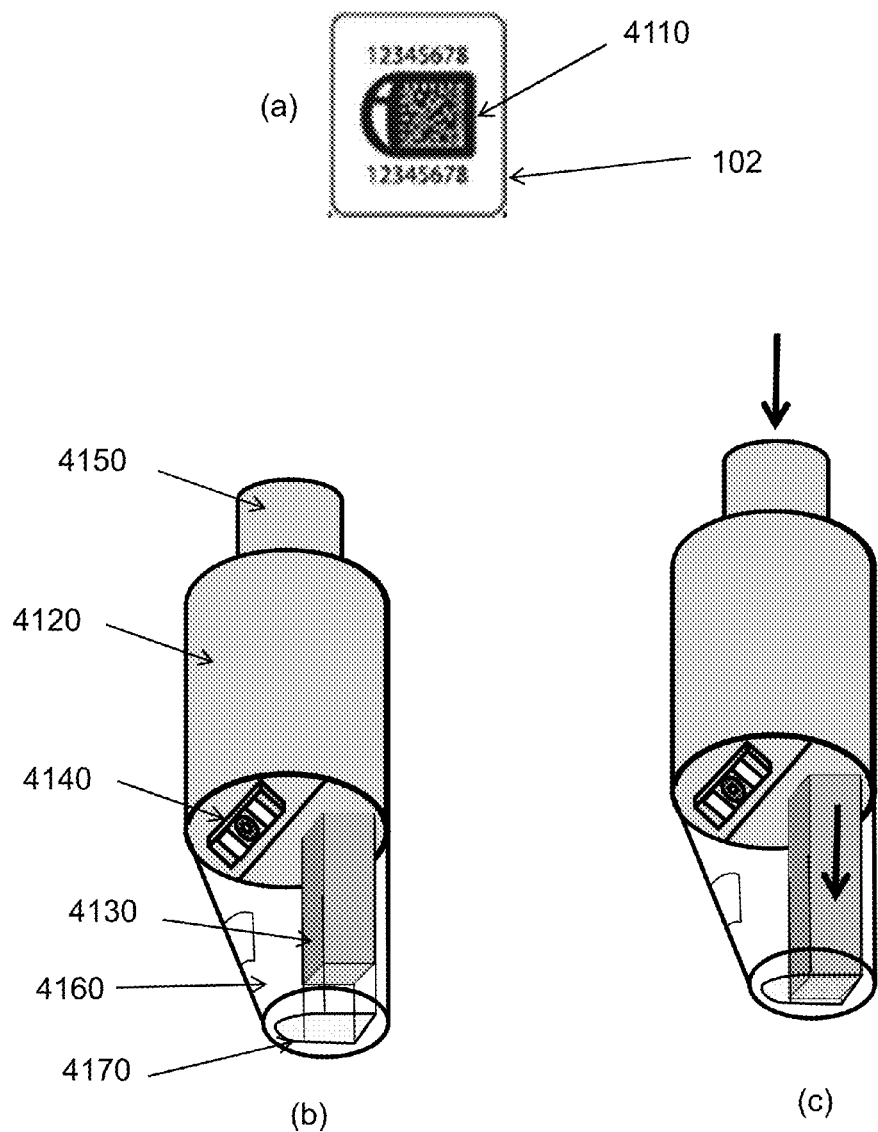
FIG. 41A shows a tag that is adapted to be read by a reading device in accordance with an embodiment of the invention.
FIG. 41B and FIG. 41C show a scanning device in accordance with an embodiment of the invention.

FIG. 41A shows a tag 102 that is adapted to be read by a reading device 4120 according to an embodiment of the invention. FIG. 41A shows the tag 102 and the markings on its surface. The tag 102 has a padlock-shaped insignia or logo 4110 containing a datamatrix barcode. The tag 102 has a fingerprint region situated (not shown) below the barcode region. FIG. 41B and FIG. 41C show a reading device 4120 comprising a magneto-optical reading element 4130, a second reading element being a barcode reader 4140, a button 4150, a transparent sheath 4160 with an opening 4170 at the bottom. The opening 4170 is designed to closely correspond to the shape and size of the insignia 4110 and this allows the user to align the reading device 4120 correctly with respect to the tag 102 when reading the fingerprint region. To use the reading device 4120, the user positions the reading device 4120 such that the opening 4170 surrounds the insignia 4110. The button 4150 is then depressed lightly which activates the barcode reader 4140 to read the barcode on the tag 102. Once that is successfully completed the button 4150 is depressed further and the magneto-optical reading element 4130 moves downwards within the sheath 4160 as shown in FIG. 41C. Once the magneto-optical reading element 4130 is in good contact with the surface of the tag 102 the fingerprint region is read.

FIGS. 5 to 7 disclose respective reading elements 162, 166, 172 for reading magnetic and optical information at the same time from a tag 102. For use with these respective reading elements 162, 166, 172, the magnetic and optical information on the tag 102 that are being read are usually positioned adjacent to each other. It may be advantageous to be able to have a reading element such that the reading element allows for reading magnetic and optical information from the same place (i.e. superimposed or on top of each other) at the same time. Such a method may be provided as shown below.

Figure 42:
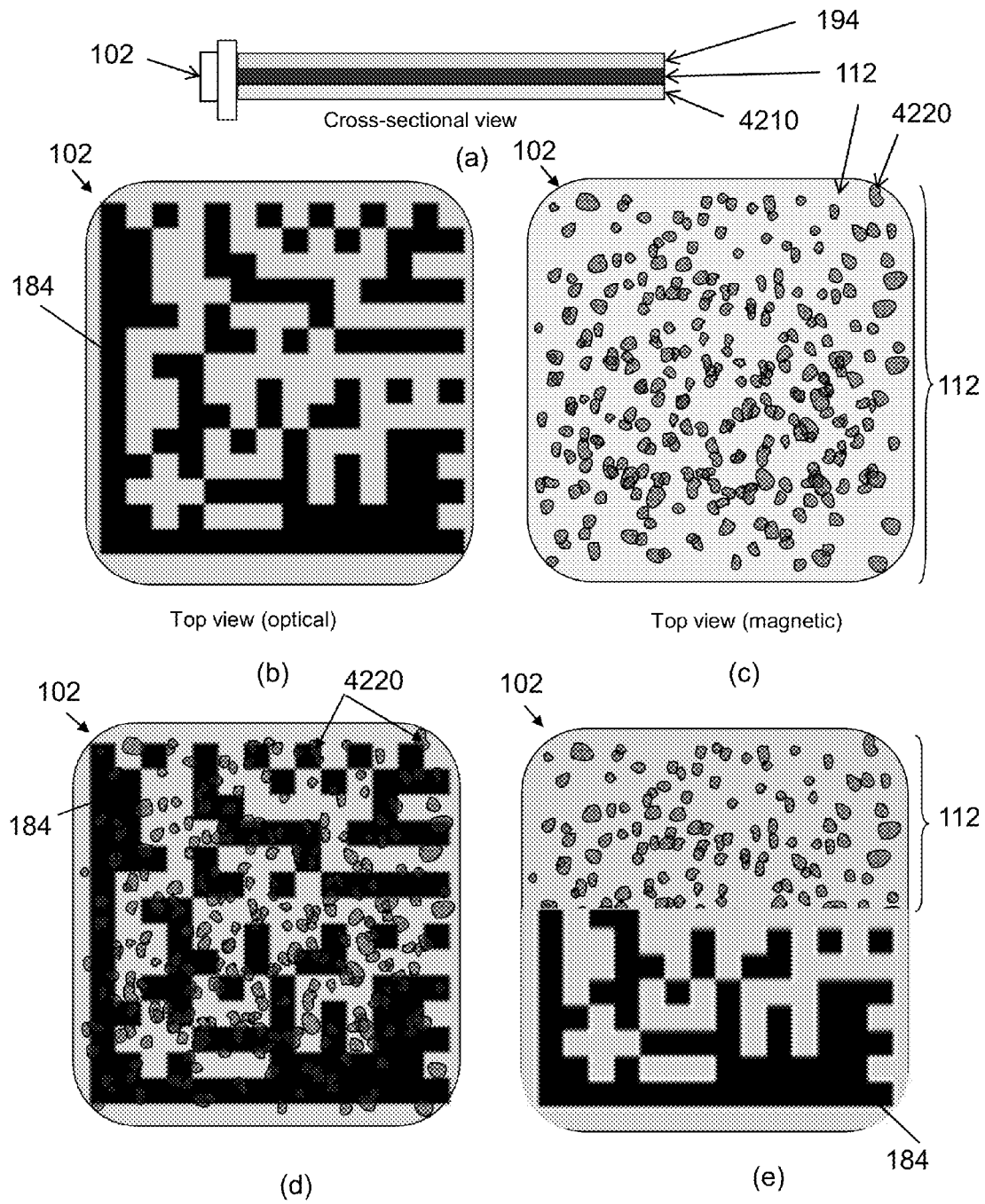
FIG. 42A to FIG. 42E shows a cross-sectional view of a tag where the magnetic information and optical information are positioned at the same place within the tag.

FIGS. 42A to 42E shows a cross-sectional view of a tag 102 where the magnetic information and the optical information are positioned at the same place (i.e. on top of each other). In FIG. 42A, the tag 102 may include a cover layer 194 which has an optical barcode (not shown) (herein a "barcode" is taken to include datamatrix codes and other machine readable optical information) printed on its top surface, a magnetic fingerprint region 112 which may be in the form of a layer positioned below the cover layer 194 and an adhesive layer 4210 positioned below the magnetic fingerprint region 112. Note that a barcode is shown as the optical marking purely for illustrative purposes. The description that follows for this figure and other figures should be considered to be general and not confined to barcodes.

FIG. 42B shows a top optical view of the tag 102. Optical information in the form of a barcode 184 which has been printed on the surface of the tag 102 may be seen from the top view of the tag 102.

FIG. 42C shows a top magnetic view of the tag 102. If the user is able to take a magnetic image of the tag 102, the user may be able to effectively look "through" the cover layer 194 and the optical information 184 and "see" the magnetic features 4220 contained within the magnetic fingerprint region 112. Note that the magnetic features can, for example, be individual magnetic particles. Note that the magnetic features 4220 are shown here as being of a certain "color". The "color" of the magnetic features 4220 is a figment of what light source 140 is being used, the properties of the properties of the magneto-optical substrate 138 and the optical set-up of the respective reading elements 162, 166, 172 as shown previously in FIGS. 5 to 7. Furthermore the "color" or intensity of the light detected as a result of the magnetic features 4220 is also dependent on the magnetic field in the region of the layers 156, 158 and 160 due to the magnetic features 4220. For example a north field may result in an intense (light) area while a south field may result in a dark (or less intense) region. The strength of the magnetic field (among other factors) will determine the intensity of the light. Therefore the intensity of the light will vary across a magnetic feature 4220 as the intensity of the magnetic field varies. This means that in the case as shown in FIG. 42C, i.e. where all the magnetic features 4220 are shown to have the same uniform light color or intensity may be an idealized case and the reality may be a varied light intensity or color across each magnetic feature 4220.

FIG. 42D shows a top view of the composite image (i.e. the optical and magnetic features superimposed on each other). It is clear that when viewed from the top, the barcode 184 and the magnetic features/particles 4220 overlap each other. In the reading element 162, 166, 172 as shown in FIGS. 5 to 7, it may be clear that reading a tag 102 such as the one shown in FIG. 42D may be difficult since the reading elements 162, 166, 172 are designed to simultaneously read magnetic and optical features positioned in different (for example adjacent) areas of a tag 102.

Assume, for example, that tag 102 may be scanned by the reading element 166 shown in FIG. 6 (which has half of the scanning area dedicated to scanning magnetic information and the other half dedicated to scanning magnetic information). This may result in a scan of the kind shown in FIG. 42E where one half of the magnetic fingerprint region 112 is scanned and the other half of the optical barcode 184 is scanned. In the case where the optical barcode 184 is a datamatrix code as shown, scanning only half of the area may not necessarily be sufficient to interpret the number (or datamatrix information). Therefore it may not be possible to interpret as accurately as required the optical information using the respective reading elements 162, 166, 172 shown in FIGS. 5 to 7. However this format is nevertheless very useful if the datamatrix code is also to be used as an alignment marking with which to reference the positions of the magnetic features, since not all of the datamatrix need necessarily be imaged in order to be used effectively as an alignment feature. If however the tag is arranged such that the datamatrix code and the magnetic features to be read are arranged adjacent to each other and the reading element can be aligned such that the magneto-optical substrate covers at least part of the magnetic features while the optically transparent opening covers a sufficient part of the datamatrix code then the reading elements shown in FIGS. 5 to 7 and with reference to FIG. 43 are able to simultaneously decipher the optical datamatrix and read the magnetic features, while also being able to use the optical (datamatrix or other) features as alignment markings for positioning and matching the magnetic signatures with the reference signature.

Figure 43:
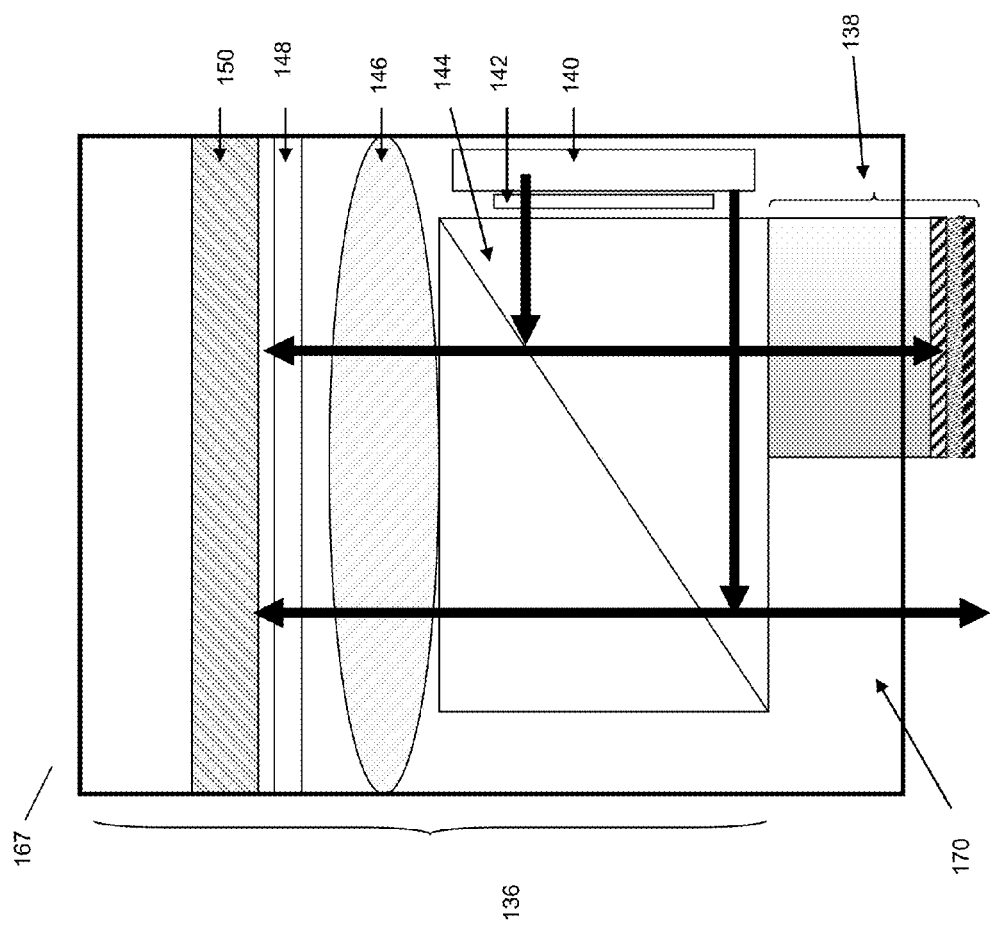
FIG. 43 shows a cross-sectional view of a reading element in accordance with another embodiment of the invention.

FIG. 43 shows a cross-sectional view of a reading element 167 in accordance with another embodiment of the invention. The reading element 167 is adapted to read both magnetic information and optical information at the same time. Unlike the reading element 166 as shown in FIG. 6 which has two columns, the reading element 167 only has a single column. Therefore, the reading element 167 only includes a single polarizer 142, 148, a common lens system 146, a beam splitter 144 and a single light source 140. In addition, the magneto-optical substrate 138 does not cover the entire viewing area of the optical set up as there is an optically transparent opening 170 adjacent to the magneto-optical substrate. Therefore the optical detector 150 is able to capture the magneto-optical and optical information simultaneously. If for example, the optical detector 150 is a complementary metal-oxide-semiconductor (CMOS) or charge-coupled device (CCD) imaging chip, the image it may take may have the top half of the image as pure optical information and the bottom half as magnetic information (converted into an optical format by the magneto-optical substrate 138) as shown in FIG. 42E.

Note that it may be advantageous to be able to scan both optical and magnetic information from the same area of the tag 102 at the same time because it allows a smaller tag 102 to be used while still being read simultaneously by the reading element. Further it may potentially allow for more accurate correlation between the magnetic and optical features for matching since the optical features being used as a reference for fingerprint matching of the magnetic features is physically closer to the magnetic feature and therefore it shall be more accurate.

A method of modifying the reading element as shown in FIGS. 4 to 7 and FIG. 43 such that the respective reading element 134, 162, 166, 172, 167 allows for reading magnetic and optical information from the same place (for example on top of each other) at the same time are shown below.

Figure 44:
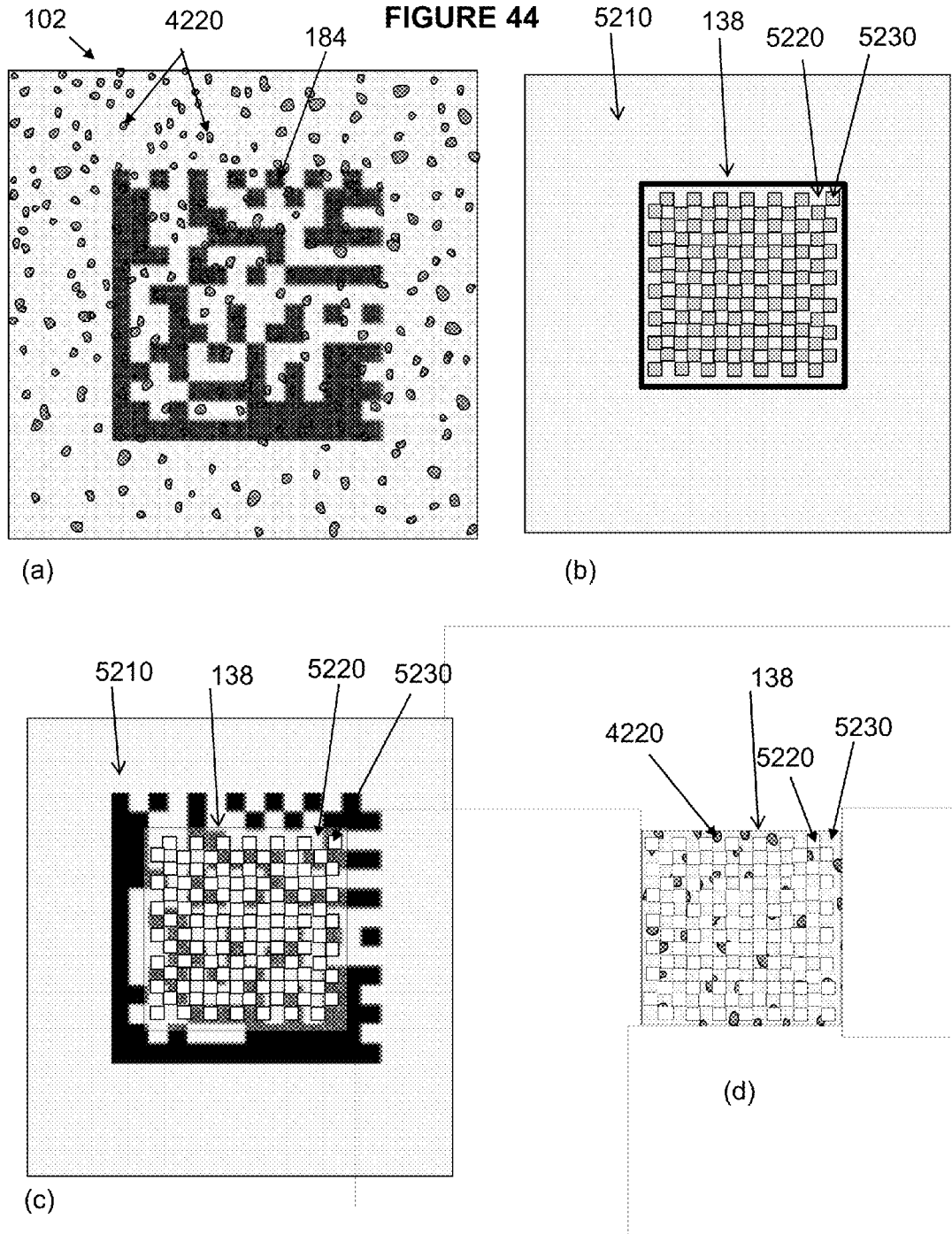
FIG. 44A shows a top view of a tag with optical and magnetic features artificially superposed.
FIG. 44B shows a configuration of an imaging area of a tag taken using a reading element in accordance with an embodiment of the invention.
FIG. 44C shows optical tag information from an image of the tag taken using the reading element in accordance with an embodiment of the invention.
FIG. 44D shows magnetic tag information from an image of the tag taken using the reading element in accordance with an embodiment of the invention.

In one embodiment, the first coating layer 156 and/or the second coating layer 158 may be patterned. The second coating layer 158 (and if necessary the first coating layer 156) is patterned such that some regions of the surface of the magneto-optical substrate 138 are reflective and while adjacent areas form optically transparent openings within the magneto-optical substrate. FIG. 44A shows a top view of a tag 102 is shown with its optical 184 and magnetic 4220 features artificially superposed. The tag 102 is to be read with a reading element that has a magneto-optical substrate 138 with the first coating layer 156 and/or the second coating layer being a patterned mirror layer(s) on its surface. FIG. 44B shows a configuration of an imaging area of the tag taken using the reading element. The majority of the image is a purely optical image area 5210. The magneto-optical substrate 138 is partitioned into small square regions some of which are dedicated to optical imaging 5220 and the others 5230 are dedicated to imaging the magnetic features. The magnetic 4220 and optical 184 imaging squares are arranged in an array across the area of the magneto-optical substrate 138. FIG. 44C shows just optical tag information from an image taken of the tag using the reading element shown in FIG. 44A. The outline of the magneto-optical substrate 138 is shown as a thin line in FIG. 44 C so that the viewer can easily see the position of the magneto-optical substrate 138 with respect to the rest of the image. Here optical information is obtained from the entire region 5210 and also from the optical portion 5220 of the magneto-optical substrate 138 (in FIG. 44C the magnetic portions 5230 of the magneto-optical substrate are just shown as being pure white regions). The same image captured by the optical detector (which can be a CMOS sensor) also contains the magnetic features 4220 that correspond to the magnetic imaging squares 5230 of the magneto-optical substrate 138. The portion of the image is shown in FIG. 44D. The optical portion of the image is just left as pure white and only the portion of the image pertaining to the magnetic information is shown (again the outline of the magneto-optical substrate 138 is shown as a thin line so that the viewer can easily see the position of the magneto-optical substrate 138 with respect to the rest of the image). Note that the actual image taken by the CMOS imaging chip is the sum of the two images shown in FIG. 44C and FIG. 44D. However the portions of the images are split to emphasize that the data obtained from the portions of the image can be treated separately. This is easy to do since the relative position of the magneto-optical optical substrate 138 with respect to the CMOS imaging chip is fixed. So it is simple to calibrate which portions of the image relate to magnetic features 4220 in the tag 102 and which relate to the tag 102's optical information 184. Note that by choosing the magnetic 5230 or optical 5220 regions of the magneto-optical substrate 138 correctly it is possible to decipher the tag 102's datamatrix code even though portions of it are not visible due to the magnetic imaging regions. In FIG. 44B and FIG. 44C, the optical and magnetic portions of the magneto-optical substrate 138 have been chosen to be about a quarter of the area of the datamatrix elements. This means that a portion of each datamatrix element is sampled and that is sufficient to tell whether that particular datamatrix element is black or white (unless there is substantial damage to the datamatrix). This configuration provides a simple way to achieve simultaneous reading of the magnetic 4220 and optical 184 features of the tag 102 and provides ample information to decipher the datamatrix code and accurately map the position of at least some of the magnetic features 4220 with respect to the optical markings 184 on the tag 102. In the case shown in FIG. 44 these optical fiducial markings 184 are in fact at least some portion of the datamatrix itself. In the case the optical datamatrix serves a dual function of being the second set of identification features and simultaneously act as the optical alignment markings with which to assist the matching of the signal derived from first set of identification features (i.e. the magnetic features). Obviously this method may provide less area for sampling the magnetic features 4220. Therefore the system is designed so that the tags 102 contain sufficiently dense packing of magnetic features 4220. A user will thus have a very good possibility of sampling sufficient magnetic features 4220 to allow accurate and reliable matching to occur. Similarly the optical information 184 is, in parts, blocked by the magnetic imaging regions 5230. Therefore the optical features 184 of the tag 102 are chosen such that they can be easily deciphered and the image has sufficient optical feature 184 sampling to ensure accurate mapping of the magnetic features 4220 with respect to the optical markings of the tag 102. Note that in this method the first coating layer 156 of the magneto-optical substrate 138 and/or the second coating layer 158 of the magneto-optical substrate 138 and/or protective layer 160 may be patterned to allow optimal optical imaging to occur in the optical imaging regions. These regions shall not be so small that diffraction causes reading problems. Patterning of these regions can be accomplished by a variety of standard lithographic techniques such as using a photolithographic patterning technique (for example) in conjunction with one or more of lift-off patterning, wet-chemical etching, or dry etching (e.g. reactive ion etching), for example. Note for all the configurations where one is seeing optical features 184 from the tag 102 through the first coating layer 156, the protective layer 160 must be at least partially transparent if the optically transparent opening is in the magneto-optical substrate and a protective layer covers the opening.

There are many ways to use the reading elements described above to normalize the magnetic information on a tag 102 based on the optical information on the tag. By this we mean that the optical information printed on the tag 102 can be used to accurately position the magnetic features with respect to some reference reading of the tag 102. One method may be described below using a datamatrix marking as the optical reference.

FIG. 45A shows an optical top view of a tag 102 that is being produced. There is a datamatrix 184 printed on the surface of the tag 102 and around the datamatrix 184 there are four optical fiducial markings 4710 radiating outwards. FIG. 45B shows a magnetic top view of the same tag 102 that is being produced. Below the surface of the tag 102 there is a magnetic fingerprint region 112 including magnetic features 4220.

FIG. 45C shows a configuration of a reading element 173 which may be used to reading the datamatrix 184 and the magnetic features 4220 on the tag 102. On the production line, there is at least one reading element 173 and this reading element 173 can be used to obtain the reference reading of the tag 102 allowing the reference signature of the tag 102 to be stored in a database. This reading element 173 has a larger magneto-optical scanning area than the reading elements used to read the tags in the field, and furthermore it may be configured differently. The majority of the scan area is dedicated to scanning magnetic data (scan area 4730) while just a peripheral area 4720 is dedicated scanning optical information. When this reading element 173 is placed on top of the tag 102 that is being produced, an image such as that shown in FIG. 45D is obtained. This image may be used to derive the reference signature of the tag 102 that is stored in a database. Here a portion of the fiducial markings 4710 are visible through the peripheral optical viewing area, while the majority of the image shows the magnetic features 4220 of the tag 102. Assuming that the fiducial markings 4710 and the datamatrix 184 are printed in the same printing step and are therefore aligned accurately with respect to each other (i.e. that one can reliably deduce the position and of the optical features that comprise the datamatrix 184), the image shown in FIG. 45D can be used to accurately map the position of each magnetic feature 4220 with respect to the position of the optical datamatrix features 184. If the relative position of the fiducial markings 4710 and datamatrix features 184 are not accurate or reliable with respect to each other, a high resolution optical camera can be used to measure the relative distances and this can be used to map the position and orientation of each magnetic feature 4220 with respect to the datamatrix features 184. Note that the method of obtaining the reference image described in relation to FIGS. 45A to 45D above is just one method of achieving this. Other methods include stitching separate images together—generally these separate images may overlap at least in some regions, but this is not strictly necessary.

Figure 46:
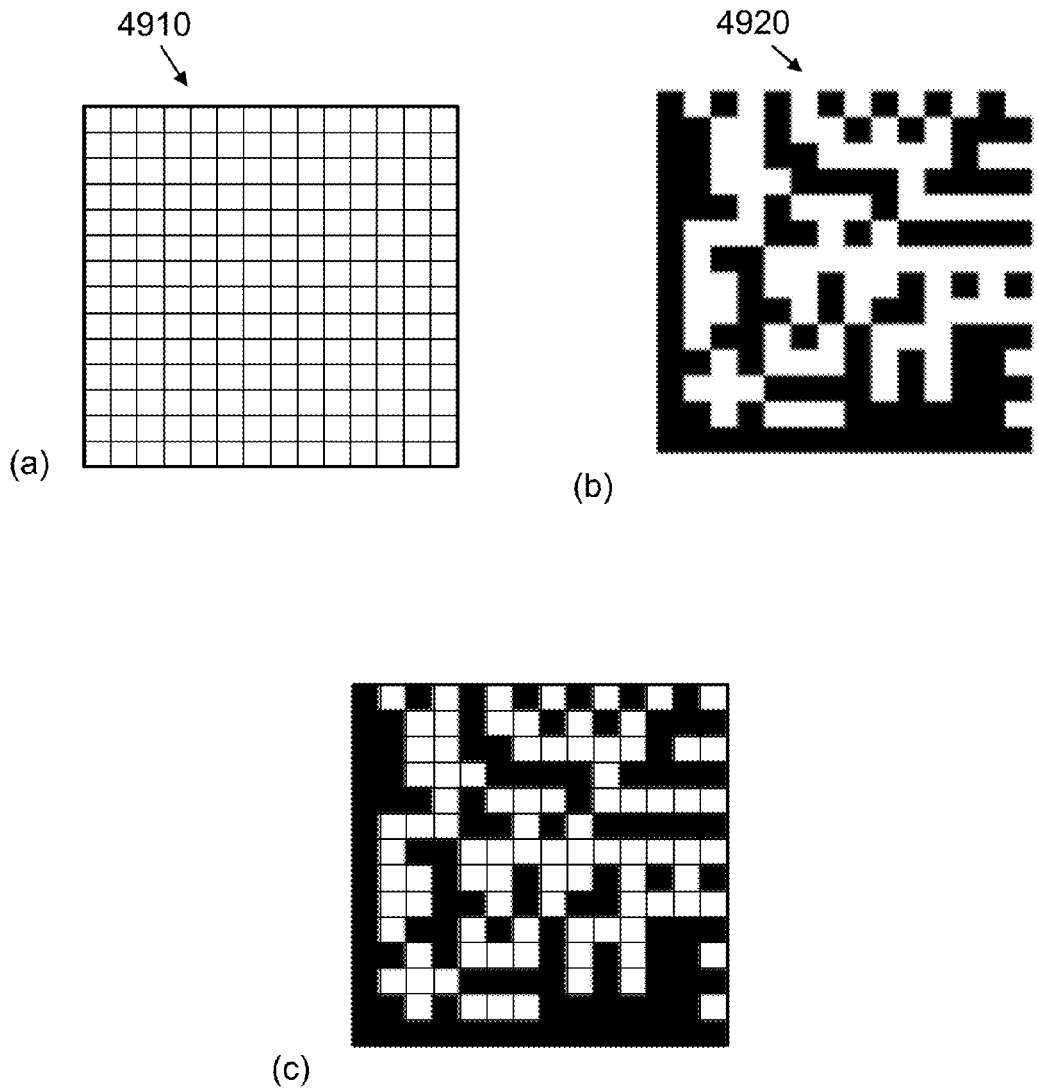
FIG. 46C shows a grid pattern in accordance with an embodiment of the invention.
FIG. 46B shows a datamatrix code in accordance with an embodiment of the invention.

FIGS. 46A to 46C illustrates that a datamatrix code is actually well-suited to act as both the second set of identification features and as a reference optical marking (or alignment marking) against which the magnetic signal can be matched against the reference magnetic signal because the datamatrix is based on a regular grid format. FIG. 46A shows a 14×14 element grid pattern 4910. FIG. 46B shows a standard 14×14 element ECC 200 datamatrix code 4920. In this case the code 4920 represents the 16 digit number "1234567890123456". FIG. 46C shows a superposition of the grid pattern 4910 from FIG. 46A and the datamatrix code 4920 shown in FIG. 46B. It can be easily seen from FIG. 46C that the datamatrix code 4920 is simply a grid pattern where certain of the elements have been filled in black and others are left white. This means that such a datamatrix code 4920 can be used as a grid pattern for mapping the magnetic features. This example is chosen as it is very simple to understand however, it will be clear to anyone skilled in the art that a wide variety of optical markings can serve as reference markings with which to map the magnetic features. Both interpolation (usually for magnetic features within the optical marking region) and extrapolation (usually for features outside of that region) can be used. This two dimensional interpolation or extrapolation mapping can, for example, be carried out using the methodologies described for one dimensional interpolation and extrapolation mappings in international patent application WO 2007/133163 A1.

Figure 47:
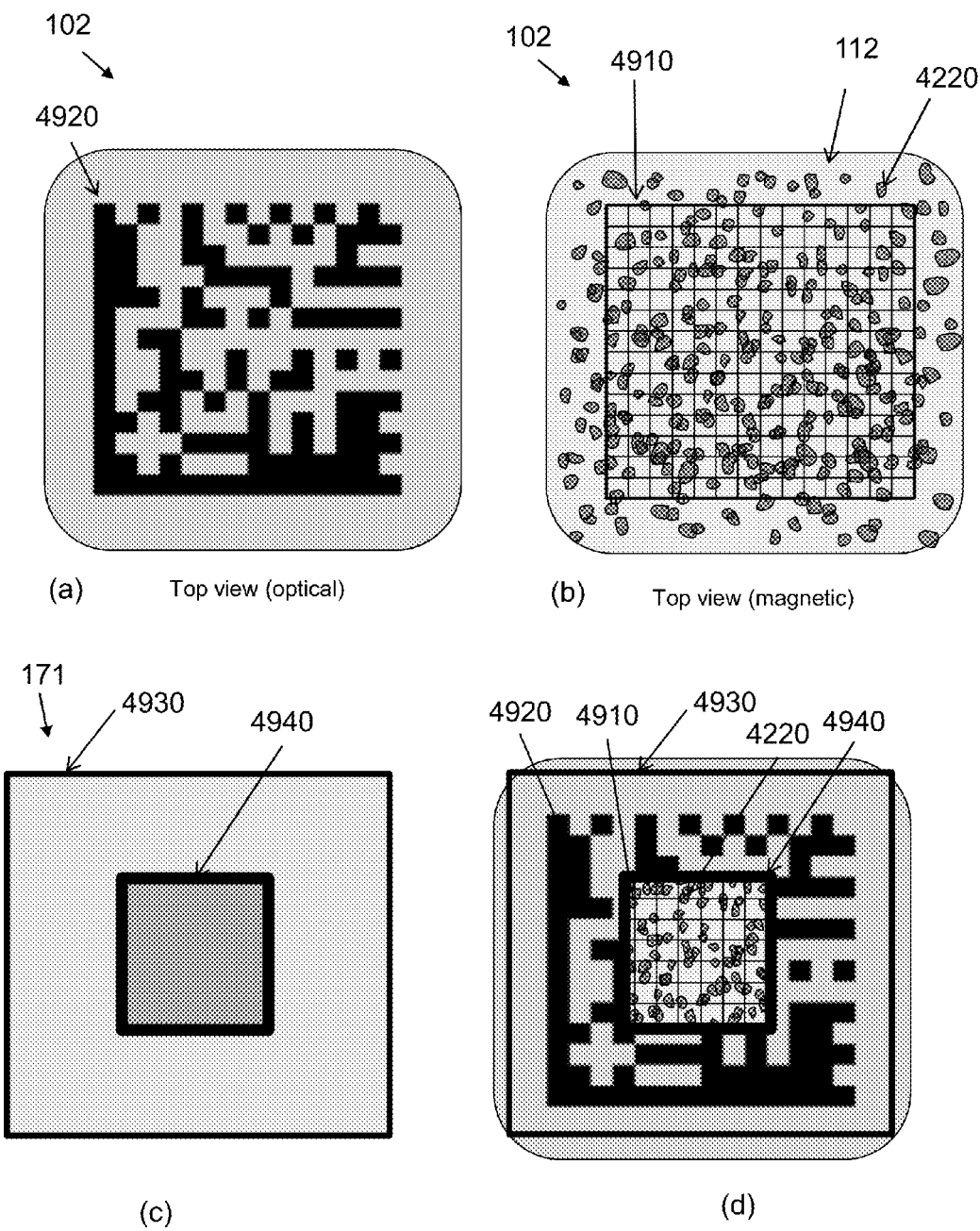
FIG. 47A shows an optical top view of a tag that is being produced in accordance with an embodiment of the invention.
FIG. 47B shows a magnetic top view of a tag that is being produced in accordance with an embodiment of the invention.
FIG. 47C shows a configuration of a reading element which may be used to read the optical and magnetic information on the tag in accordance with an embodiment of the invention.
FIG. 47D shows an image of the tag taken using the reading element of FIG. 47C in accordance with an embodiment of the invention.

FIG. 47A shows an optical top view of a tag 102 such as the one that was shown during its manufacture in FIGS. 45A to 45D. Here the tag 102 has been die-cut such that the fiducial markings 4710 that were shown in FIG. 45A are no longer present and the only optical marking remaining on the surface of the tag 102 is the datamatrix code 4920. The discussion below assumes that the reference reading of the tag 102 as described in relation to FIGS. 45A to 45D has occurred such that all the magnetic features 4220 within the final tag 102 (shown in FIG. 47B) have been scanned during the reference reading. The reference signature is derived from this reference reading of the tag.

FIG. 47B shows the magnetic top view of the same tag 102. The magnetic fingerprint region 112 is shown to cover essentially the entire area of the tag 102. There are numerous magnetic particles 4220 within the magnetic fingerprint region 112 and one such magnetic particle 4220 is marked. FIG. 47B also shows artificially how the grid pattern 4910 from the datamatrix code 4920 superposes on the magnetic particles 4220 allowing their position to be accurately mapped with respect to the optical datamatrix code 4920.

FIG. 47C shows a configuration layout 171 of the image taken by a CMOS (or other optical detection unit) of a reading element to be used in the field. Here the optical scan area 4930 is substantially bigger than the magnetic scan area 4940. The outer perimeter of the optical scan area 4930 and the outer perimeter of the magnetic scan area 4940 are marked. Having a smaller magnetic scan area 4940 than the optical scan area 4930 can be achieved using a reading element with the format shown in FIG. 43A and FIG. 43B, for example (except that in the case shown here the magneto-optical substrate is placed centrally with respect to the reading element).

FIG. 47D shows an image of the tag 102 when the reading element is positioned centrally on the tag 102 shown in FIGS. 47A and 47B. The reading element is able to scan both magnetic particles 4220 and datamatrix code 4920 from the tag 102 simultaneously. Again, the outer perimeter of the optical scan area 4930 and the outer perimeter of the magnetic scan area 4940 are marked. As in FIG. 47B, the grid pattern 4910 from the datamatrix code 4920 is artificially superposed on the magnetic features 4220 within the magnetic scan area 4940. By superposing the grid pattern 4910 artificially, one can demonstrate graphically how the position of the magnetic features 4220 imaged in this reading of the tag 102 can be correlated with the position of the magnetic features 4220 from the reference reading of the tag 102, i.e. how the signature derived from this reading can be compared with the reference signature (the reference reading was described in relation to FIGS. 45A to 45D) that has been stored in a database.

Figure 48:
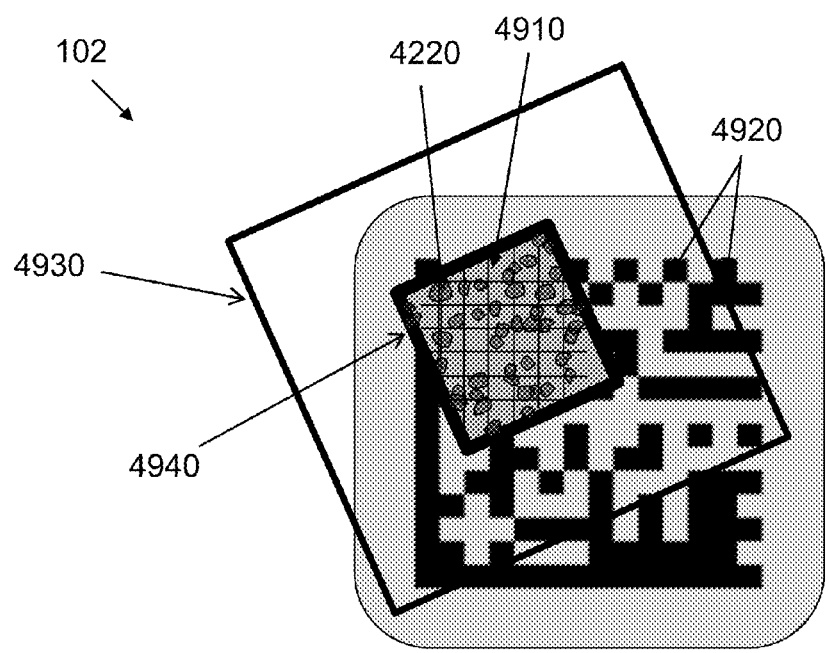
FIG. 48 shows an optical and magnetic reading of a tag in accordance with an embodiment of the invention.

A further reading of the tag 102 is shown in FIG. 48. Here the reading element is poorly aligned with respect to the reference reading of tag 102 as described in relation to FIG. 45. The reading element is not centered and it is rotated with respect to the reference reading of the tag 102. Again, the outer perimeter of the optical scan area 4930 and the outer perimeter of the magnetic scan area 4940 are marked. As in FIG. 47D, the grid pattern 4910 from the datamatrix code 4920 is artificially superposed on the magnetic features 4220 within the magnetic scan area. By superposing the grid pattern 4910 artificially, one can demonstrate graphically how the position of the magnetic features 4220 imaged in this reading of the tag 102 can be correlated with the orientation and relative position of the reference signature derived from the reference reading of the tag 102, i.e. how the signature derived from this reading can be compared with the reference signature (the reference reading was described in relation to FIG. 45A to 45D) that has been stored in a database. This shows that even for very poorly aligned readings, that using the alignment marks the system is able to accurately map the position of the magnetic features 4220 that are being read with respect to the reference reading. Note further that the magnetic features 4220 being scanned in this reading are different from the ones being scanned in the reading shown in FIG. 47D, but in both cases the magnetic features 4220 being scanned were scanned in the reference reading (described in relation to FIG. 45A to 45D) where a much larger magnetic scan area was employed. Therefore the reading in the field can be sufficient for matching provided:
 a) that enough optical information is scanned to accurately determine the alignment markings such that the position of the magnetic features 4220 in the scan can be accurately mapped, and
 b) sufficient amounts of the magnetic features 4220 being scanned in the reading were scanned in the reference reading of the tag 102 such that a sufficiently accurate matching can be achieved.
 In the previous sentence "sufficient amounts" and "sufficiently accurate" are subjective terms and are used only to indicate that threshold levels may be set, e.g. "sufficient amounts" may be determined by cumulative magnetic strengths or number of magnetic particles 4220 present in the scan area and "sufficiently accurate" can be a threshold of statistical confidence in the matching result. It is clear to the person skilled in the art that instead of a single reference signature, a plurality of reference signatures may be used.

Regarding the mapping of the magnetic features 4220 from the reading in the field versus the reference reading, it should be noted that the optical features 4920 can be used as a first step to map the position of the magnetic features 4220 in both readings and a second mapping step may be needed for very accurate mapping. An example of this two step mapping is explained here: after the positioning or normalization is done using the optical information 4920, then a second step can be done where the magnetic features 4220 are used to achieve a more accurate positioning with respect to the stored reference signature obtained from a reference reading of the identification tag 102. This can be done by doing a correlation of the match obtained from the optical positioning step, thereafter the obtained image of the magnetic features 4220 can be stepped left, right, up and down within a certain tolerance range and after each step the data can be correlated again to obtain the best match. This will allow accurate positioning of the magnetic features 4220 with respect to the reference signature; however a limit to the amount of movement in each direction must be set in order to prevent the data to be moved to such an extent that it loses correlation with the optical markings 4920 and may cause incorrect false positive matching.

Figure 49:
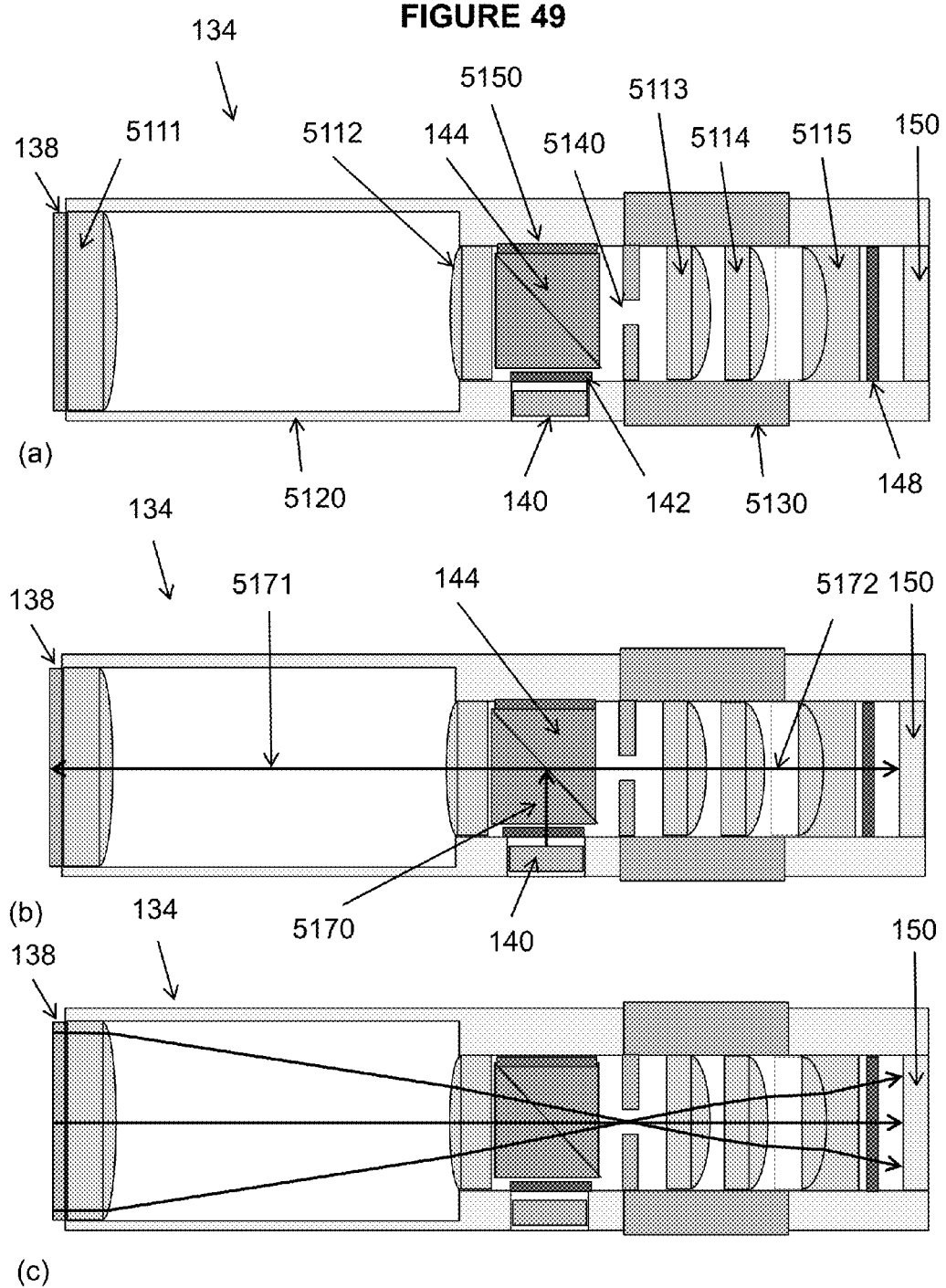
FIG. 49A shows a cross-sectional view of a reading element in accordance with an embodiment of the invention.
FIG. 49B shows direction of light travelling within the reading element in accordance with an embodiment of the invention.
FIG. 49C shows light being reflected from different areas of the magneto-optical substrate in accordance with an embodiment of the invention.

FIG. 49A to 49C shows a cross-sectional view of a reading element 134. In FIG. 49A, the reading element 134 may include a plurality of components or optical elements, for example a magneto-optical substrate 138, a light source 140, a first polarizer 142 and a second polarizer 148, a beam splitter 144 and an optical detector 150. The lens system 146 which, in FIG. 4 for example are shown as just one element are now shown as a plurality of convex or concave lens elements 5111, 5112, 5113, 5114 and 5115. The components are housed within a protective tube 5120. Two lens elements 5113 and 5114 together with a pinhole 5140 are arranged within a housing 5130 which is movable with respect to the other components (which are all fixed with respect to the protective tube 5120). This moveable housing 5130 allows the focus to be adjusted such that any imperfections due to assembly or components do not cause the image to be poorly focused. This means that during the final assembly steps, the focus can be adjusted and the housing 5130 (and its associated components) can be set to the optimal position such that the image focus is sharp.

As in a standard optical arrangement, the pinhole 5140 allows the depth of field to be controlled, i.e. a small pinhole 5140 will result in a larger depth of field than a big pinhole 5140. However a small pinhole will cut off more light and therefore the image may not be as bright. Having a larger depth of field can be important in designs where both optical and magnetic information is being imaged at the same time (for example the configuration shown in FIG. 44A and FIG. 44B). An optical absorber 5150 is shown. This is to absorb stray light that may pass through the beamsplitter 144. The optical absorber 5150 may be made from any optically absorbing material, for example black felt. In general the inner walls of the protective tube 5120 and housing 5130 may be made to be black to absorb stray light.

FIG. 49B shows a light path 5170 traveling from the center of the light source 140 traveling to the center of the beam splitter 144. At least a portion of the light is reflected towards the magneto-optical substrate 138 (light path 5171), thereafter at least a portion of that light is reflected back towards the beam splitter and at least a portion of the light that reaches the beam splitter 144 passes through the beam splitter 144 and travels to the optical detector 150 (light path 5172). Light may not only travel in the central path shown in FIG. 49B. FIG. 49C shows how light being reflected from different areas of the magneto-optical substrate 138 may travel through the reading element 134 and be collected at the optical detector 150. The design of the optical elements to obtain a sharp image is well-known in the literature and it may not be necessary to elaborate further on basic optical imaging concepts here. This is merely one practical design for the reading element configuration and many other configurations (for example some which do not include two polarizers, and others which do not include a beam splitter) are feasible.

What is claimed is:

1. A reading device for identifying a tag or an object adapted to be identified, said reading device comprising:
   a first reading element for reading a first set of identification features located in the tag or the object adapted to be identified, wherein the first reading element is a magneto-optical reading element;
   wherein the first reading element is adapted to conform to the tag or object adapted to be identified when brought into contact with the tag or object adapted to be identified;
   wherein the first reading element comprises an engagement element for positioning the magneto-optical substrate over an area of the first set of identification features;
   wherein the engagement element is essentially complementary in shape to an engagement track in the tag or object thereby forming an interlocking means, or is essentially complementary in shape to an engagement track in the tag or object thereby forming an interlocking means, or is formed as a member selected from the group consisting of a cavity, a recess and a protrusion, or has in cross-section a circular shape of a polygonal cross-sectional shape.

2. The reading device of claim 1, further comprising a second reading element for reading a second set of identification features located in the tag or the object adapted to be identified.

3. The reading device of claim 2, wherein the reading device is configured such that a first signal generated from reading the first set of identification features and a second signal generated from reading the second set of identification features are independently used to derive a first signature and a second signature for identifying the tag or the object.

4. The reading device of claim 2, wherein the second reading element is selected from a group consisting of a barcode scanner, a radio frequency identification tag reader, a character recognition reader, an optical image capturing system, a gaussmeter, a magnetometer, a fluorescence meter, a residumeter and a transponder.

5. The reading device of claim 1, wherein light used for the magneto-optic reading is internally reflected inside the magneto-optical reading element.

6. The reading device of claim 1, wherein the magneto-optical reading element comprises at least one optical processing unit and at least one magneto-optical substrate.

7. The reading device of claim 6, wherein the at least one optical processing unit comprises a plurality of components, the components include: at least one optical detector, at least one lens, at least one polarizer, and at least one light source.

8. The reading device of claim 7, wherein the components in the optical processing unit and the magneto-optical substrate have a fixed spatial relationship with respect to each other.

9. The reading device of claim 6, wherein the magneto-optical substrate comprises an optically transparent substrate, a first coating layer and a second coating layer.

10. The reading device of claim 9, wherein the first coating layer is a magneto-optic film or films.

11. The reading device of claim 10, wherein the second coating layer is a reflective film.

12. The reading device of claim 9, wherein the magneto-optical substrate further comprises a protective layer.

13. The reading device of claim 6, wherein the magneto-optical substrate comprises at least one opening for a direct optical reading of identification features and/or alignment marks on a tag or object adapted to be identified.

14. The reading device of claim 1, wherein the first reading element comprises a conformation element facilitating at least the first reading element to conform to the tag or object to be identified when the first reading element is brought into contact with the tag or object to be identified.

15. A reading device for identifying a tag or an object adapted to be identified, said reading device comprising:
   a first reading element for reading a first set of identification feature located in the tag or the object adapted to be identified, wherein the first reading element is a magneto-optical reading element; the magneto-optical reading element comprises at least one optical processing unit and at least one magneto-optical substrate;
   the magneto-optical reading element comprises an engagement element for positioning the magneto-optical substrate over an area of the first set of identification features,
   wherein the engagement element substantially surrounds the magneto-optical substrate and the engagement element is essentially complementary in shape to an engagement track in the tag or object adapted to be identified, thereby forming an interlocking means.

* * * * *